(12) United States Patent
Sang et al.

(10) Patent No.: US 10,147,371 B2
(45) Date of Patent: Dec. 4, 2018

(54) DISPLAY DEVICE HAVING PIXELS WITH SHARED DATA LINES

(71) Applicant: LG Display Co., Ltd., Seoul (KR)

(72) Inventors: Wookyu Sang, Paju-si (KR); Wonho Lee, Paju-si (KR); Juun Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/736,009

(22) Filed: Jun. 10, 2015

(65) Prior Publication Data

US 2015/0379947 A1 Dec. 31, 2015

(30) Foreign Application Priority Data

Jun. 27, 2014 (KR) .................. 10-2014-0079573
Aug. 6, 2014 (KR) .................. 10-2014-0101323
Oct. 27, 2014 (KR) .................. 10-2014-0146039

(51) Int. Cl.
*G09G 3/36* (2006.01)
*G02F 1/1343* (2006.01)
(Continued)

(52) U.S. Cl.
CPC ......... *G09G 3/3614* (2013.01); *G02F 1/1368* (2013.01); *G02F 1/134309* (2013.01);
(Continued)

(58) Field of Classification Search
None
See application file for complete search history.

(56) References Cited

U.S. PATENT DOCUMENTS 6,335,719 B1 1/2002 An et al.
7,898,518 B2 3/2011 Hong et al.
(Continued)

FOREIGN PATENT DOCUMENTS

CN 1918620 A 2/2007
CN 1949357 A 4/2007
(Continued)

OTHER PUBLICATIONS

European Extended Search Report, European Application No. 15172834.2, dated Mar. 17, 2016, 22 pages.
(Continued)

*Primary Examiner* — David D Davis
(74) *Attorney, Agent, or Firm* — Fenwick & West LLP

(57) ABSTRACT

A display device includes a pixel array including a first set of subpixels of first to fourth colors and a second set of subpixels of the first to fourth colors. The display device also includes a data driver configured to generate first data voltages and second data voltages. The first data voltages have a first polarity with respect to a common voltage that is applied to the pixel array and the second data voltages have a second polarity with respect to the common voltage that is different than the first polarity. The data driver applies the first data voltages of the first polarity to the first set of subpixels of the first to fourth colors via the data line and subsequently applies the second data voltages of the second polarity to the second set of subpixels of the first to fourth colors via the data line.

35 Claims, 83 Drawing Sheets

(51) Int. Cl.
*G02F 1/1362* (2006.01)
*G02F 1/1368* (2006.01)

(52) U.S. Cl.
CPC ..... *G02F 1/136286* (2013.01); *G09G 3/3607* (2013.01); *G09G 3/3688* (2013.01); *G02F 2001/134345* (2013.01); *G09G 3/3677* (2013.01); *G09G 2300/0426* (2013.01); *G09G 2300/0452* (2013.01); *G09G 2310/0213* (2013.01); *G09G 2310/0248* (2013.01); *G09G 2310/0297* (2013.01); *G09G 2320/0233* (2013.01); *G09G 2320/0276* (2013.01); *G09G 2330/021* (2013.01); *G09G 2330/023* (2013.01)

(56) References Cited

U.S. PATENT DOCUMENTS

| | | |
|---|---|---|
| 7,948,465 B2 | 5/2011 | Cho et al. |
| 8,330,699 B2 | 12/2012 | Hong et al. |
| 8,354,989 B2 | 1/2013 | Oh et al. |
| 8,405,597 B2 | 3/2013 | Oh et al. |
| 2004/0032386 A1 | 2/2004 | Pai |
| 2005/0184940 A1 | 8/2005 | Oh et al. |
| 2006/0202927 A1* | 9/2006 | Lee .................. G02F 1/1368 345/88 |
| 2007/0091044 A1* | 4/2007 | Park .................. G09G 3/3648 345/88 |
| 2008/0204386 A1 | 8/2008 | Park |
| 2009/0058786 A1 | 3/2009 | Ku |
| 2010/0001942 A1* | 1/2010 | Lin .................. G09G 3/3614 345/100 |
| 2010/0321353 A1 | 12/2010 | Bae et al. |
| 2011/0032245 A1 | 2/2011 | Inokuchi |
| 2011/0242140 A1* | 10/2011 | Lee .................. G09G 3/3648 345/690 |
| 2011/0285950 A1 | 11/2011 | Su et al. |
| 2011/0298783 A1 | 12/2011 | Oh et al. |
| 2012/0098871 A1* | 4/2012 | Park .................. G09G 3/3607 345/690 |
| 2012/0120034 A1* | 5/2012 | Lee .................. G09G 3/3677 345/205 |
| 2012/0154358 A1 | 6/2012 | Chen et al. |
| 2013/0141414 A1 | 6/2013 | Park |
| 2014/0125647 A1 | 5/2014 | Shin et al. |
| 2015/0170590 A1* | 6/2015 | Ahn .................. G09G 3/3614 345/96 |

FOREIGN PATENT DOCUMENTS

| | | |
|---|---|---|
| CN | 101893792 A | 11/2010 |
| CN | 101930714 A | 12/2010 |
| CN | 101937142 A | 1/2011 |
| CN | 102007529 A | 4/2011 |
| CN | 102136261 A | 7/2011 |
| CN | 102184700 A | 9/2011 |
| CN | 102243853 A | 11/2011 |
| CN | 103187038 A | 7/2012 |
| CN | 103185996 A | 7/2013 |
| CN | 103809313 A | 5/2014 |
| KR | 10-2012-0119427 A | 10/2012 |

OTHER PUBLICATIONS

Chinese First Office Action, Chinese Application No. 201510369408.0, dated Jun. 1, 2017, 28 pages.
European Partial Search Report, European Application No. 15172834.2, dated Nov. 5, 2015, 5 pages.
Third Office Action, State Intellectual Property Office of the People's Republic of China Patent Application No. 201510369408.0, dated Jun. 5, 2018, 16 pages.

* cited by examiner (A)

| Driving method | Hi-Z | | | Charge share | | | POLCS | | |
|---|---|---|---|---|---|---|---|---|---|
| Pattern | Voltage change amount | f (Frequency) | Dynamic power consumption | Voltage change amount | f (Frequency) | Dynamic power consumption | Voltage change amount | f (Frequency) | Dynamic power consumption |
| White | 2 | 1/4 | 0.5 | 1 | 1/1 | 1 | 1 | 1/4 | 0.25 |
| Red | 1 | 1/2 | 0.5 | 1 | 1/4 | 0.25 | 1 | 1/2 | 0.5 |
| Green | 1 | 1/2 | 0.5 | 1 | 1/4 | 0.25 | 1 | 1/4 | 0.25 |
| Blue | 1 | 1/2 | 0.5 | 1 | 1/4 | 0.25 | 1 | 1/2 | 0.5 |
| Cyan | 1 | 1/2 | 0.5 | 1 | 1/2 | 0.5 | 1 | 1/4 | 0.25 |
| Yellow | 1 | 1/1 | 1 | 1 | 1/2 | 0.5 | 1 | 3/4 | 0.75 |
| Magenta | 1 | 1/2 | 0.5 | 1 | 1/2 | 0.5 | 1 | 1/2 | 0.5 |

|  | S1 | S2 | S3 | S4 | S5 | S6 | S7 | S8 |
|---|---|---|---|---|---|---|---|---|
| G1 | R+ | G+ | R− | G− | R+ | G+ | R− | G− |
| G2 | Bx | Wx | Bx | Wx | Bx | Wx | Bx | Wx |
| G3 | G+ | R− | G− | R+ | G+ | R− | G− | R+ |
| G4 | W− | B− | W+ | B+ | W− | B− | W+ | B+ |
| G5 | R− | G− | R+ | G+ | R− | G− | R+ | G+ |
| G6 | B− | W+ | B+ | W− | B− | W+ | B+ | W− |
| G7 | G− | R+ | G+ | R− | G− | R+ | G+ | R− |
| G8 | W+ | B+ | W− | B− | W+ | B+ | W− | B− |
| G9 | R+ | G+ | R− | G− | R+ | G+ | R− | G− |
| G10 | B+ | W− | B− | W+ | B+ | W− | B− | W+ |
| G11 | G+ | R− | G− | R+ | G+ | R− | G− | R+ |
| G12 | W− | B− | W+ | B+ | W− | B− | W+ | B+ |

|    | S1 | S2 | S3 | S4 | S5 | S6 | S7 | S8 |
|----|----|----|----|----|----|----|----|----|
| G1 | R+ | G+ | R− | G− | R+ | G+ | R− | G− |
| G2 | ■  | ■  | ■  | ■  | ■  | ■  | ■  | ■  |
| G3 | G+ | R− | G− | R+ | G+ | R− | G− | R+ |
| G4 | ■  | ■  | ■  | ■  | ■  | ■  | ■  | ■  |
| G5 | R− | G− | R+ | G+ | R− | G− | R+ | G+ |
| G6 | ■  | ■  | ■  | ■  | ■  | ■  | ■  | ■  |
| G7 | G− | R+ | G+ | R− | G− | R+ | G+ | R− |
| G8 | ■  | ■  | ■  | ■  | ■  | ■  | ■  | ■  |
| G9 | R+ | G+ | R− | G− | R+ | G+ | R− | G− |
| G10| ■  | ■  | ■  | ■  | ■  | ■  | ■  | ■  |
| G11| G+ | R− | G− | R+ | G+ | R− | G− | R+ |
| G12| ■  | ■  | ■  | ■  | ■  | ■  | ■  | ■  |

DISPLAY DEVICE HAVING PIXELS WITH SHARED DATA LINES

CROSS-REFERENCE TO RELATED APPLICATIONS

This application claims the benefit of Korean Patent Application No. 10-2014-0079573 filed on Jun. 27, 2014, Korean Patent Application No. 10-2014-0101323 filed on Aug. 6, 2014, and Korean Patent Application No. 10-2014-0146039 filed on Oct. 27, 2014, the entire contents of which is incorporated herein by reference for all purposes as if fully set forth herein.

BACKGROUND

Field of Technology

Embodiments of the disclosure relate to a display device, in which each pixel is divided into a red subpixel, a green subpixel, a blue subpixel, and a white subpixel.

Discussion of the Related Art

Various flat panel displays, such as a liquid crystal display (LCD), a plasma display panel (PDP), an organic light emitting diode (OLED) display, and an electrophoresis display (EPD), have been developed. The liquid crystal display displays an image by controlling an electric field applied to liquid crystal molecules based on a data voltage. An active matrix liquid crystal display includes a thin film transistor (TFT) in each pixel.

The liquid crystal display includes a liquid crystal display panel, a backlight unit irradiating light onto the liquid crystal display panel, source driver integrated circuits (ICs) for supplying a data voltage to data lines of the liquid crystal display panel, gate driver ICs for supplying gate pulses (or scan pulses) to gate lines (or scan lines) of the liquid crystal display panel, a control circuit for controlling the source driver ICs and the gate driver ICs, a light source driving circuit for driving light sources of the backlight unit, and the like.

A liquid crystal display, in which a white (W) subpixel is added to each pixel including a red (R) subpixel, a green (G) subpixel, and a blue (B) subpixel, is being developed. In the following description, the display device, in which each pixel is divided into the R, G, B, and W subpixels, is referred to as an RGBW type display device. The W subpixel increases a luminance of each pixel and reduces a luminance of the backlight unit, thereby reducing power consumption of the liquid crystal display.

In recent, various methods capable of reducing the number of source driver ICs make an attempt to reduce the cost of the large-screen display device having a high resolution. However, a luminance deviation between lines of a display panel may be generated due to non-uniformly charging states of the pixels, the non-uniform distribution of polarities, etc., thereby generating a reduction in the image quality.

SUMMARY

Embodiments of the disclosure provide a display device capable of improving the image quality in a RGBW type DRD (Double Rate Driving) display device.

In one aspect, there is a display device including a plurality of data lines and a plurality of gate lines, the display device comprising a pixel array including a first set of subpixels of first to fourth colors and a second set of subpixels of the first to fourth colors, the first set of subpixels and the second set of subpixels connected to a same data line. The display device also includes a data driver configured to generate first data voltages and second data voltages. The first data voltages have a first polarity with respect to a common voltage that is applied to the pixel array and the second data voltages have a second polarity with respect to the common voltage that is different than the first polarity. The data driver applies the first data voltages of the first polarity to the first set of subpixels of the first to fourth colors via the data line and subsequently applies the second data voltages of the second polarity to the second set of subpixels of the first to fourth colors via the data line.

The data driver sequentially generates data voltages of the first to fourth colors at the first polarity and sequentially generates the second data voltages of the first to fourth colors at the second polarity.

The data driver includes a first switch configured to be turned on at a first time and perform sharing of charge between subpixels on the data lines belonging to the first data line group; and a second switch configured to be turned on at a second time different from the first time and perform the sharing of charge between subpixels on the data lines belonging to the second data line group.

In another aspect, a display devices comprises a plurality of gate lines, a plurality of data lines crossing the gate lines and a plurality of pixels. Each pixel includes a plurality of subpixels of different colors and the plurality of subpixels arranged in a row corresponding to the pixel. The display device also includes a data driver sequentially driving a first set of subpixels with first data voltages of a first polarity with respect to a common voltage applied to the plurality of pixels. At least some of the subpixels of the first set of subpixels belong to different pixels located on different rows and each of the first set of subpixels associated with a different color. The display device also includes a gate driver configured to supply gate pulses to the plurality of gate lines, the gate pulse synchronized with the first data voltages.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 49 shows a comparison of a charge sharing method according to an exemplary embodiment, a general hi-Z (impedance) switching method, and a general charge sharing method with respect to a change amount, a frequency, and dynamic power consumption of a data voltage;

DETAILED DESCRIPTION

A display device according to an exemplary embodiment may be implemented as a flat panel display capable of representing colors, such as a liquid crystal display (LCD), a plasma display panel (PDP), and an organic light emitting diode (OLED) display. In the following description, the embodiments of the disclosure will be described using the liquid crystal display as an example of the flat panel display. Other flat panel displays may be used. For example, an arrangement of red (R), green (G), blue (B), and white (W) subpixels according to the embodiment of the disclosure may be applied to the OLED display.

Reference will now be made in detail to embodiments of the disclosure, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
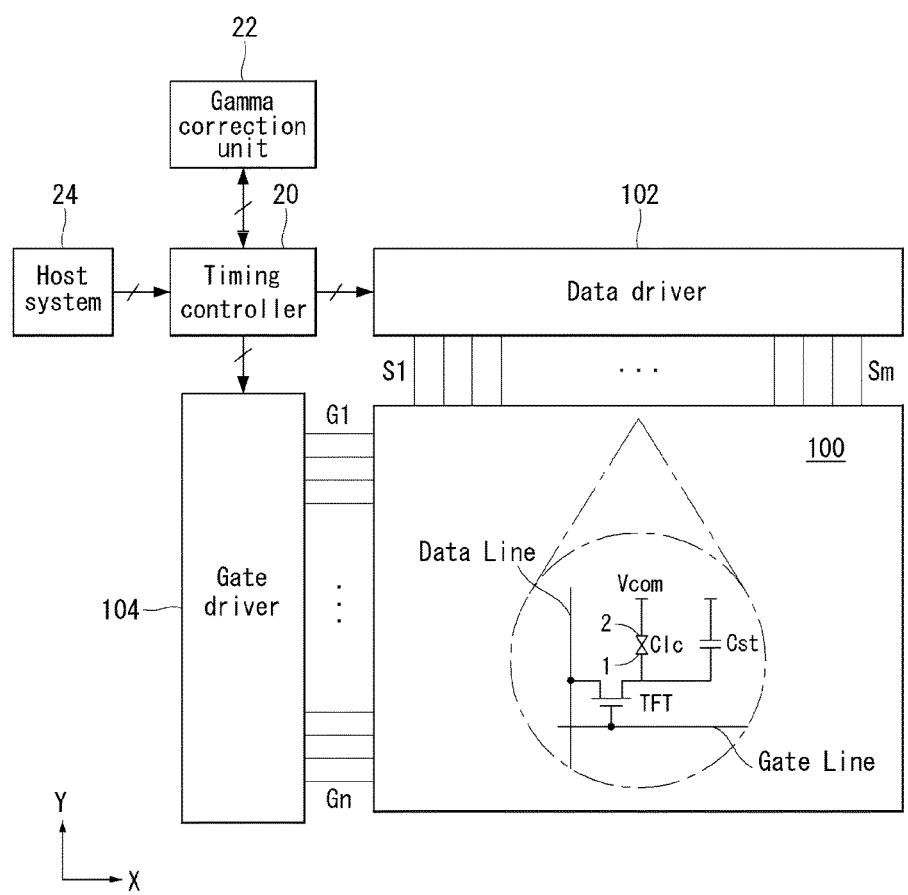
FIG. 1 is a block diagram showing a display device according to an exemplary embodiment.
Figure 2:
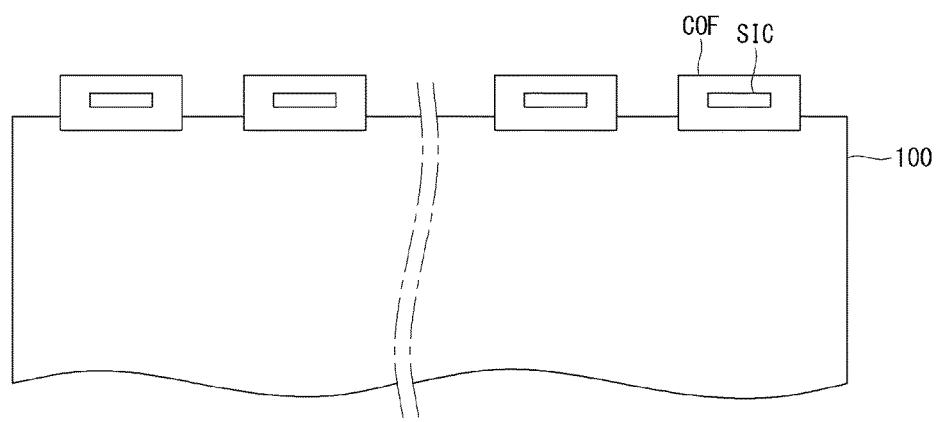
FIG. 2 shows a source driver integrated circuit (IC) and a chip-on film (COF) according to one embodiment.

Referring to FIGS. 1 and 2, a display device according to an exemplary embodiment of the disclosure includes a display panel 100 including a pixel array and a display panel driving circuit for writing data of an input image on the display panel 100. A backlight unit for uniformly irradiating light onto the display panel 100 may be disposed under the display panel 100.

The display device according to the embodiment of the disclosure is implemented as a double rate driving (DRD) display device, in which two subpixels, which are adjacent to each other in a horizontal direction (for example, a x-axis direction or a row line direction), share one data line with each other so as to reduce the number of source driver integrated circuits (ICs). In the DRD display device, because the number of data lines of the pixel array decreases, the number of source driver ICs may be reduced to one half. Further, in the DRD display device, an operating frequency of the source driver IC increases to double.

The display panel 100 includes an upper substrate and a lower substrate, which are positioned opposite each other with a liquid crystal layer interposed therebetween. The pixel array of the display panel 100 includes pixels arranged in a matrix form based on a crossing structure of data lines S1 to Sm and gate lines G1 to Gn.

The lower substrate of the display panel 100 includes the data lines S1 to Sm, the gate lines G1 to Gn, thin film transistors (TFTs), pixel electrodes 1 connected to the TFTs, storage capacitors Cst connected to the pixel electrodes 1, and the like. Each pixel adjusts a transmission amount of light using liquid crystal molecules driven by a voltage difference between the pixel electrode 1 charged to a data voltage through the TFT and a common electrode 2, to which a common voltage Vcom is supplied, thereby displaying an image of video data.

A color filter array including black matrixes and color filters is formed on the upper substrate of the display panel 100. In a vertical electric field driving manner such as a twisted nematic (TN) mode and a vertical alignment (VA) mode, the common electrodes 2 are formed on the upper substrate. In a horizontal electric field driving manner such as an in-plane switching (IPS) mode and a fringe field switching (FFS) mode, the common electrodes 2 are formed on the lower substrate along with the pixel electrodes 1. Polarizing plates are respectively attached to the upper substrate and the lower substrate of the display panel 100. Alignment layers for setting a pre-tilt angle of liquid crystals are respectively formed on the upper substrate and the lower substrate of the display panel 100.

The liquid crystal display according to the embodiment of the disclosure may be implemented as any type of liquid crystal display including a transmissive liquid crystal display, a transflective liquid crystal display, and a reflective liquid crystal display. The transmissive liquid crystal display and the transflective liquid crystal display require the backlight unit. The backlight unit may be implemented as a direct type backlight unit or an edge type backlight unit.

The display panel driving circuit writes the data of the input image on the pixels. The data written on the pixels includes R data, G data, B data, and W data. The display panel driving circuit includes a data driver 102, a gate driver 104, a timing controller 20, and a gamma correction unit 22.

The data driver 102 sequentially generates data voltages of first to fourth colors at a first polarity. The data driver 102 inverts the first polarity of the data voltage of the first color to a second polarity and sequentially generates the data voltages of the first to fourth colors at the second polarity. The first polarity and the second polarity are set with respect to the common voltage Vcom. For example, the first polarity of a data voltage may represent a value that is less than the common voltage Vcom and the second polarity of the data voltage may represent a value that is greater than the common voltage Vcom. Alternatively, the first polarity of a data voltage may represent a value that is greater than the common voltage Vcom and the second polarity of a data voltage may represent a value that is less than the common voltage Vcom. The data driver 102 includes a first switch and a second switch. The first switch is turned on at a first charge sharing timing and performs the charge sharing on the data lines S1 and S3 belonging to a first data line group. The second switch is turned on at a second charge sharing timing different from the first charge sharing timing and performs the charge sharing on the data lines S2 and S4 belonging to a second data line group.

As shown in FIG. 2, the data driver 102 includes one or more source driver ICs SIC. The source driver ICs SIC are mounted on a flexible substrate, for example, a tape carrier package (TCP) or a chip-on film (COF) and are mounted on the display panel 100. Data output channels of the source driver ICs SIC are connected to the data lines S1 to Sm of the pixel array.

The source driver ICs SIC receive digital video data of the input image from the timing controller 20. The digital video data transmitted to the source driver ICs SIC includes R data, G data, B data, and W data. The source driver ICs SIC convert the RGBW digital video data of the input image into positive and negative gamma compensation voltages under the control of the timing controller 20 and output positive and negative data voltages. An output voltage of the source driver ICs SIC is supplied to the data lines S1 to Sm.

Each pixel includes a R subpixel, a G subpixel, a B subpixel, and a W subpixel. If a pentile rendering algorithm is applied, each pixel may include subpixels of two colors. For example, a first pixel may include a R subpixel and a G subpixel, and a second pixel may include a B subpixel and a W subpixel. However, the embodiment of the disclosure is not limited thereto.

The two horizontally adjacent subpixels share one data line and are charged to the time-divided data voltages through the one data line. The data line sharing structure can reduce the number of data lines and the number of source driver ICs at the same resolution, compared to a general pixel array structure.

Figure 4:
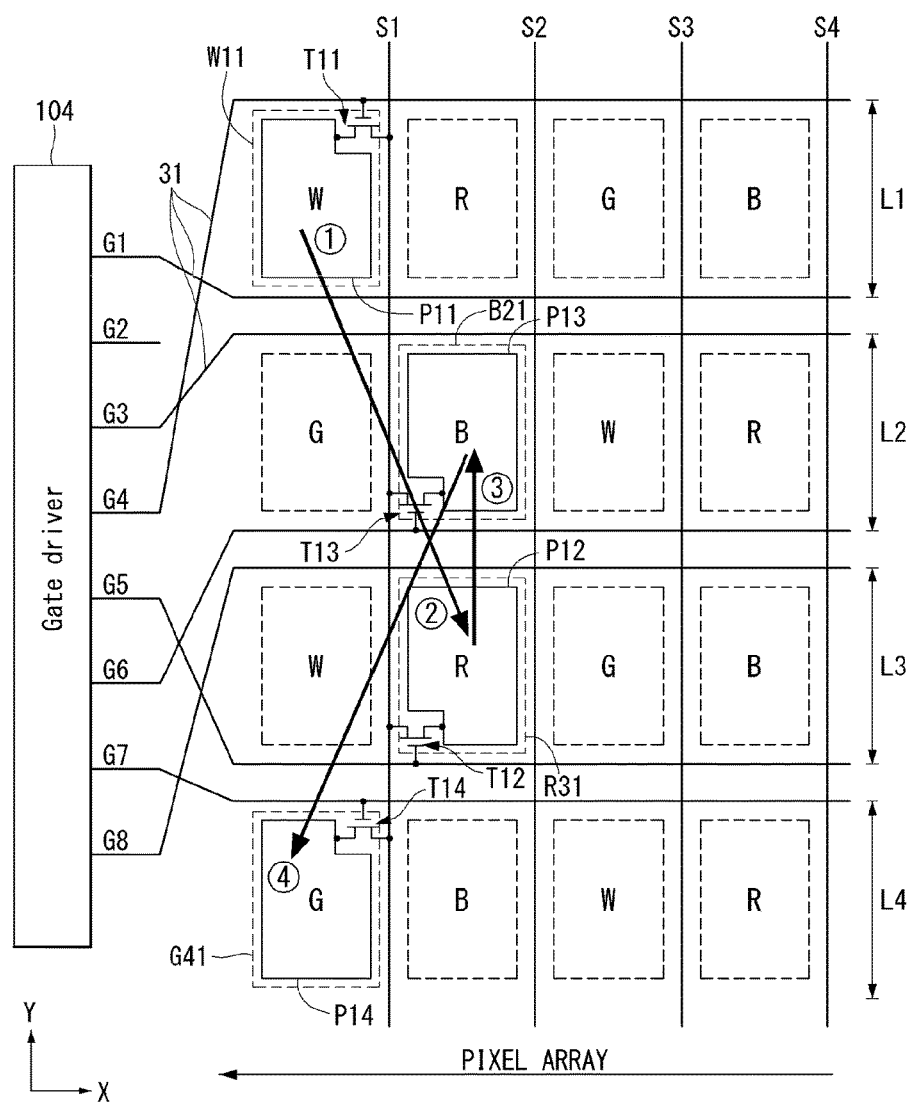

The source driver IC SIC may invert a polarity of the data voltage to be supplied to the pixels in a cycle, which is equal to or greater than two horizontal periods and is equal to or less than N/2 horizontal period, under the control of the timing controller 20, where N is a vertical resolution of the display panel. FIGS. 5, 6, 12, and 13 show an example where the data voltage is inverted in a cycle of two horizontal periods 2H by the source driver IC SIC, but the embodiment of the disclosure is not limited thereto. Four subpixels existing on two lines of the pixel array sharing the same data line are sequentially charged to the data voltages of the four colors, which are successively output from the source driver IC during two horizontal periods. In the embodiment disclosed herein, as shown in FIG. 4, the two lines of the pixel array indicate two adjacent row lines, for example, L1 and L2.

The source driver ICs SIC maintain the data voltages of the four colors to be charged to four subpixels at the same polarity during two horizontal periods 2H in response to a polarity control signal POL and invert a polarity of the data voltage in a cycle of two horizontal periods 2H. Thus, the source driver ICs SIC successively output the eight data voltages during four horizontal periods 4H and invert the polarity of the data voltage in a cycle of two horizontal periods 2H.

The embodiment of the disclosure increases a polarity inversion cycle of the data voltage and decreases the transition number of data voltage. As a result, the embodiment of the disclosure may reduce power consumption and a heat generation amount of the source driver ICs.

Figure 3:
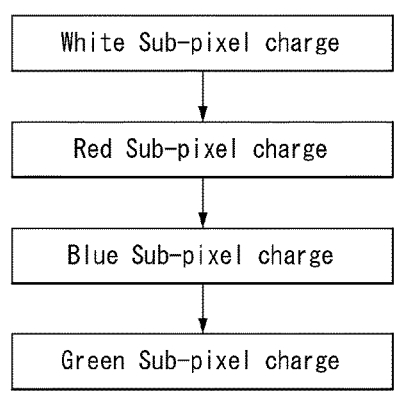
FIGS. 3 to 6 show a charge order of a pixel array and a polarity of a data voltage according to a first embodiment.
Figure 9:
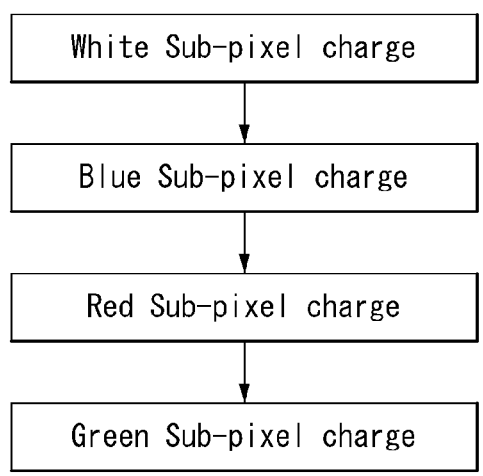
FIGS. 9 to 12 show a charge order of a pixel array and a polarity of a data voltage according to a second embodiment.

The display device according to the embodiment of the disclosure writes data of a first color on a subpixel of the first color and then writes data on subpixels of second to fourth colors during two horizontal periods 2H, in which the data voltages of the four colors having the same polarity are successively output. FIGS. 3 and 9 show an example where the RGBW subpixels are charged in order of the W data voltage, the R data voltage, the B data voltage, and the G data voltage or in order of the W data voltage, the B data voltage, the R data voltage, and the G data voltage during a period, in which the data voltages are maintained at the same polarity. In all of the pixels of the pixel array, the polarity inversion of the data voltage is generated only in the W data voltage. The write order of the data of the four colors is not limited to the example shown in FIGS. 3 and 9. When the subpixels are successively charged to the data voltages of the same polarity through the same data line, an amount of the first charged data voltage is relatively less than the subsequent data voltages.

In the example of FIGS. 3 and 4, a connection relationship between the RGBW subpixels, which share one data line S1 with one another and are sequentially charged to the data voltages of the same polarity, is as follows. The W subpixel is disposed on a (K+1)-th row line L1 of the display panel 100, where K is zero and a positive integer. The R subpixel is disposed on a (K+3)-th row line L3 of the display panel 100; the B subpixel is disposed on a (K+2)-th row line L2 of the display panel 100; and the G subpixel is disposed on a (K+4)-th row line L4 of the display panel 100.

A W subpixel W11 includes a first TFT T11, which supplies a W data voltage supplied through a J-th data line S1 to a first pixel electrode P11 in response to a first gate pulse supplied through an I-th gate line G4, where I and J are a positive integer. The first TFT T11 includes a gate connected to the I-th gate line G4 to which the first gate pulse is supplied, a drain connected to the J-th data line S1, and a source connected to the first pixel electrode P11.

A R subpixel R31 includes a second TFT T12, which supplies a R data voltage supplied through the J-th data line S1 to a second pixel electrode P12 in response to a second gate pulse supplied through an (I+1)-th gate line G5. The second TFT T12 includes a gate connected to the (I+1)-th gate line G5 to which the second gate pulse is supplied, a drain connected to the J-th data line S1, and a source connected to the second pixel electrode P12.

A B subpixel B21 includes a third TFT T13, which supplies a B data voltage supplied through the J-th data line S1 to a third pixel electrode P13 in response to a third gate pulse supplied through an (I+2)-th gate line G6. The third TFT T13 includes a gate connected to the (I+2)-th gate line G6 to which the third gate pulse is supplied, a drain connected to the J-th data line S1, and a source connected to the third pixel electrode P13.

A G subpixel G41 includes a fourth TFT T14, which supplies a G data voltage supplied through the Jth data line S1 to a fourth pixel electrode P14 in response to a fourth gate pulse supplied through an (I+3)-th gate line G7. The fourth TFT T14 includes a gate connected to the (I+3)-th gate line G7 to which the fourth gate pulse is supplied, a drain connected to the J-th data line S1, and a source connected to the fourth pixel electrode P14.

When the source driver IC SIC inverts the polarity of the data voltage in a cycle of two horizontal periods, the pixel array is driven in a 1-dot inversion scheme and a 2-dot inversion scheme. The pixel array includes pixels, in which the polarity of the data voltage is inverted every 1 dot (e.g., 1 subpixel), and pixels, in which the polarity of the data voltage is inverted every 2 dots (e.g., 2 subpixels), along a horizontal direction X and a vertical direction Y. The 1 dot means one subpixel according to one embodiment. The display device according to the embodiment of the disclosure controls the polarity of the pixel array in a dot inversion scheme and thus can prevent a luminance difference and a flicker appearing when the data voltages of the same polarity are concentrated in a line or block form. A reason why a polarity inversion cycle of output data of the source driver IC SIC is different from a polarity inversion cycle of the pixel array is because the gate pulses are non-sequentially applied to the gate lines of the pixel array due to the structure of the pixel array shown in FIGS. 4 and 5.

The gate driver 104 sequentially supplies gate pulses to the gate lines G1 to Gn under the control of the timing controller 20. The gate pulses output from the gate driver 104 are synchronized with positive and negative video data voltages, to which the pixels will be charged. The gate driver 104 may be directly formed on the lower substrate of the display panel 100 along with the pixel array in the same manufacturing process, so as to reduce the cost of ICs. The gate driver 104 directly formed on the lower substrate of the display panel 100 is known as a gate-in panel (GIP) circuit.

Figure 10:
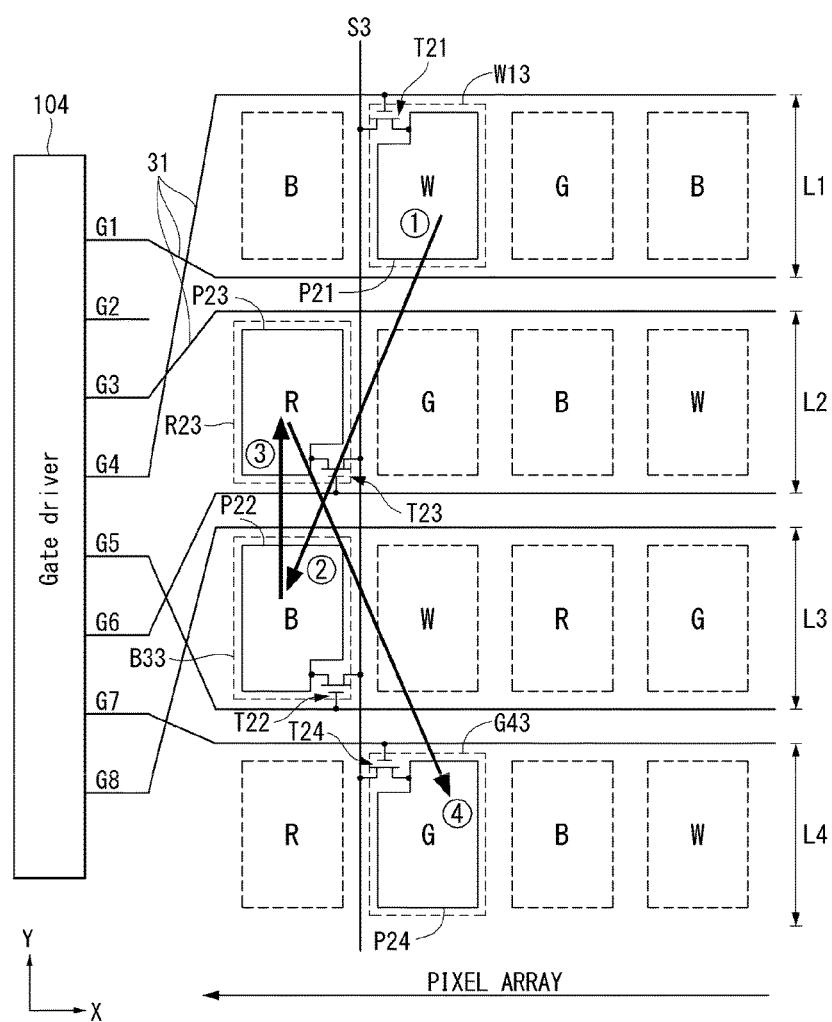

As shown in FIGS. 4 and 10, output channels of the gate driver 104 are respectively connected to the gate lines G1 to Gn of the pixel array through link lines 31. Further, as shown in FIGS. 4 and 10, at least a portion of the link lines 31 cross each other, so as to non-sequentially supply the gate pulses to the pixel array without changing the output channels of the gate driver 104. Thus, the gate driver 104 sequentially outputs the gate pulse from a first output channel to a n-th output channel, but the gate pulse is non-sequentially applied to the gate lines G1 to Gn of the pixel array. The display device according to the embodiment of the disclosure connects the gate driver 104 to the gate lines G1 to Gn of the pixel array through the crossed link lines 31 and thus may non-sequentially supply the gate pulse to the gate lines G1 to Gn without changing the output channels of the gate driver 104.

The timing controller 20 converts RGB data of the input image received from a host system 24 into RGBW data and transmits the RGBW data to the data driver 102. An interface for data transmission between the timing controller 20 and the data driver 102 may use a mini low voltage differential signaling (LVDS) interface or an embedded panel interface (EPI). The EPI was disclosed in U.S. Pat. No. 7,898,518 (Mar. 1, 2011), U.S. Pat. No. 7,948,465 (May 24, 2011), U.S. Pat. No. 8,330,699 (Dec. 11, 2012), etc.

The timing controller 20 receives timing signals synchronized with the data of the input image from the host system 24. The timing signals include a vertical sync signal Vsync, a horizontal sync signal Hsync, a data enable signal DE, and a dot clock DCLK, etc. The timing controller 20 controls operation timings of the data driver 102 and the gate driver 104 based on the timing signals Vsync, Hsync, DE, and DCLK received along with pixel data of the input image. The timing controller 20 may transmit the polarity control signal POL for controlling polarities of the pixel array to each of the source driver ICs of the data driver 102. The mini LVDS interface is used to transmit the polarity control signal POL through a separate control line. The EPI is an interface technology which encodes polarity control information to a control data packet transmitted between a clock training pattern for clock and data recovery (CDR) and an RGBW data packet and transmits the polarity control information to each of the source driver ICs of the data driver 102.

The timing controller 20 may convert the RGB data of the input image into the RGBW data using a known white gain calculation algorithm. The timing controller 20 generates the polarity control signal POL for controlling the polarity of the data voltage. A polarity control signal for controlling a polarity of the data voltage supplied to a first data line S1 is referred to as "a first polarity control signal", and a polarity control signal for controlling a polarity of the data voltage supplied to a second data line S2 is referred to as "a second polarity control signal". A polarity control signal for controlling a polarity of the data voltage supplied to a third data line S3 is referred to as "a third polarity control signal", and a polarity control signal for controlling a polarity of the data voltage supplied to a fourth data line S4 is referred to as "a fourth polarity control signal". The first to fourth polarity control signals are inverted in a cycle of two horizontal periods. The second polarity control signal has a phase difference of one horizontal period from the first polarity control signal. The third polarity control signal has a phase difference of one horizontal period from the second polarity control signal. The third polarity control signal may be generated at antiphase of the first polarity control signal. The fourth polarity control signal has a phase difference of one horizontal period from the third polarity control signal. The fourth polarity control signal may be generated at antiphase of the second polarity control signal.

Figure 7:
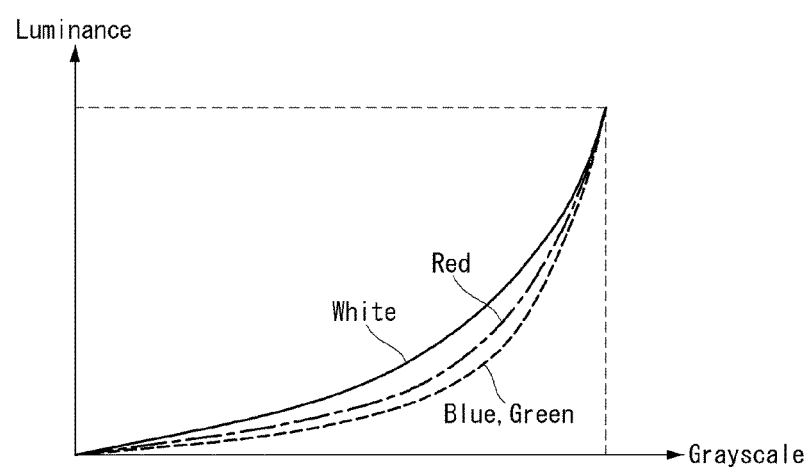
FIG. 7 shows a gamma compensation curve of data of each color for compensating for a difference between charge amounts of pixels shown in FIG. 6.
Figure 13:
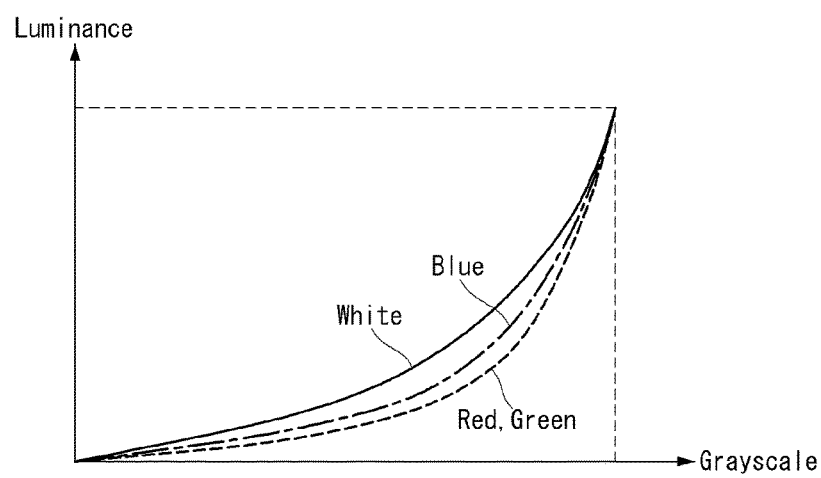
FIG. 13 shows a gamma compensation curve of data of each color for compensating for a difference between charge amounts of pixels shown in FIG. 12.

The gamma correction unit 22 modulates the RGBW data using a lookup table storing a gamma compensation curve shown in FIGS. 7 and 13, so as to compensate for a difference between charge characteristics of the pixels of different colors. The lookup table receives input gray levels of the data of the input image, selects output gray levels corresponding to the input gray levels, modulates the input gray levels, and adjusts a luminance of the data at each gray level. In FIGS. 7 and 13, x-axis is an output gray level, and y-axis is a luminance. The gamma correction unit 22 receives the RGB data from the timing controller 20. Hence, the gamma correction unit 22 increases a data value of a color having a small amount of charge, but reduces a data value of a color having a large amount of charge. The gamma correction unit 22 may be embedded in the timing controller 20 or the host system 24.

The host system 24 may be implemented as one of a television system, a set-top box, a navigation system, a DVD player, a Blu-ray player, a personal computer (PC), a home theater system, and a phone system.

FIGS. 3 to 6 show a charge order of a pixel array and a polarity of a data voltage according to a first embodiment.

Referring to FIG. 3, the source driver IC outputs the data voltages of the four colors having the same polarity in order of the W data voltage, the R data voltage, the B data voltage, and the G data voltage. Thus, after the W subpixel is charged to the W data voltage, the R, B, and G subpixels are sequentially charged to the R data voltage, the B data voltage, and the G data voltage in the order named. In all of the pixels of the pixel array, the polarity inversion of the data voltage is generated only in the W data voltage.

Figure 5:
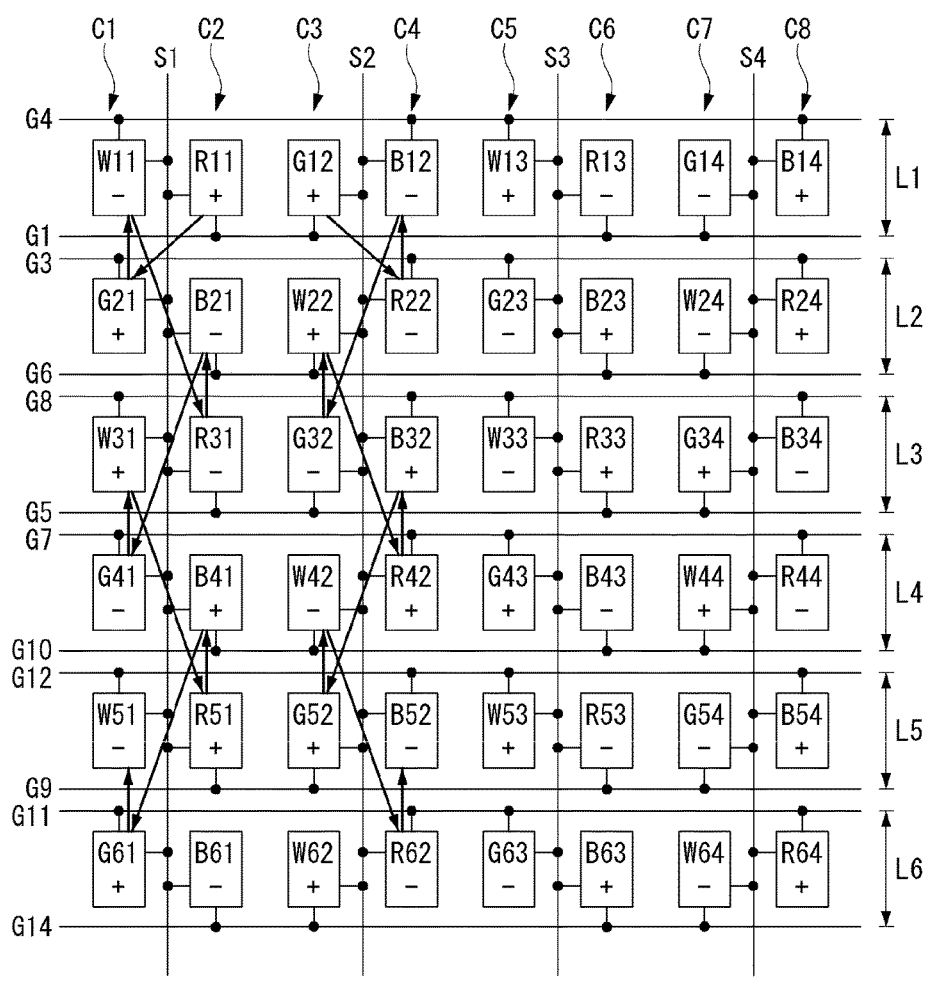

In FIGS. 4 and 5, "L1 to L6" indicate the row lines of the display panel 100, and "C1 to C8" indicate the column lines of the display panel 100. "WXY" is the W subpixels of X-th row lines L1 to L6 connected to Y-th data lines S1 to S4; "RXY" is the R subpixels of the X-th row lines L1 to L6 connected to the Y-th data lines S1 to S4; "GXY" is the G subpixels of the X-th row lines L1 to L6 connected to the Y-th data lines S1 to S4; and "BXY" is the B subpixels of the X-th row lines L1 to L6 connected to the Y-th data lines S1 to S4. For example, "W22" is the W subpixel of the second row line L2 connected to the second data line S2, and "R42" is the R subpixel of the fourth row line L4 connected to the second data line S2.

Figure 6:
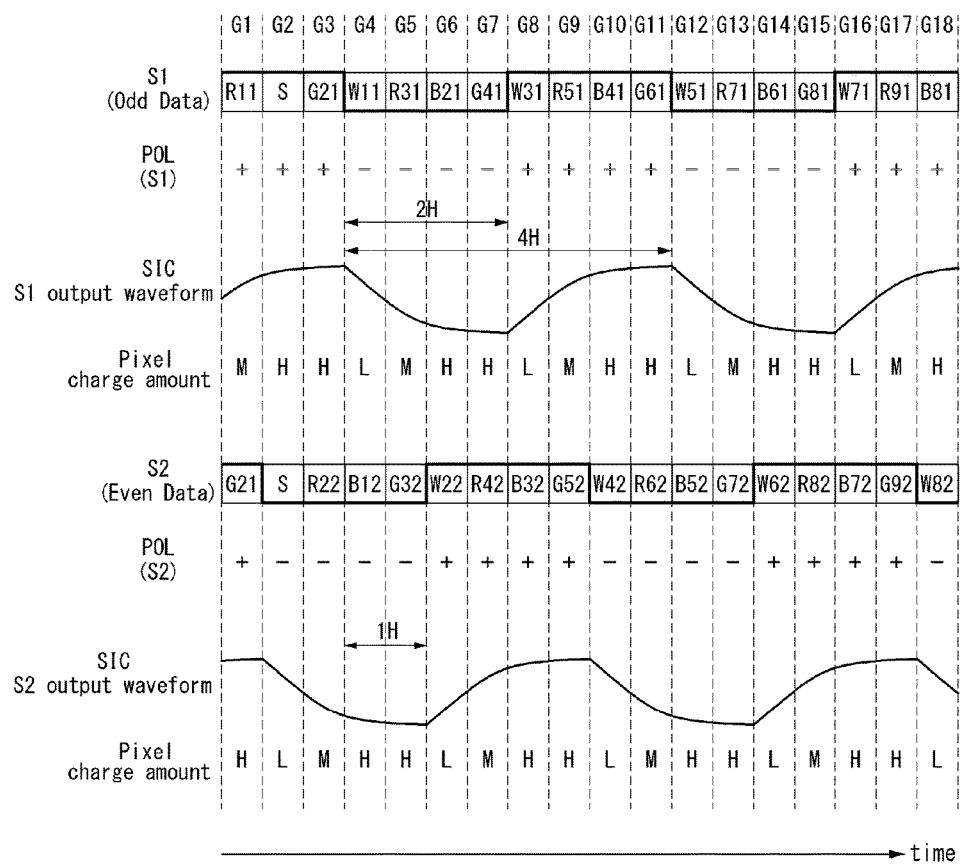

In FIG. 6, "S1(Odd Data)" indicates odd-numbered RGBW data output through the first data line S1, and "S2(Even Data)" indicates even-numbered RGBW data output through the second data line S2. "POL" is the polarity control signal which is generated by the timing controller 20 and defines the polarity of the data voltage depending on its logic value.

Referring to FIGS. 3 to 6, the W, R, G, and B subpixels are disposed from the left on the odd-numbered row lines L1, L3, and L5 in the order named, and the G, B, W, and R subpixels are disposed from the left on the even-numbered row lines L2, L4, and L6 in the order named. Thus, the W subpixels are disposed at crossings of ($4i+1$)-th column lines C1 and C5 and the odd-numbered row lines L1, L3, and L5, where "i" is zero and a positive integer. The G subpixels are disposed at crossings of the ($4i+1$)-th column lines C1 and C5 and the even-numbered row lines L2, L4, and L6. The R subpixels are disposed at crossings of ($4i+2$)-th column lines C2 and C6 and the odd-numbered row lines L1, L3, and L5. The B subpixels are disposed at crossings of the ($4i+2$)-th column lines C2 and C6 and the even-numbered row lines L2, L4, and L6. The G subpixels are disposed at crossings of ($4i+3$)-th column lines C3 and C7 and the odd-numbered row lines L1, L3, and L5. The W subpixels are disposed at crossings of the ($4i+3$)-th column lines C3 and C7 and the even-numbered row lines L2, L4, and L6. The B subpixels are disposed at crossings of ($4i+4$)-th column lines C4 and C8 and the odd-numbered row lines L1, L3, and L5. The R subpixels are disposed at crossings of the ($4i+4$)-th column lines C4 and C8 and the even-numbered row lines L2, L4, and L6.

The source driver IC outputs the W, R, B, and G data voltages having the same polarity during two horizontal periods 2H in the order named. The gate driver 104 sequentially outputs a gate pulse synchronized with the W data voltage, a gate pulse synchronized with the R data voltage, a gate pulse synchronized with the B data voltage, and a gate pulse synchronized with the G data voltage. As shown in FIGS. 4 and 5, the W subpixel W11 of the first row line L1, the R subpixel R31 of the third row line L3, the B subpixel W21 of the second row line L2, and the G subpixel W41 of the fourth row line L4 are respectively charged to the W, R, B, and G data voltages having the same polarity in the order named due to the crossing structure of the link lines 31.

As shown in FIG. 6, when the R, G, B, and W data voltages have the same voltage, the W subpixel is a low charge subpixel "L"; the R subpixel is a middle charge subpixel "M", in which a charge amount of the data voltage is more than the W subpixel; and the B subpixel and the G subpixel have the same charge amount and are high charge subpixels "H", in which a charge amount of the data voltage is more than the R subpixel. There is little difference between the charge amount of the R subpixel and the charge amount of the B or G subpixel. As shown in FIG. 6, because the positive data voltages and the negative data voltages of the subpixels of the same color are balanced in the horizontal and vertical directions, the common voltage Vcom is not shifted. Therefore, the embodiment of the disclosure may implement the image quality, in which a horizontal crosstalk is not generated and there is no luminance difference between the lines.

If the W subpixels corresponding to the low charge subpixel are adjacently positioned, a luminance difference in a formation portion of the W subpixels may be recognized. However, the embodiment of the disclosure separates the W subpixels from each other by a distance equal to or greater than two dots (e.g., subpixels) and thus can prevent a luminance reduction resulting from the W subpixels. Thus, the display device according to the embodiment of the disclosure can reduce the power consumption by adding the W subpixel to each pixel and also may implement the image quality, in which there is no color distortion and no luminance difference between the lines, by balancing the charge characteristics and the polarity distributions of the RGB subpixels.

If a polarity inversion time point of the data voltages supplied to the pixels through the odd-numbered data lines S1 and S3 is the same as a polarity inversion time point of the data voltages supplied to the pixels through the even-numbered data lines S2 and S4, a charge amount of all of the subpixels on the same row line may be reduced. Hence, the luminance difference between the row lines may be generated. The source driver IC according to the embodiment of the disclosure causes the polarity inversion time point of the data voltages supplied to the odd-numbered data lines S1 and S3 to be different from the polarity inversion time point of the data voltages supplied to the even-numbered data lines S2 and S4 under the control of the timing controller 20. Thus, the display device according to the embodiment of the disclosure differently adjusts polarity inversion time points of the adjacent column lines and thus can prevent a luminance difference between the adjacent column lines. As shown in FIG. 6, the polarity inversion time point of the data voltages supplied to the odd-numbered data lines S1 and S3 and the polarity inversion time point of the data voltages supplied to the even-numbered data lines S2 and S4 may have a difference of one horizontal period 1H.

If the subpixels of the same color each have a different charge amount, the gamma characteristics of the subpixels of the same color cannot be compensated at once. On the other hand, because the subpixels of the same color have the same charge amount in the embodiment of the disclosure, the gamma characteristics of the subpixels of each color can be compensated at once. As shown in FIG. 7, a gamma curve of the W data to be written on the W subpixels is set to be higher than gamma curves of data of other colors, and thus the low charge amount of the W subpixels can be compensated at once. A gamma curve of the R data to be written on the R subpixels is lower than the gamma curve of the W data and is higher than gamma curves of the B data and the G data. Because the B and G subpixels have the same charge amount, the gamma curves of the B data and the G data are the same as each other.

In FIG. 6, "S" synchronized with a second gate pulse is not the data of the input image and is dummy data generated in the timing controller 20. The dummy data S is not written on the pixel array. The dummy data S is inserted between second line data and third line data, so as to adjust output timing of the third line data in a data rearrangement process of the timing controller 20. The second gate pulse is not supplied to the gate line of the pixel array.

The data voltage charge order of the pixel array shown in FIGS. 3 to 6 is different from data input order of the input image. Because of this, the timing controller 20 needs to change data transmission order of the input image on a per row line basis in accordance with the data voltage charge order of the pixel array shown in FIGS. 3 to 6 in a data rearrangement process of the input image.

Figure 8:
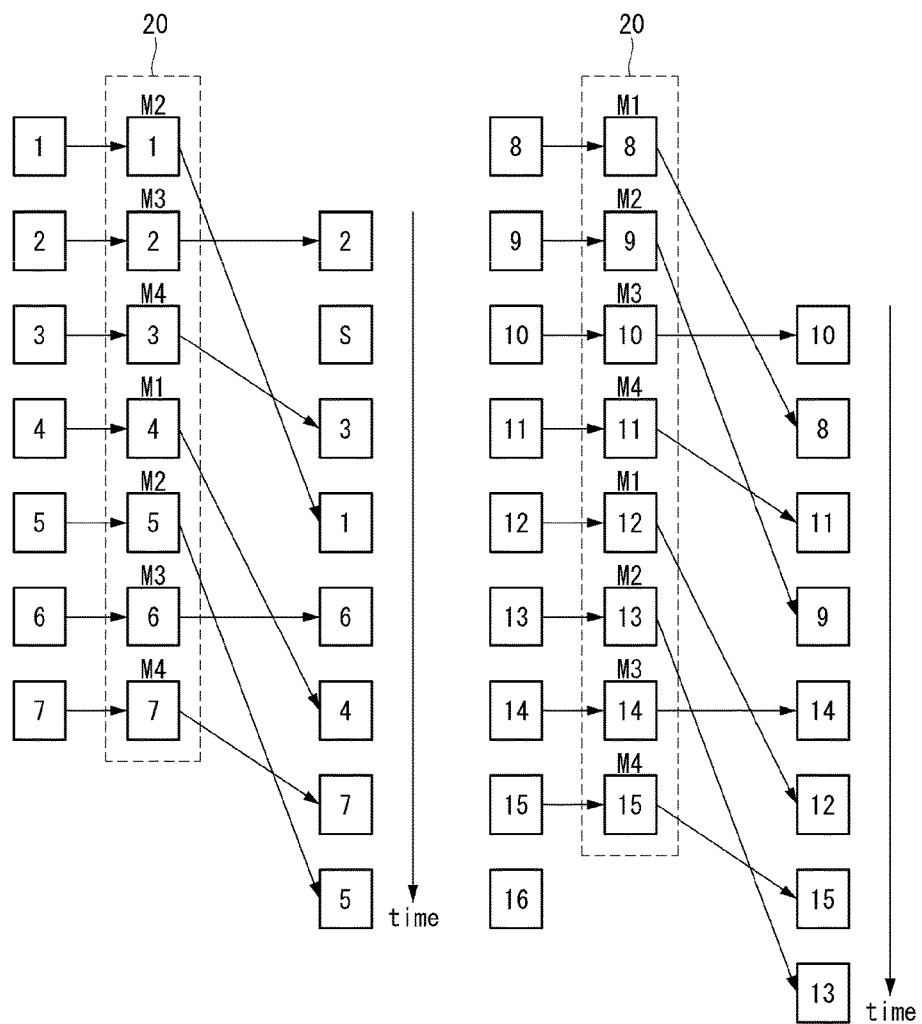
FIG. 8 shows a data rearrangement process of a timing controller for implementing a data voltage charge order of a pixel array shown in FIGS. 3 to 6 according to the first embodiment.

FIG. 8 shows a data rearrangement process of the timing controller 20 for implementing the data voltage charge order of the pixel array shown in FIGS. 3 to 6.

In FIG. 8, reference numerals 1 to 13 are numbers of line data. The timing controller 20 receives first line data 1, second line data 2, third line data 3, fourth line data 4, fifth line data 5, sixth line data 6, etc., to thirteenth line data 13 of the input image in the order named. The line data 1 to 13 is digital data. The first line data 1 is RGBW data, which will be supplied to some (for example, W11, B12, W13, and B14) of the subpixels of the first row line L1 shown in FIG. 5. The second line data 2 following the first line data 1 is RGBW data, which will be supplied to the remaining subpixels (for example, R11, G12, R13, and G14) of the first row line L1 shown in FIG. 5. The third line data 3 is RGBW data, which will be supplied to some (for example, G21, R22, G23, and R24) of the subpixels of the second row line L2 shown in FIG. 5. The fourth line data 4 following the third line data 3 is RGBW data, which will be supplied to the remaining subpixels (for example, B21, W22, B23, and W24) of the second row line L2 shown in FIG. 5. The fifth line data 5 is RGBW data, which will be supplied to some (for example, W31, B32, W33, and B34) of the subpixels of the third row line L3 shown in FIG. 5. The sixth line data 6 following the fifth line data 5 is RGBW data, which will be supplied to the remaining subpixels (for example, R31, G32, R33, and G34) of the third row line L3 shown in FIG. 5.

The timing controller 20 changes data order of the input image using line memories M1 to M4. FIG. 8 shows an example where the timing controller 20 rearranges data and changes output order of the data using the four line memories M1 to M4. The timing controller 20 controls read/write timing of the line memories M1 to M4. The first line data 1 may be stored in the second line memory M2; the second line data 2 may be stored in the third line memory M3; the third line data 3 may be stored in the fourth line memory M4; and the fourth line data 4 may be stored in the first line memory M1. To change the output timing of the data in accordance with the data voltage charge order of the pixel array shown in FIG. 5, after the second line data 2 is output from the third line memory M3, the dummy data S corresponding to one line, which is previously stored in a register of the timing controller 20, is output. The second line data 2 is synchronized with a first gate pulse. The dummy data S is synchronized with a second gate pulse which is not applied to the pixel array. Subsequently, after the third line data 3 is output from the fourth line memory M4, the first line data 1 is output from the second line memory M2. The third line data 3 is synchronized with a third gate pulse, and the first line data 1 is synchronized with a fourth gate pulse.

The second line memory M2 starts to store the fifth line data 5 while outputting the first line data 1. The third line memory M3 starts to store the sixth line data 6 while outputting the second line data 2. The fourth line memory M4 starts to store the seventh line data 7 while outputting the third line data 3. The first line memory M1 starts to store the eighth line data 8 while outputting the fourth line data 4.

After the sixth line data 6 is output from the third line memory M3, the fourth line data 4 is output from the first line memory M1. The sixth line data 6 is synchronized with a fifth gate pulse, and the fourth line data 4 is synchronized with a sixth gate pulse. Subsequently, after the seventh line data 7 is output from the fourth line memory M4, the fifth line data 5 is output from the second line memory M2. The seventh line data 7 is synchronized with a seventh gate pulse, and the fifth line data 5 is synchronized with an eighth gate pulse and so on.

FIGS. 9 to 12 show a charge order of a pixel array and a polarity of a data voltage according to a second embodiment of the disclosure.

Referring to FIGS. 9 and 10, during two horizontal periods 2H, in which data voltages having the same polarity are successively output from the source driver IC, a W subpixel is charged to a W data voltage, and then subpixels of other colors except the W subpixel are charged in order of a B subpixel, a R subpixel, and a G subpixel.

A W subpixel W13 is disposed on a (K+1)-th row line L1 of the display panel 100, where K is zero and a positive integer. A B subpixel B33 is disposed on a (K+3)-th row line L3 of the display panel 100; an R subpixel R23 is disposed on a (K+2)-th row line L2 of the display panel 100; and a G subpixel G43 is disposed on a (K+4)-th row line L4 of the display panel 100.

The W subpixel W13 includes a first TFT T21, which supplies a W data voltage supplied through a J-th data line S3 to a first pixel electrode P21 in response to a first gate pulse supplied through an I-th gate line G4, where I and J are a positive integer. The first TFT T21 includes a gate connected to the I-th gate line G4 to which the first gate pulse is supplied, a drain connected to the J-th data line S3, and a source connected to the first pixel electrode P21.

The B subpixel B33 includes a second TFT T22, which supplies a B data voltage supplied through the J-th data line S3 to a second pixel electrode P22 in response to a second gate pulse supplied through an (I+1)-th gate line G5. The second TFT T22 includes a gate connected to the (I+1)-th gate line G5 to which the second gate pulse is supplied, a drain connected to the J-th data line S3, and a source connected to the second pixel electrode P22.

The R subpixel R23 includes a third TFT T23, which supplies a R data voltage supplied through the J-th data line S3 to a third pixel electrode P23 in response to a third gate pulse supplied through an (I+2)-th gate line G6. The third TFT T23 includes a gate connected to the (I+2)-th gate line G6 to which the third gate pulse is supplied, a drain connected to the J– the data line S3, and a source connected to the third pixel electrode P23.

A G subpixel G43 includes a fourth TFT T24, which supplies a G data voltage supplied through the J-th data line S3 to a fourth pixel electrode P24 in response to a fourth gate pulse supplied through an (I+3)-th gate line G7. The fourth TFT T24 includes a gate connected to the (I+3)-th gate line G7 to which the fourth gate pulse is supplied, a drain connected to the J-th data line S3, and a source connected to the fourth pixel electrode P24.

Figure 11:
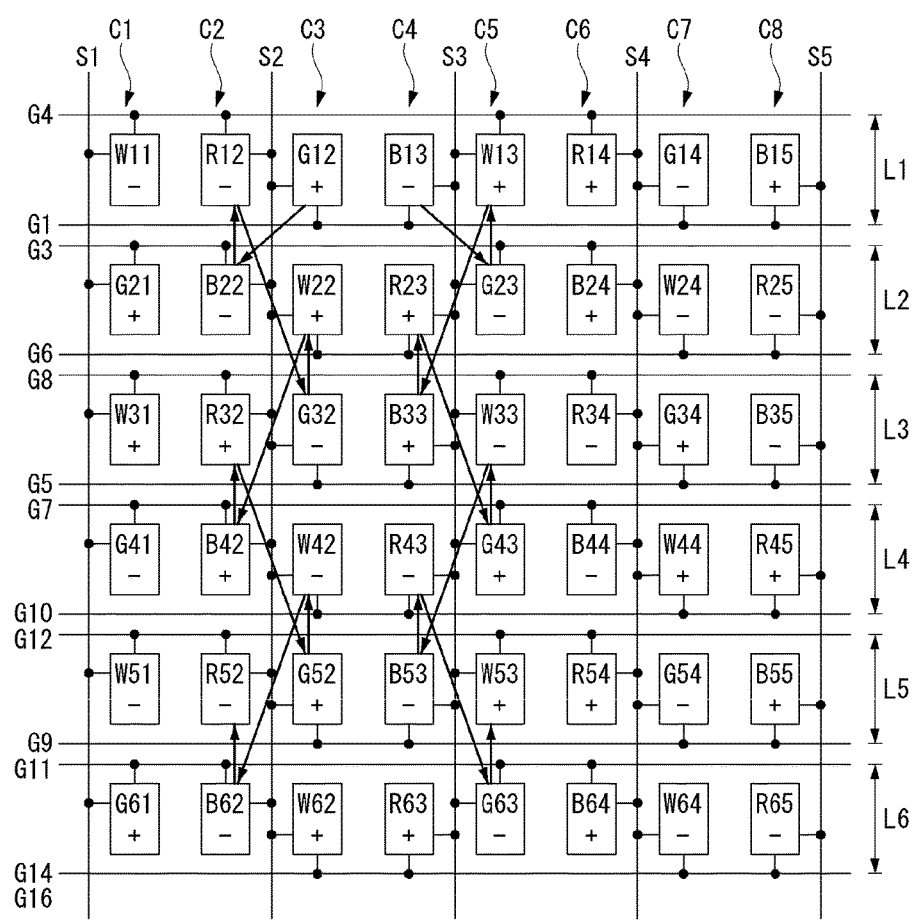

In FIGS. 10 and 11, "L1 to L6" indicate the row lines of the display panel 100, and "C1 to C8" indicate the column lines of the display panel 100. "WXY" is the W subpixels of X-th row lines L1 to L6 connected to Y-th data lines S1 to S4; "RXY" is the R subpixels of the X-th row lines L1 to L6 connected to the Y-th data lines S1 to S4; "GXY" is the G subpixels of the X-th row lines L1 to L6 connected to the Y-th data lines S1 to S4; and "BXY" is the B subpixels of the X-th row lines L1 to L6 connected to the Y-th data lines S1 to S4.

Figure 12:
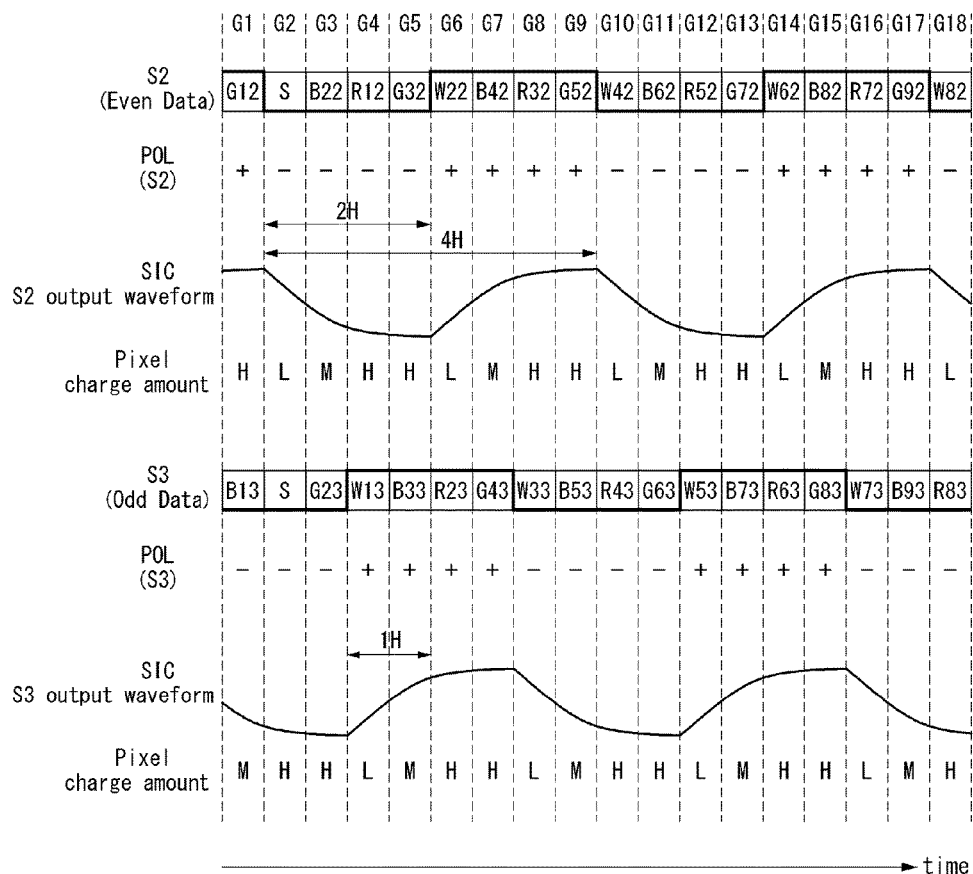

In FIG. 12, "S3(Odd Data)" indicates RGBW data output through the third data line S3, and "S2(Even Data)" indicates RGBW data output through the second data line S2.

Referring to FIGS. 9 to 12, the source driver IC outputs the data voltages of four colors having the same polarity in order of the W data voltage, the B data voltage, the R data voltage, and the G data voltage during two horizontal periods 2H. Thus, after the W subpixel is charged to the W data voltage, the B, R, and G subpixels are respectively charged to the B data voltage, the R data voltage, and the G data voltage in the order named. In all of the pixels of the pixel array, the polarity inversion of the data voltage is generated only in the W data voltage.

The gate driver 104 sequentially outputs a gate pulse synchronized with the W data voltage, a gate pulse synchronized with the R data voltage, a gate pulse synchronized with the B data voltage, and a gate pulse synchronized with the G data voltage. The W subpixel W13 of the first row line L1, the B subpixel R33 of the third row line L3, the R subpixel W23 of the second row line L2, and the G subpixel W43 of the fourth row line L4 are respectively charged to the W, B, R, and G data voltages having the same polarity in the order named due to the crossing structure of the link lines 31.

The W, R, G, and B subpixels are disposed from the left on the odd-numbered row lines L1, L3, and L5 in the order named, and the G, B, W, and R subpixels are disposed from the left on the even-numbered row lines L2, L4, and L6 in the order named. Thus, the W subpixels are disposed at crossings of (4i+1)-th column lines C1 and C5 and the odd-numbered row lines L1, L3, and L5, where "i" is zero and a positive integer. The G subpixels are disposed at crossings of the (4i+1)-th column lines C1 and C5 and the even-numbered row lines L2, L4, and L6. The R subpixels are disposed at crossings of (4i+2)-th column lines C2 and C6 and the odd-numbered row lines L1, L3, and L5. The B subpixels are disposed at crossings of the (4i+2)-th column lines C2 and C6 and the even-numbered row lines L2, L4, and L6. The G subpixels are disposed at crossings of (4i+3)-th column lines C3 and C7 and the odd-numbered row lines L1, L3, and L5. The W subpixels are disposed at crossings of the (4i+3)-th column lines C3 and C7 and the even-numbered row lines L2, L4, and L6. The B subpixels are disposed at crossings of (4i+4)-th column lines C4 and C8 and the odd-numbered row lines L1, L3, and L5. The R subpixels are disposed at crossings of the (4i+4)-th column lines C4 and C8 and the even-numbered row lines L2, L4, and L6.

The timing controller 20 transmits second line data and dummy data S to the source driver IC during a first horizontal period. The second line data is RGBW data, which will be supplied to some (for example, G12, B13, G14, and B15) of the subpixels of the first row line L1 shown in FIG. 11. The source driver IC outputs a data voltage of the second line data and a data voltage of the dummy data S to the data lines S1 to S5 in synchronization with first and second gate pulses. The dummy data S is not written on the pixel array because the second gate pulse is not supplied to the pixel array. The timing controller 20 transmits first line data and third line data to the source driver IC during a second horizontal period. The third line data is RGBW data, which will be supplied to some (for example, G21, B22, G23, and B24) of the subpixels of the second row line L2 shown in FIG. 11. The first line data is RGBW data, which will be supplied to some (for example, W11, R12, W13, and R14) of the subpixels of the first row line L1 shown in FIG. 11. The source driver IC outputs a data voltage of the third line data to the data lines S1 to S5 in synchronization with a third gate pulse and then outputs a data voltage of the first line data to the data lines S1 to S5 in synchronization with a fourth gate pulse. The timing controller 20 transmits fourth line data and sixth line data to the source driver IC during a third horizontal period. The sixth line data is RGBW data, which will be supplied to some (for example, G32, B33, G34, and B35) of the subpixels of the third row line L3 shown in FIG. 11. The fourth line data is RGBW data, which will be supplied to some (for example, W22, R23, W24, and R25) of the subpixels of the second row line L2 shown in FIG. 11. The source driver IC outputs a data voltage of the sixth line data to the data lines S1 to S5 in synchronization with a fifth gate pulse and then outputs a data voltage of the fourth line data to the data lines S1 to S5 in synchronization with a sixth gate pulse.

When the R, G, B, and W data voltages have the same voltage magnitude, the W subpixel is charged to a data voltage generated at a reverse polarity of a previous data voltage. Therefore, a charge amount of the W subpixel is less than the subpixels of other colors. Thus, the W subpixel is a low charge subpixel "L", and the B subpixel is a middle charge subpixel "M", in which a charge amount of the data voltage is more than the W subpixel. The R subpixel and the G subpixel have the same charge amount and are high charge subpixels "H", in which a charge amount of the data voltage is more than the B subpixel. There is little difference between the charge amount of the B subpixel and the charge amount of the R or G subpixel. As shown in FIG. 12, because the positive data voltages and the negative data voltages of the subpixels of the same color are balanced in the horizontal and vertical directions, the common voltage Vcom is not shifted. Therefore, the embodiment of the disclosure may prevent a luminance difference between the lines. If the W subpixels corresponding to the low charge subpixel are adjacently positioned, a luminance difference in a formation portion of the W subpixels may be recognized. However, the embodiment of the disclosure separates the W subpixels from each other by a distance equal to or greater than two dots and thus can prevent a luminance reduction resulting from the W subpixels. Thus, the display device according to the embodiment of the disclosure can reduce the power consumption by adding the W subpixel to each pixel and also may implement the image quality, in which there is no color distortion and no luminance difference between the lines, by balancing the charge characteristics and the polarity distributions of the RGB subpixels.

The display device according to the embodiment of the disclosure differently adjusts polarity inversion time points of the adjacent column lines and thus can prevent a luminance difference between the adjacent column lines. The polarity inversion time point of the data voltages supplied to the odd-numbered data lines S1 and S3 and the polarity inversion time point of the data voltages supplied to the even-numbered data lines S2 and S4 may have a difference of one horizontal period 1H.

If the subpixels of the same color each have a different charge amount, the gamma characteristics of the subpixels of the same color cannot be compensated at once. On the other hand, because the subpixels of the same color have the same charge amount in the embodiment of the disclosure, the gamma characteristics of the subpixels of each color can be compensated at once. As shown in FIG. 13, a gamma curve of the W data to be written on the W subpixels is set to be higher than gamma curves of data of other colors, and thus the low charge amount of the W subpixels can be compensated at once. A gamma curve of the B data to be written on the B subpixels is lower than the gamma curve of the W data and is higher than gamma curves of the R data and the G data. Because the R and G subpixels have the same charge amount, the gamma curves of the R data and the G data are the same as each other.

The data voltage charge order of the pixel array shown in FIGS. 9 to 12 is different from data input order of the input image. Because of this, the timing controller 20 needs to change data transmission order of the input image on a per row line basis in accordance with the data voltage charge order of the pixel array shown in FIGS. 9 to 12 in a data rearrangement process of the input image. Since the data rearrangement process of the timing controller 20 is substantially the same as FIG. 8, a further description may be briefly made or may be entirely omitted.

FIGS. 14A to 14G show various colors reproduced in the pixel array shown in FIG. 5.

Figure 14A:
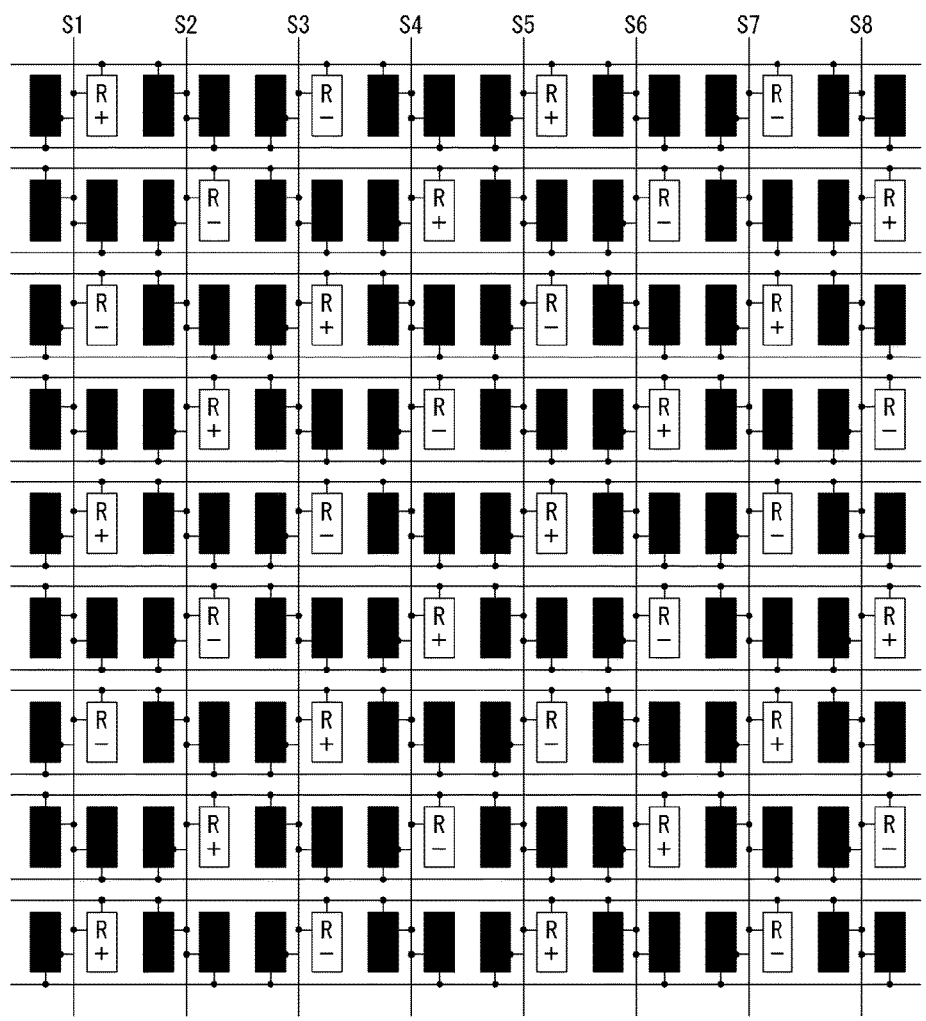
FIGS. 14A to 14G show various colors reproduced in a pixel array shown in FIG. 5.

As shown in FIG. 14A, when the red is displayed on the pixel array, a gray level of red data is 255, and the remaining gray levels are a black gray level of zero. Positive and negative polarities of the red subpixels are alternately disposed in the horizontal direction X and the vertical direction Y. Thus, the polarities of the red subpixels are not positively or negatively biased and are balanced. Because all of the red subpixels are charged to a data voltage charged from a black gray level data voltage, a charge amount of the red subpixels is small.

Figure 14B:
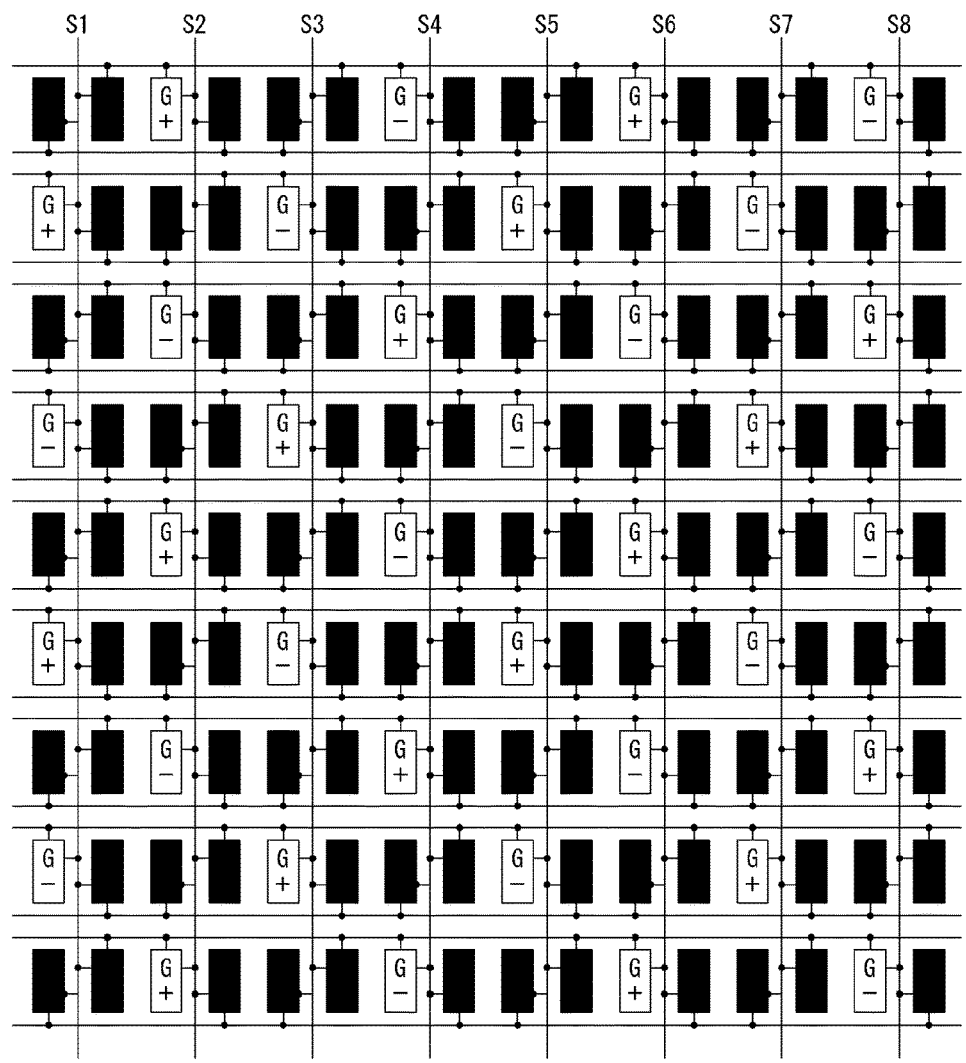

As shown in FIG. 14B, when the green is displayed on the pixel array, a gray level of green data is 255, and the remaining gray levels are the black gray level of zero. Positive and negative polarities of the green subpixels are alternately disposed in the horizontal direction X and the vertical direction Y. Thus, the polarities of the green subpixels are not positively or negatively biased and are balanced. Because all of the green subpixels are charged to a data voltage charged from the black gray level data voltage, a charge amount of the green subpixels is small.

Figure 14C:
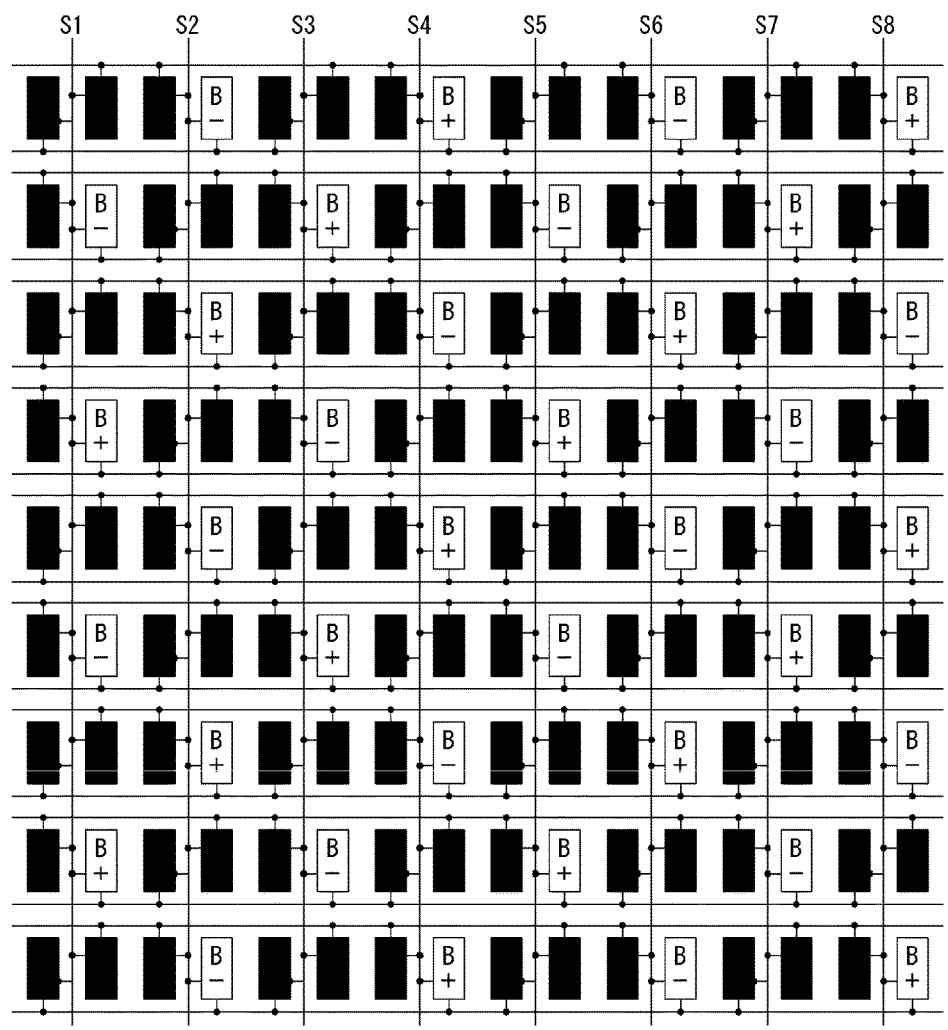

As shown in FIG. 14C, when the blue is displayed on the pixel array, a gray level of green data is 255, and the remaining gray levels are the black gray level of zero. Positive and negative polarities of the blue subpixels are alternately disposed in the horizontal direction X and the vertical direction Y. Thus, the polarities of the blue subpixels are not positively or negatively biased and are balanced. Because all of the blue subpixels are charged to a data voltage charged from the black gray level data voltage, a charge amount of the blue subpixels is small.

Figure 14D:
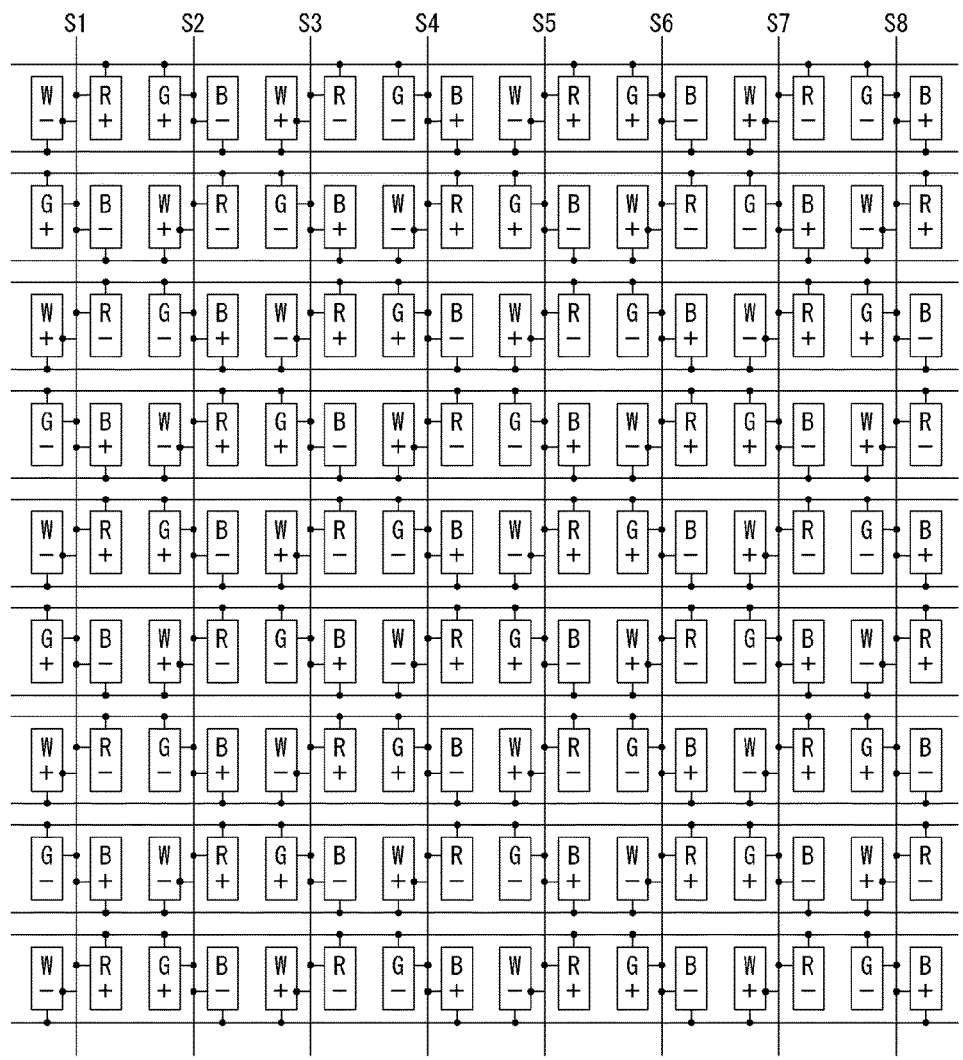

As shown in FIG. 14D, when the white is displayed on the pixel array, a gray level of each of the R, G, B, and W data is 255. In this instance, the subpixels are charged to the data voltages of other colors subsequent to the W data voltage in accordance with the charge order of the data voltages having the same polarity. Therefore, a charge amount of all of the W subpixels is less than the subpixels of other colors.

Figure 14E:
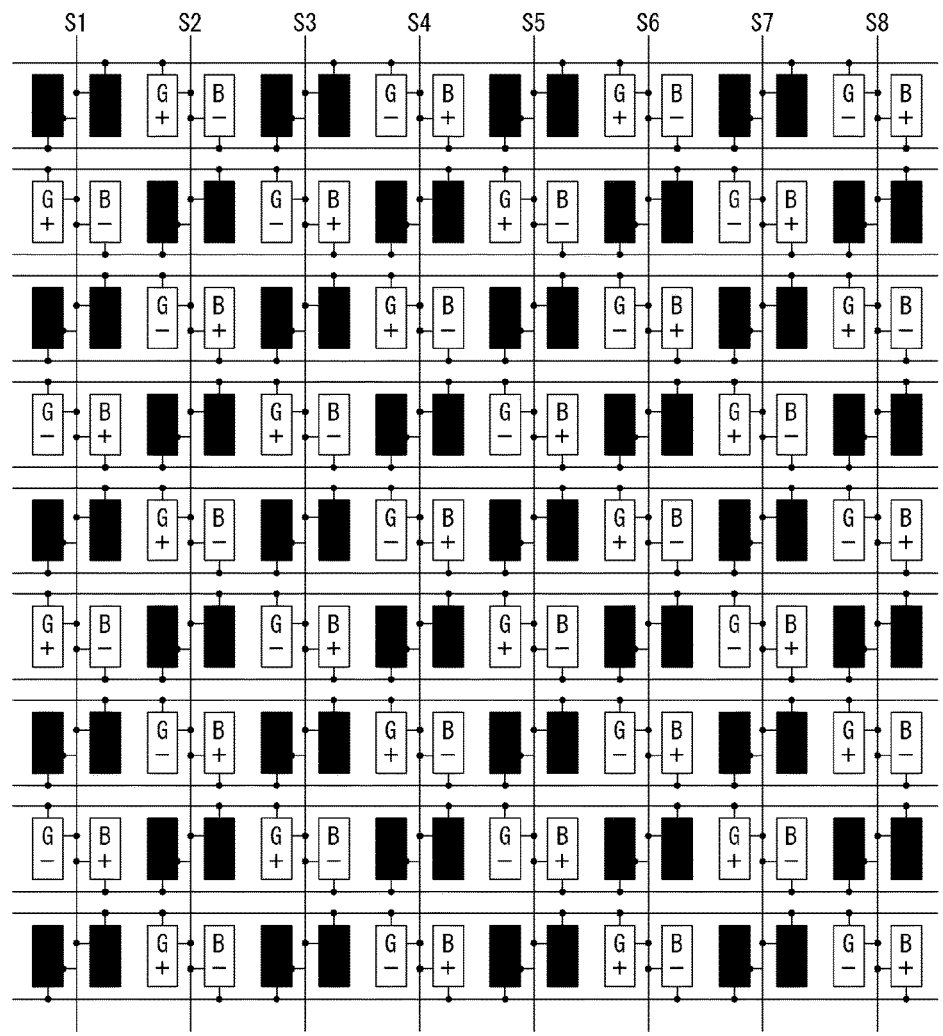

As shown in FIG. 14E, when the cyan is displayed on the pixel array, a gray level of each of green data and blue data is 255, and the remaining gray levels are the black gray level of zero. Positive and negative polarities of the green and blue subpixels are alternately disposed in the horizontal direction X and the vertical direction Y. Thus, the polarities of the green and blue subpixels are not positively or negatively biased and are balanced.

Figure 14F:
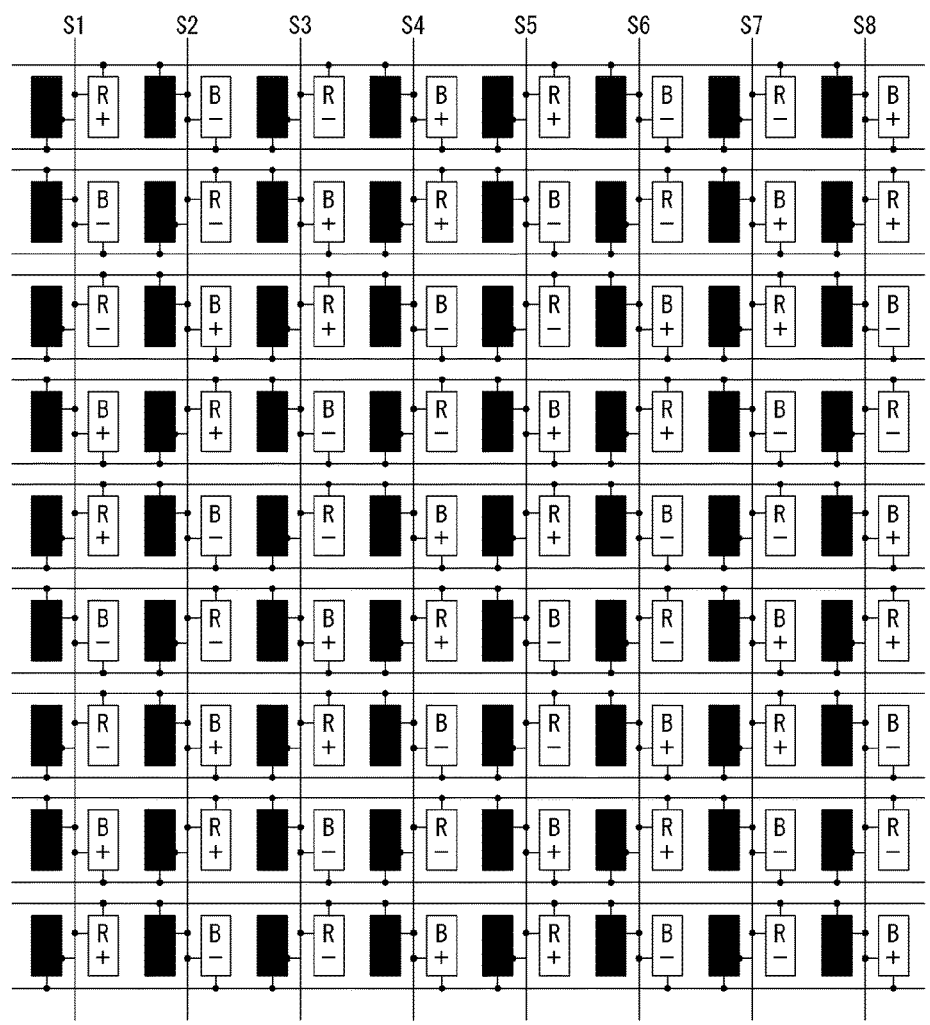

As shown in FIG. 14F, when the magenta is displayed on the pixel array, a gray level of each of red data and blue data is 255, and the remaining gray levels are the black gray level of zero. Positive and negative polarities of the red and blue subpixels are alternately disposed in the horizontal direction X and the vertical direction Y. Thus, the polarities of the red and blue subpixels are not positively or negatively biased and are balanced.

Figure 14G:
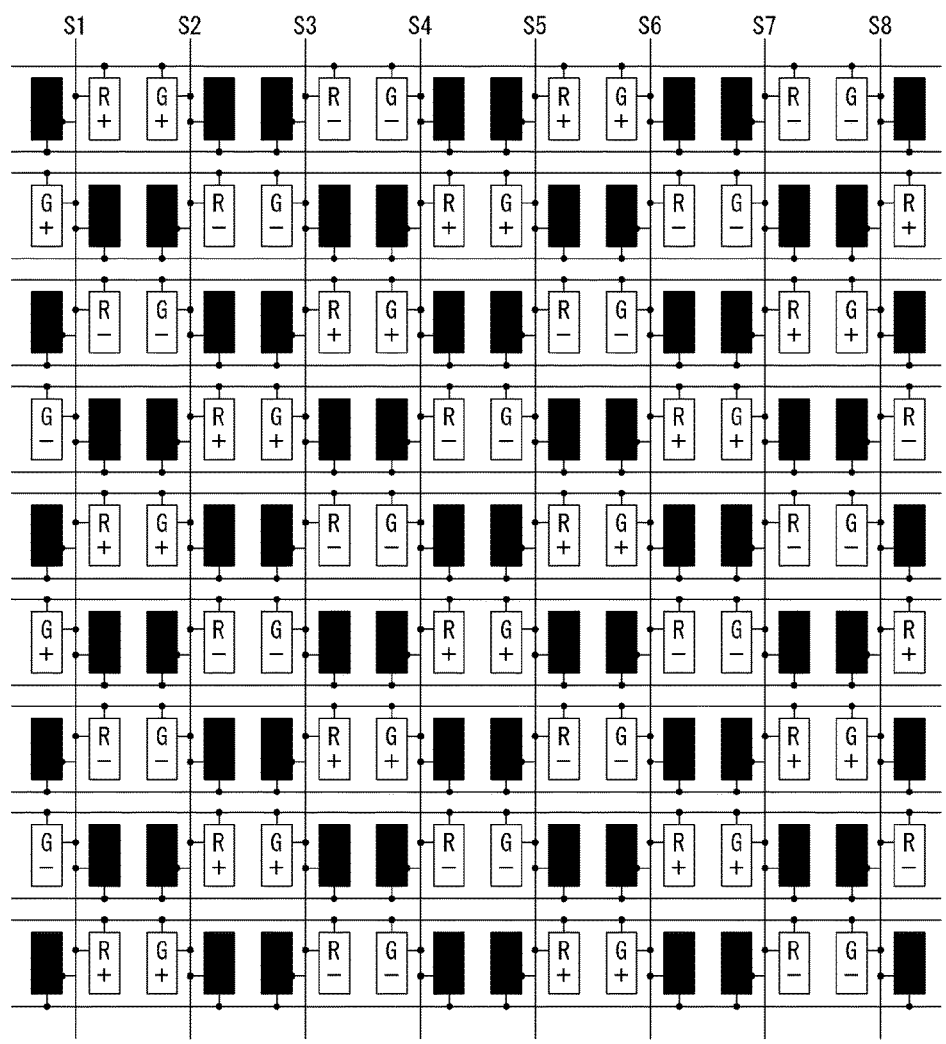

As shown in FIG. 14G, when the yellow is displayed on the pixel array, a gray level of each of red data and green data is 255, and the remaining gray levels are the black gray level of zero. Positive and negative polarities of the red and green subpixels are alternately disposed in the horizontal direction X and the vertical direction Y. Thus, the polarities of the red and green subpixels are not positively or negatively biased and are balanced.

As can be clearly seen from FIGS. 14A to 14G, in the display device according to the embodiment of the disclosure, because the polarities of each color of the pixel array are balanced, the common voltage Vcom is not shifted. Therefore, the horizontal crosstalk and the luminance difference between the lines can be prevented.

The structure of the pixel array according to the embodiment of the disclosure may be applied to a RGB type color display device not having W subpixels by changing the disposition of color filters as shown in FIGS. 15 to 17B.

Figure 15:
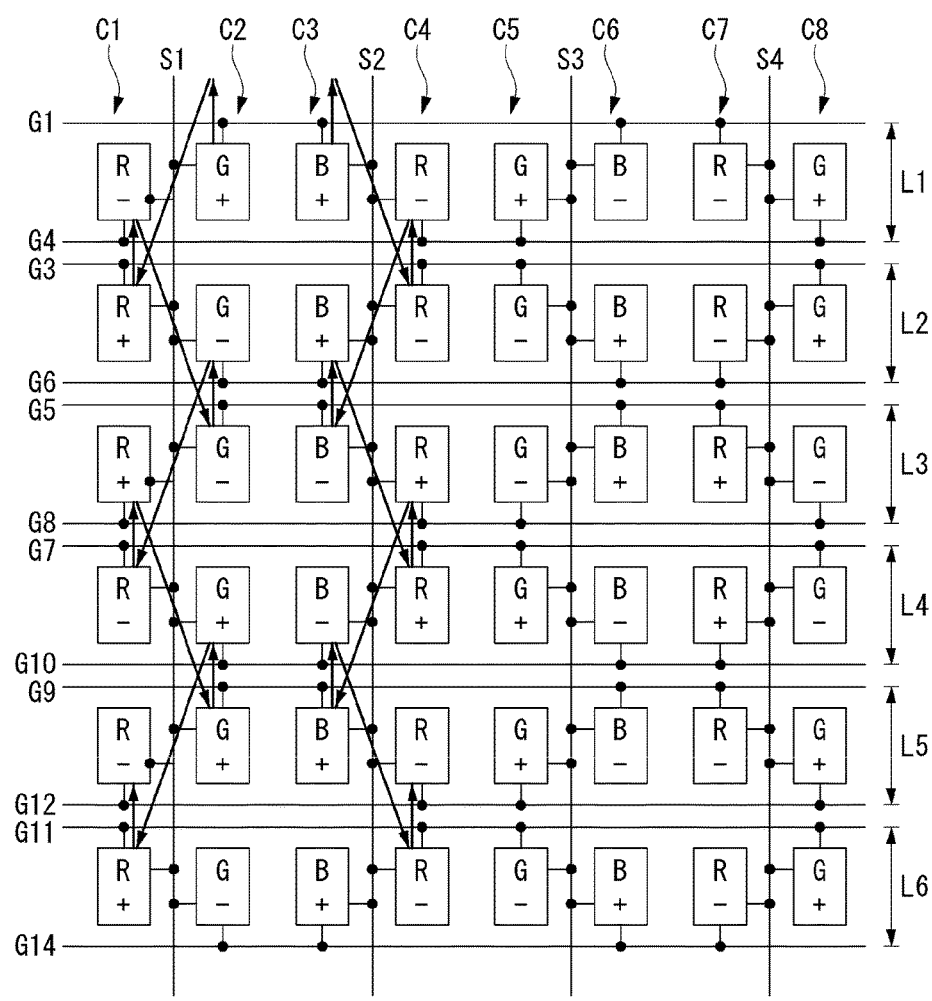
FIG. 15 shows an example where a structure of a pixel array according to an exemplary embodiment is applied to a RGB type color display device lacking W subpixels.

FIG. 15 shows an example where a structure of the pixel array according to the embodiment of the disclosure is applied to a RGB type color display device not having W subpixels. The structure of the pixel array of FIG. 15 is substantially the same as FIGS. 10 and 11 except the disposition of the color filters.

Figure 16A:
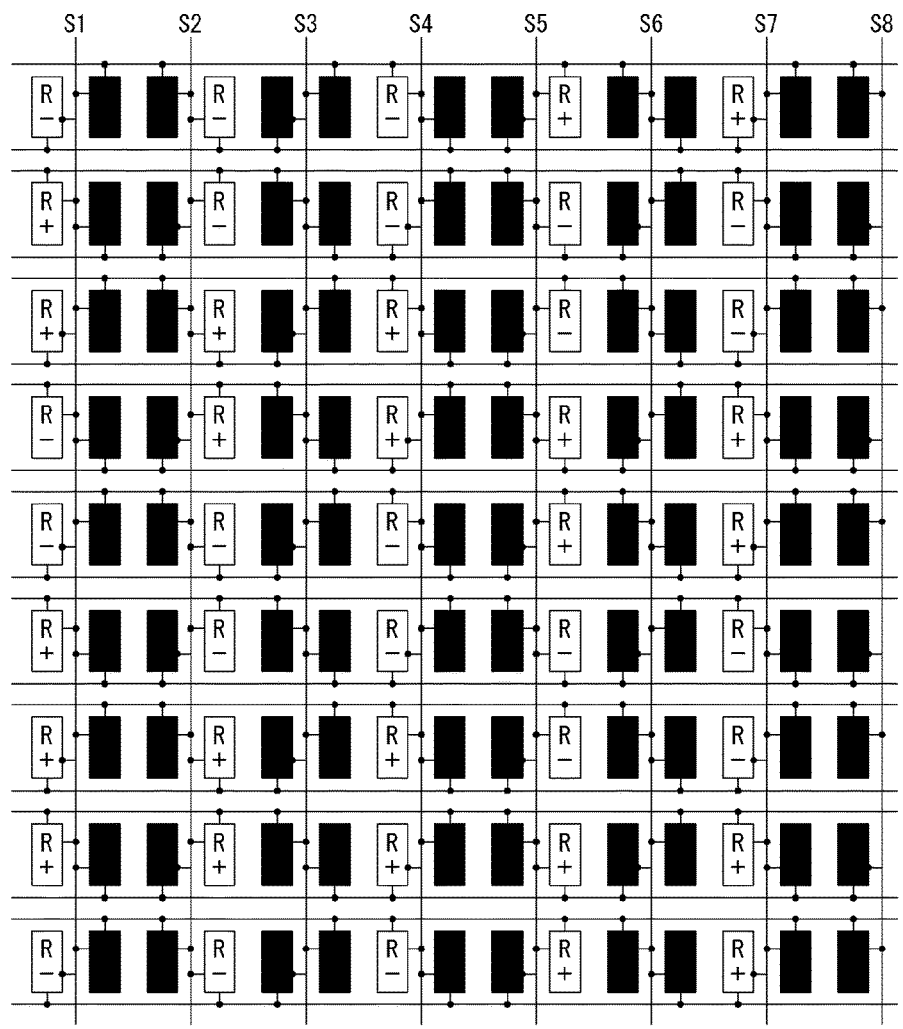
FIGS. 16A to 16F show various colors reproduced in an RGB type color display device shown in FIG. 15.
Figure 16B:
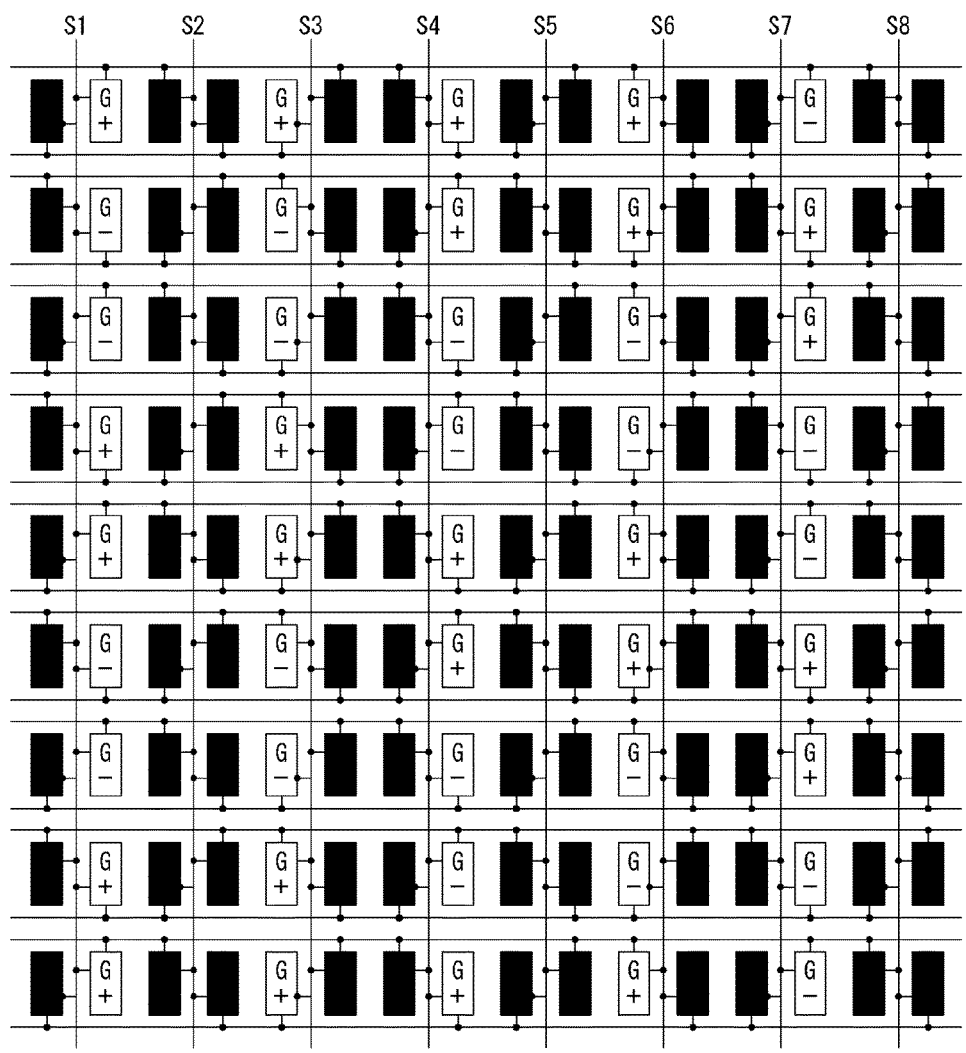
Figure 16C:
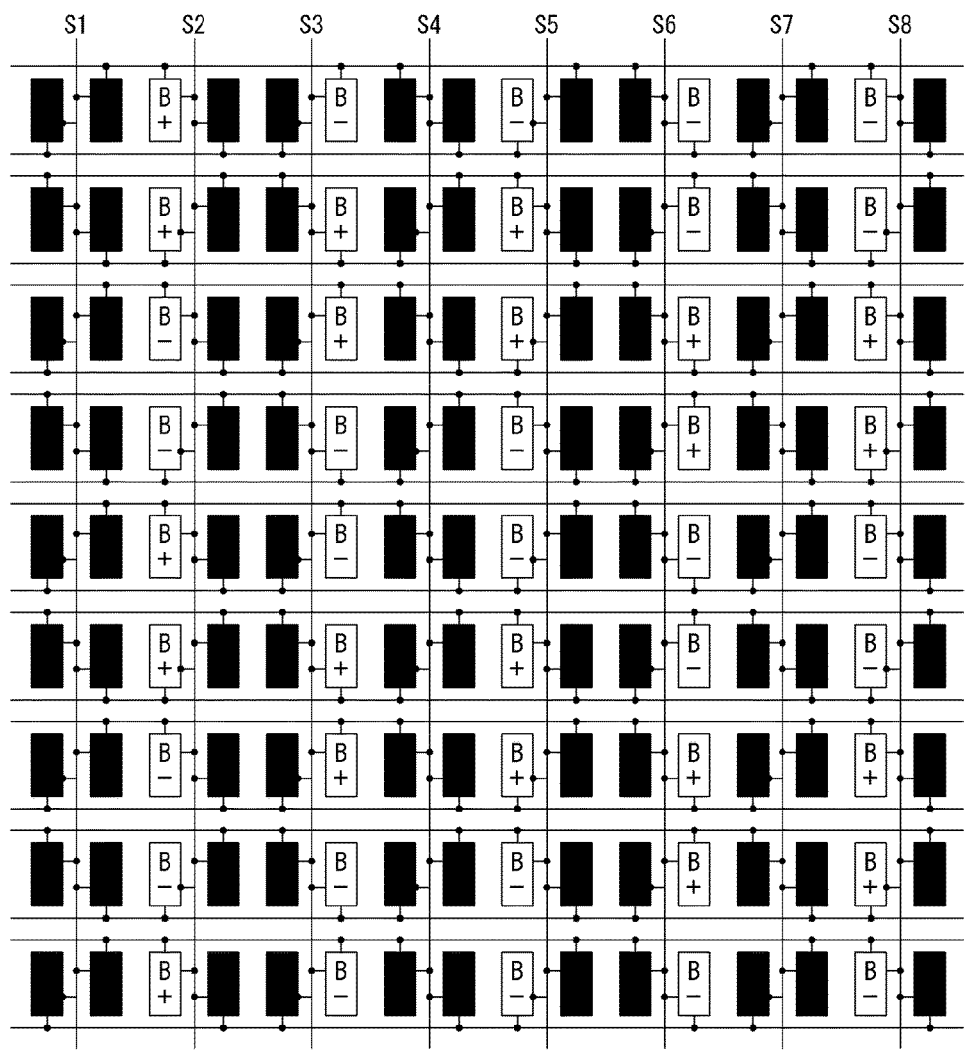
Figure 16D:
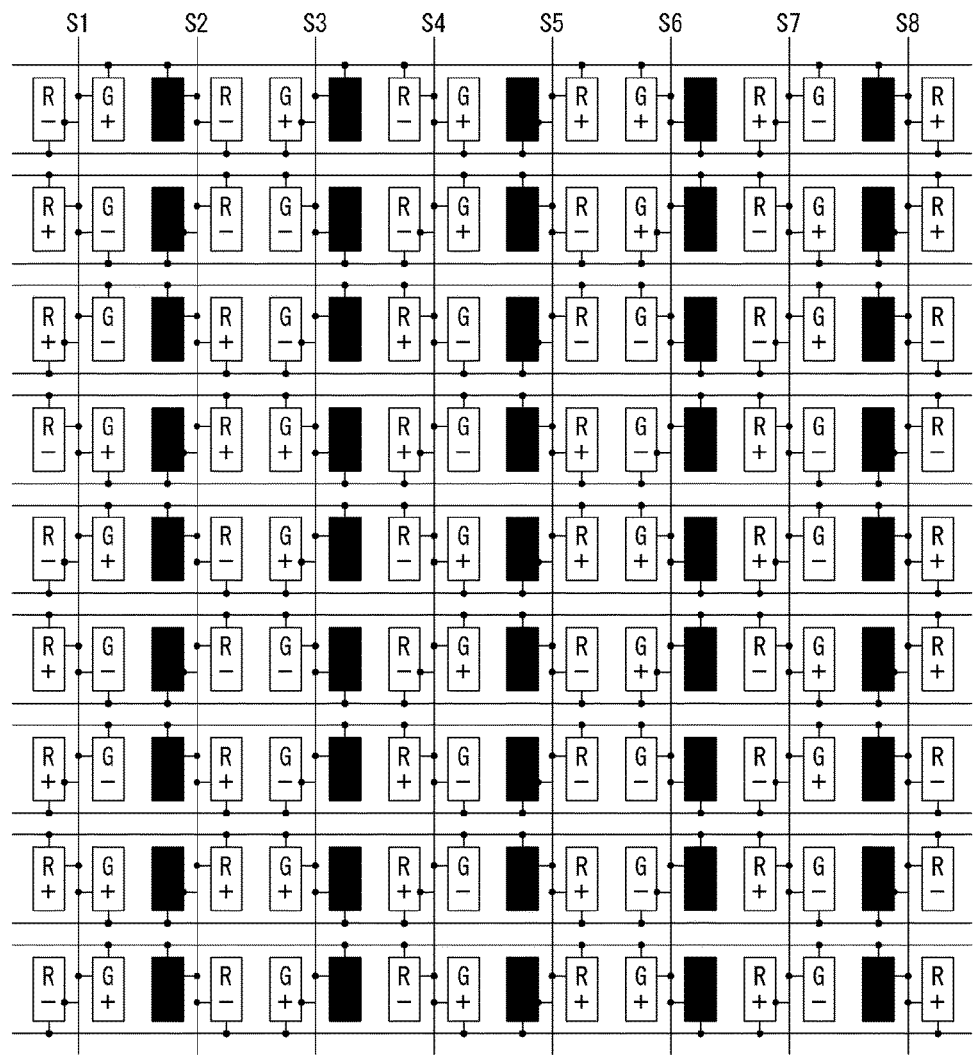
Figure 16E:
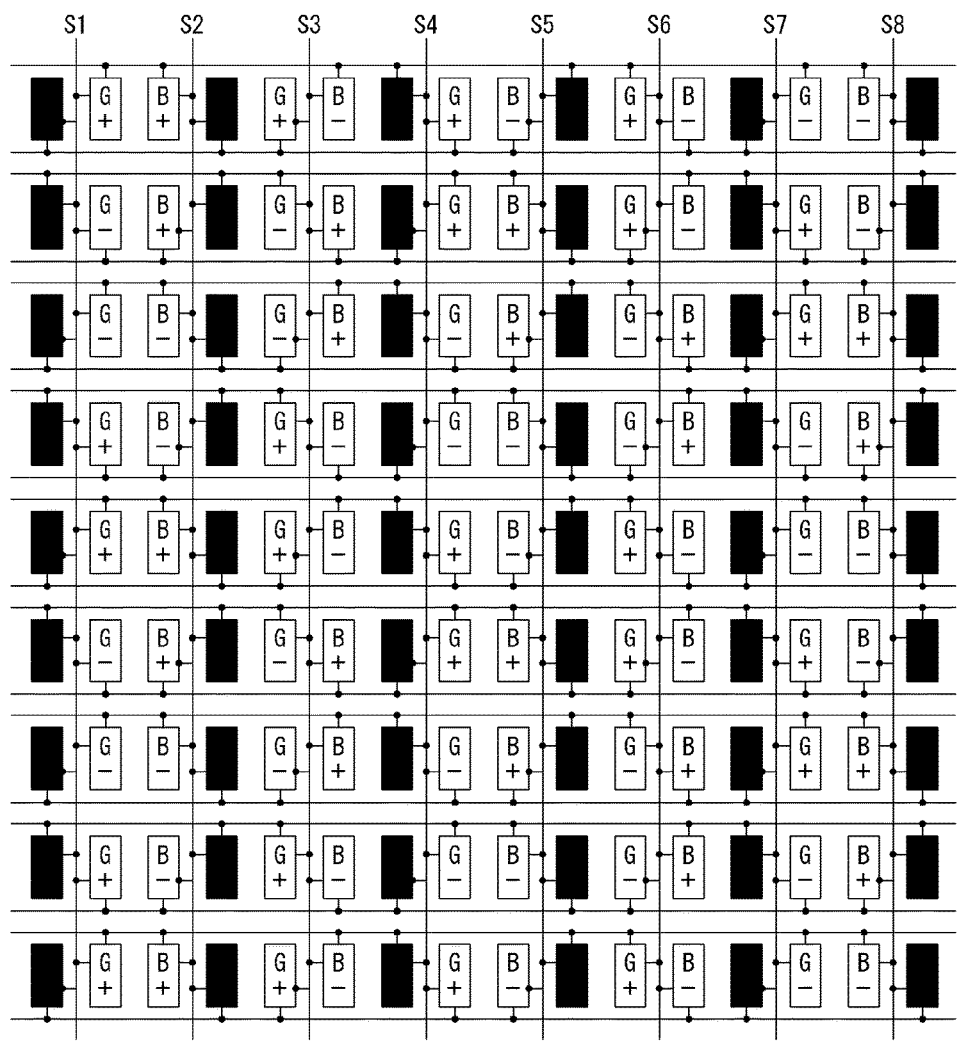
Figure 16F:
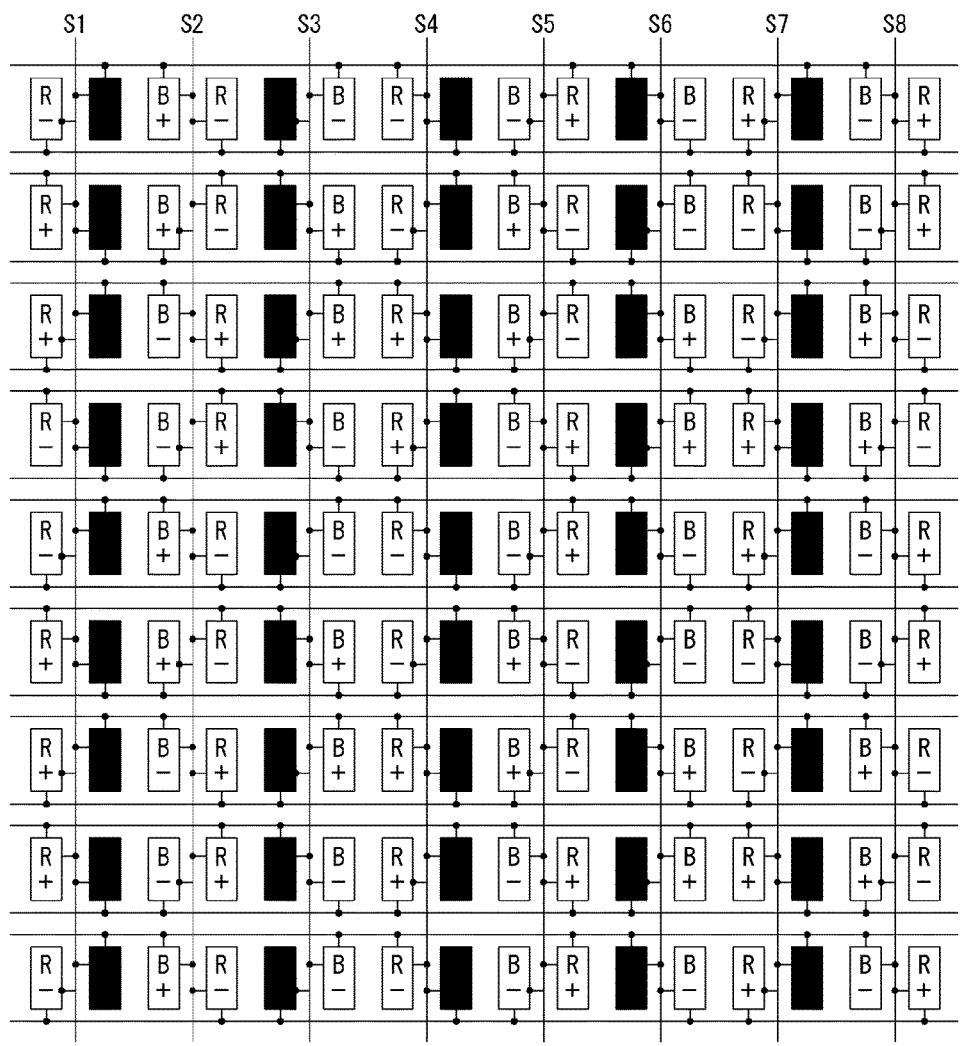

FIGS. 16A to 16F show various colors reproduced in the RGB type color display device shown in FIG. 15. For example, FIG. 16A shows red color, FIG. 16B shows green color, FIG. 16C shows blue color, FIG. 16D shows yellow color, FIG. 16E shows cyan color, and FIG. 16F shows magenta color. As can be seen from FIGS. 16A to 16F, when the structure of the pixel array according to the embodiment of the disclosure is applied to the RGB type color display device, the horizontal crosstalk is not generated because polarities of each color of the pixel array are balanced.

When a problem pattern, in which a white gray level and a black gray level are regularly repeated, is input as the input image, the polarities of the pixel array may be positively or negatively biased and unbalanced. In this instance, the voltage (i.e., the common voltage Vcom) of the common electrode coupled with the pixels is shifted to a predominant polarity direction, and the horizontal crosstalk may be generated. A method has been proposed to improve the bad image quality resulting from the problem pattern. In the method, types of problem patterns are previously stored in the timing controller. When data of a problem pattern is input to the input image, a polarity inversion cycle of the data voltage is changed or the common voltage Vcom is adaptively adjusted. The method for improving the image quality was disclosed in U.S. Pat. No. 8,232,950 (Jul. 31, 2012), U.S. Pat. No. 8,456,403 (Jun. 4, 2013), U.S. Pat. No. 8,803,780 (Aug. 12, 2014), etc.

In the above-described method for improving the image quality, the types of the problem patterns have to be previously stored in the timing controller, and a logic for comparing the stored problem patterns with the input image has to be embedded in the timing controller. Further, when various types of problem patterns are simultaneously displayed on one screen, it is difficult to improve the bad image quality through the above-described method in some of the problem patterns.

As shown in FIGS. 17A to 18B, when problem patterns are displayed on the pixel array, the display device according to the embodiment of the disclosure balances polarities of the pixel array through a method for virtually dividing the pixel array into a plurality of blocks and reversely inverting polarities of the adjacent blocks without changes in the structure of the pixel array. The method according to the embodiment of the disclosure does not need to add a logic for comparing the previously stored problem patterns with the input image to the timing controller.

Figure 17A:
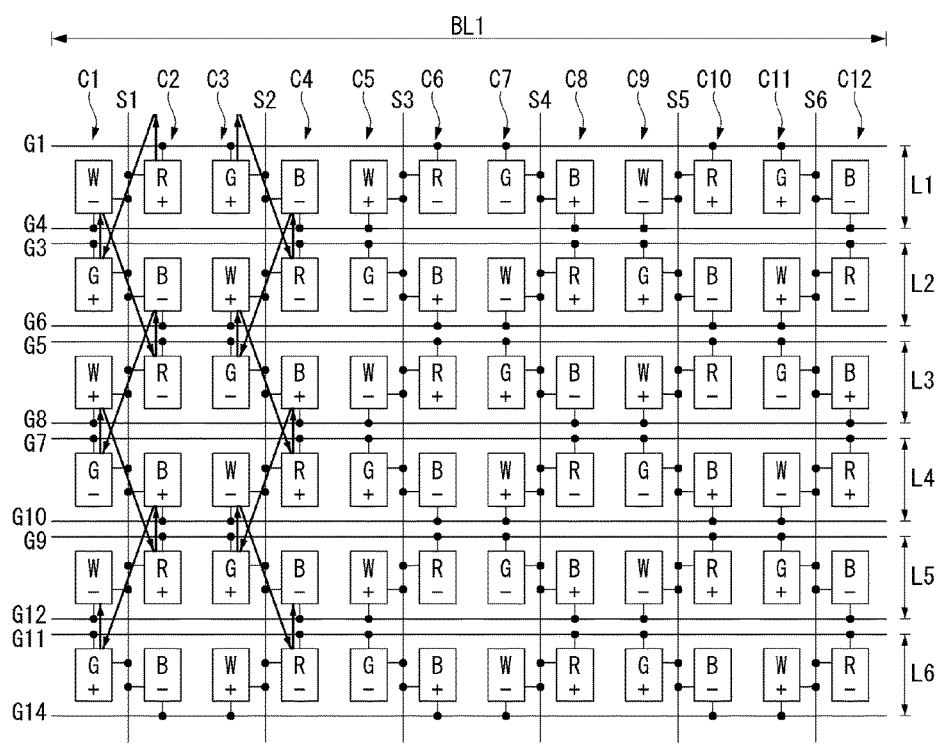
FIGS. 17A and 17B show an example where a pixel array of a RGBW type display device is divided into a plurality of blocks and polarity distributions of the adjacent blocks are reversed.
Figure 17B:
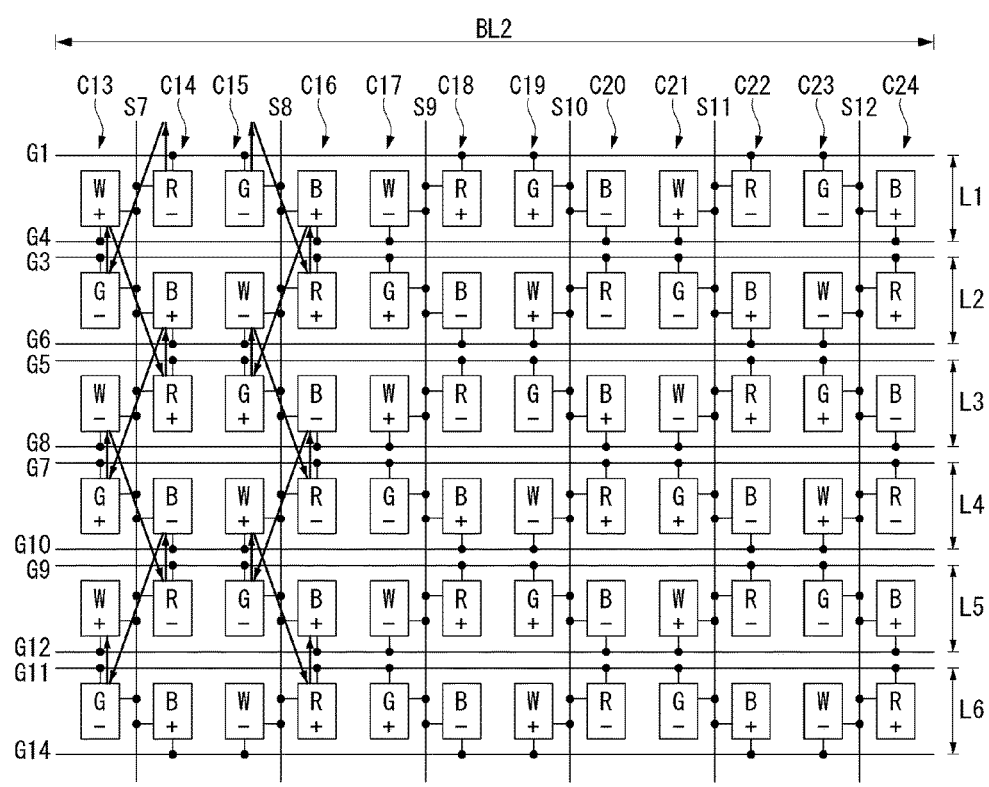
Figure 18A:
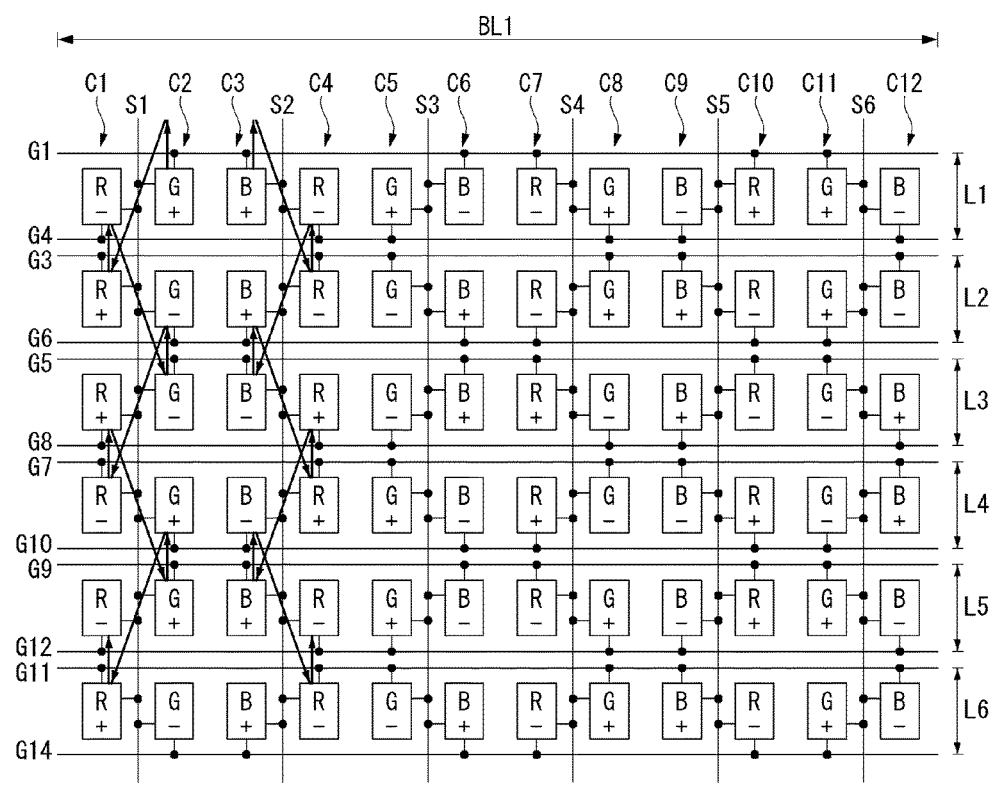
FIGS. 18A and 18B show an example where a pixel array of a RGB type display device is divided into a plurality of blocks and polarity distributions of the adjacent blocks are reversed.
Figure 18B:
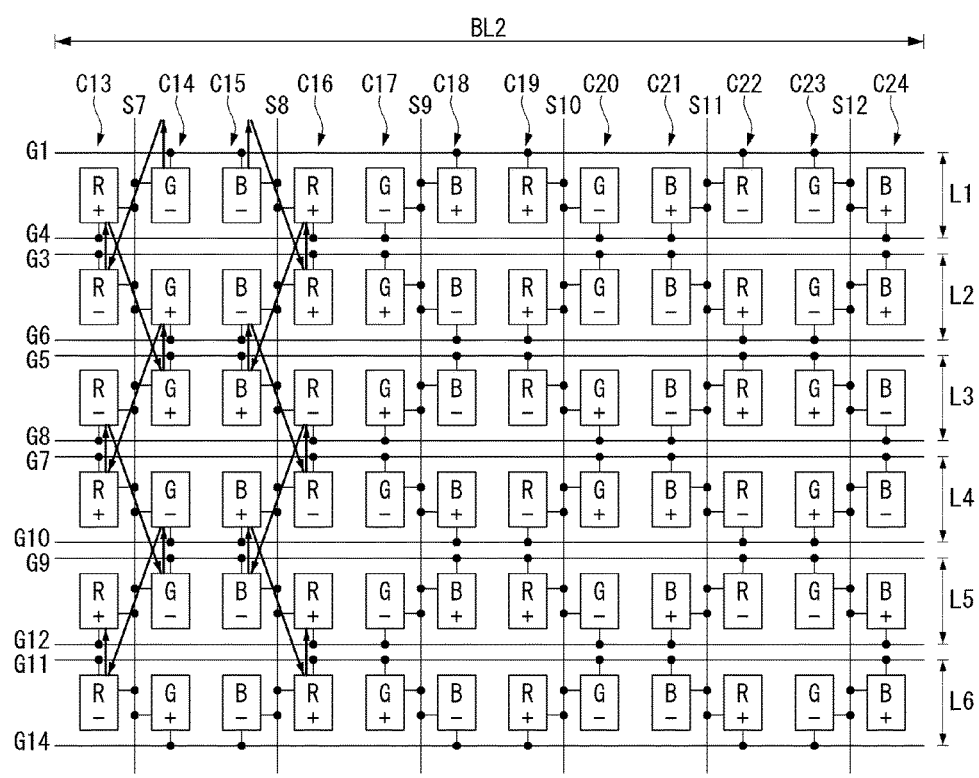
Figure 19A:
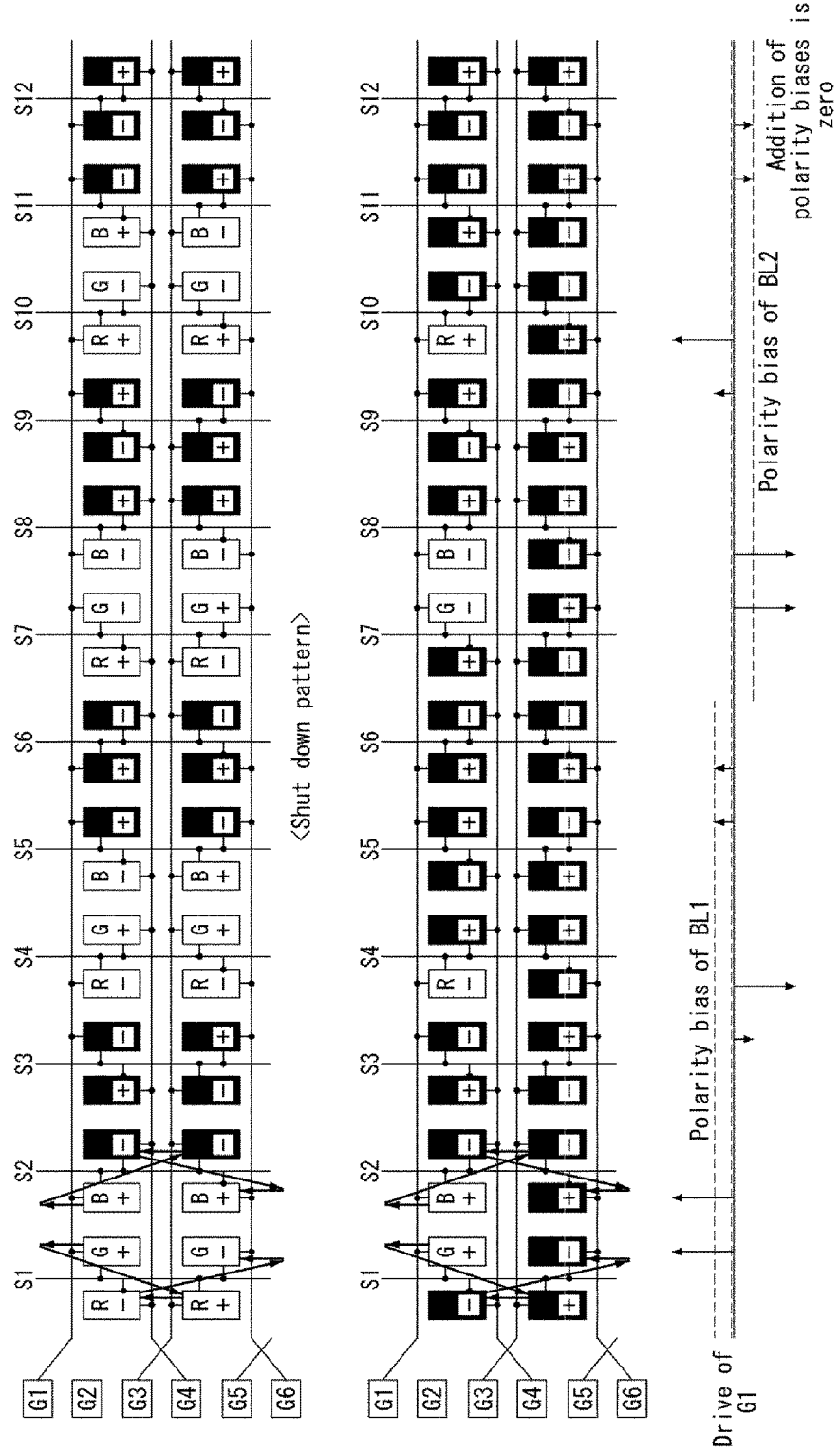
FIGS. 19A to 19D and 20A to 20D show two types of problem patterns as an example and show a polarity cancellation effect between first and second blocks.
Figure 19B:
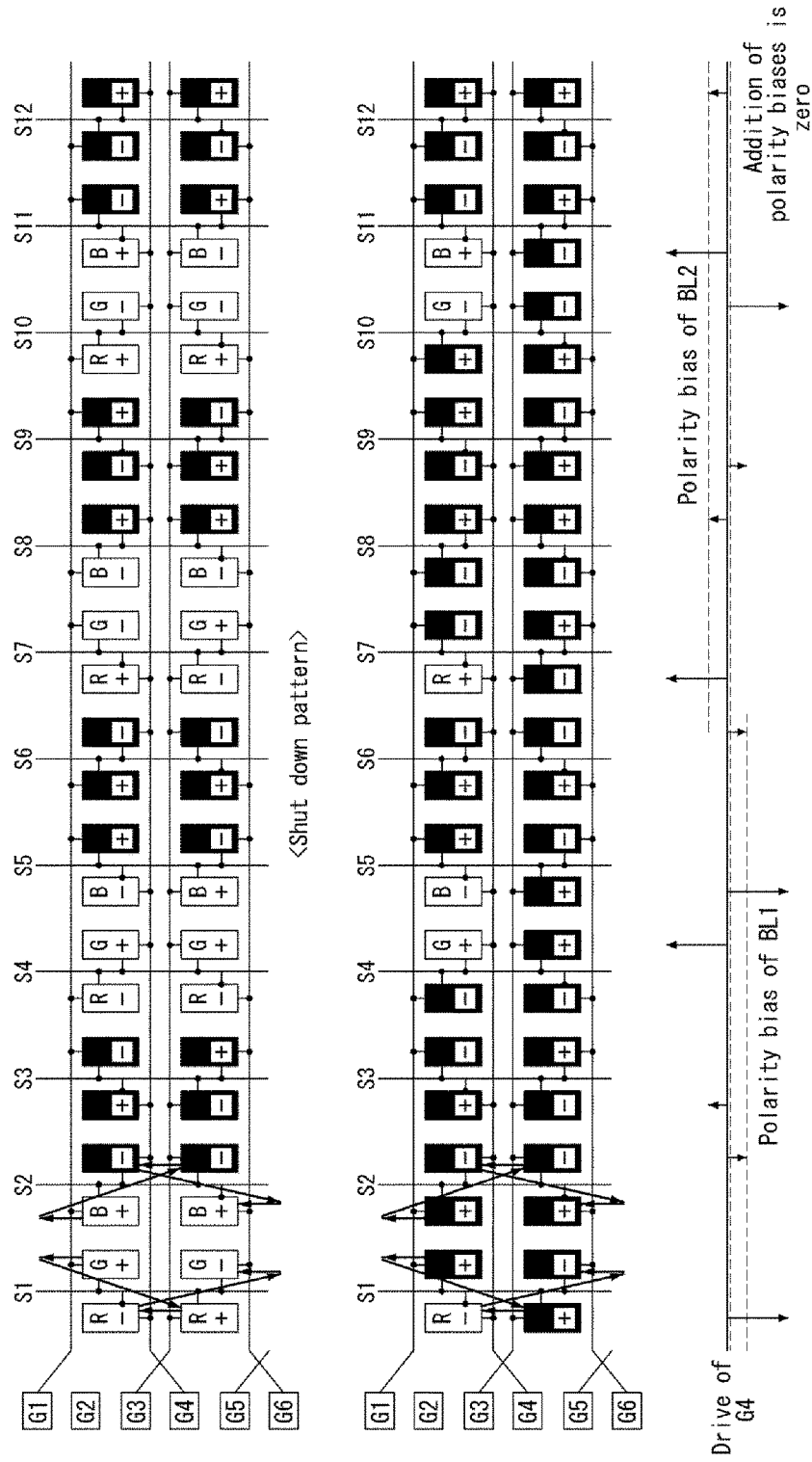
Figure 19C:
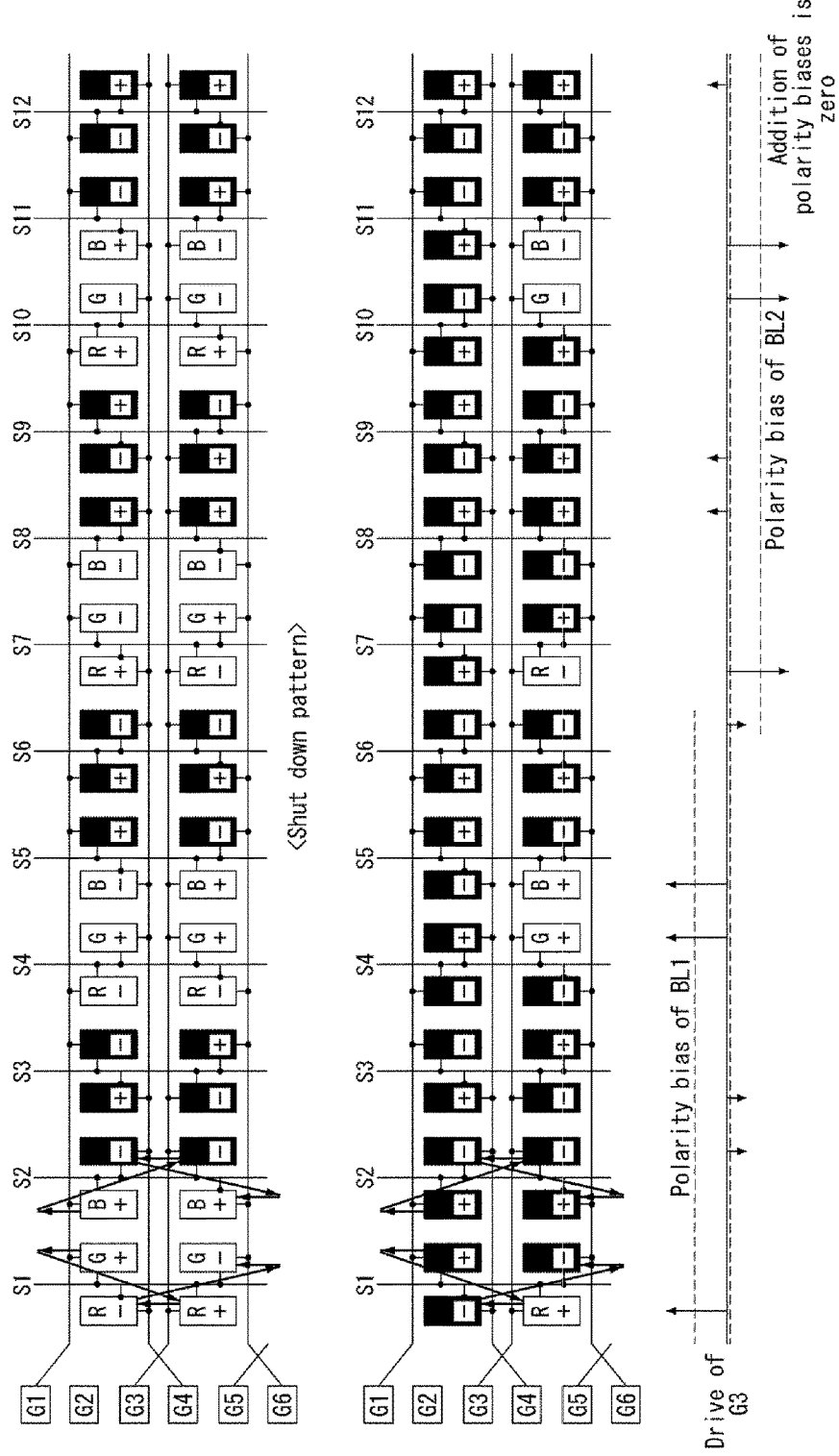
Figure 19D:
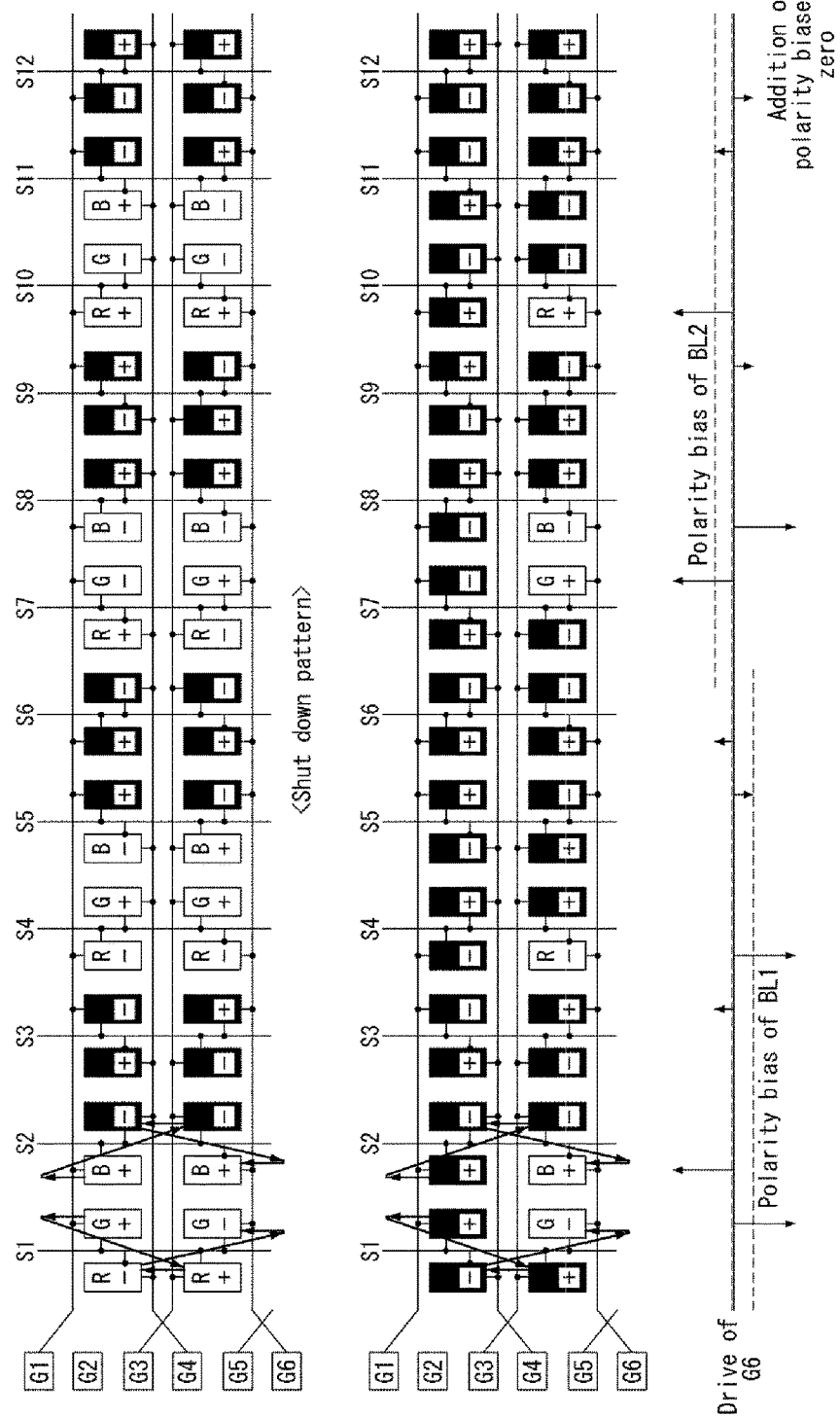
Figure 20A:
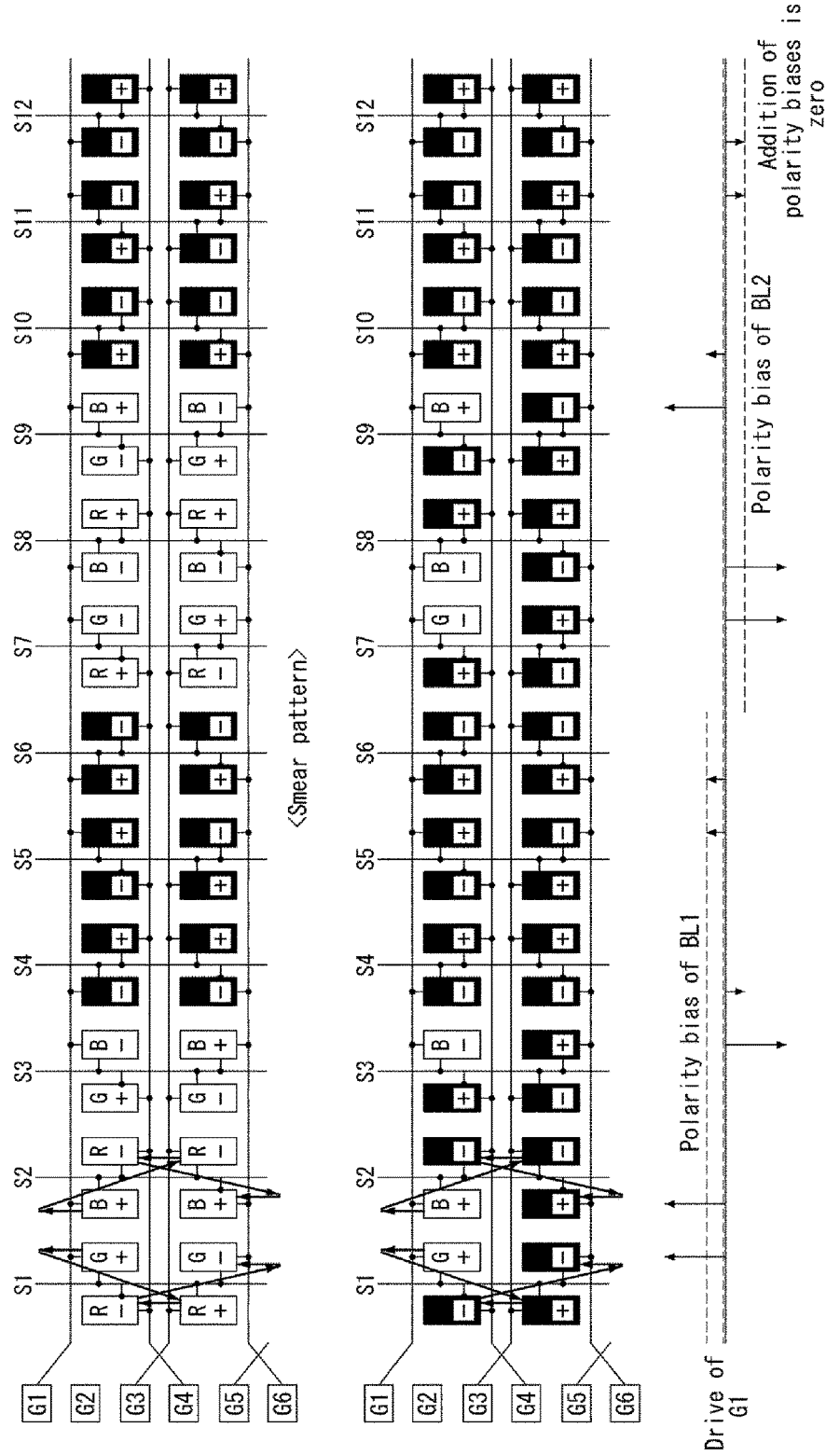
Figure 20B:
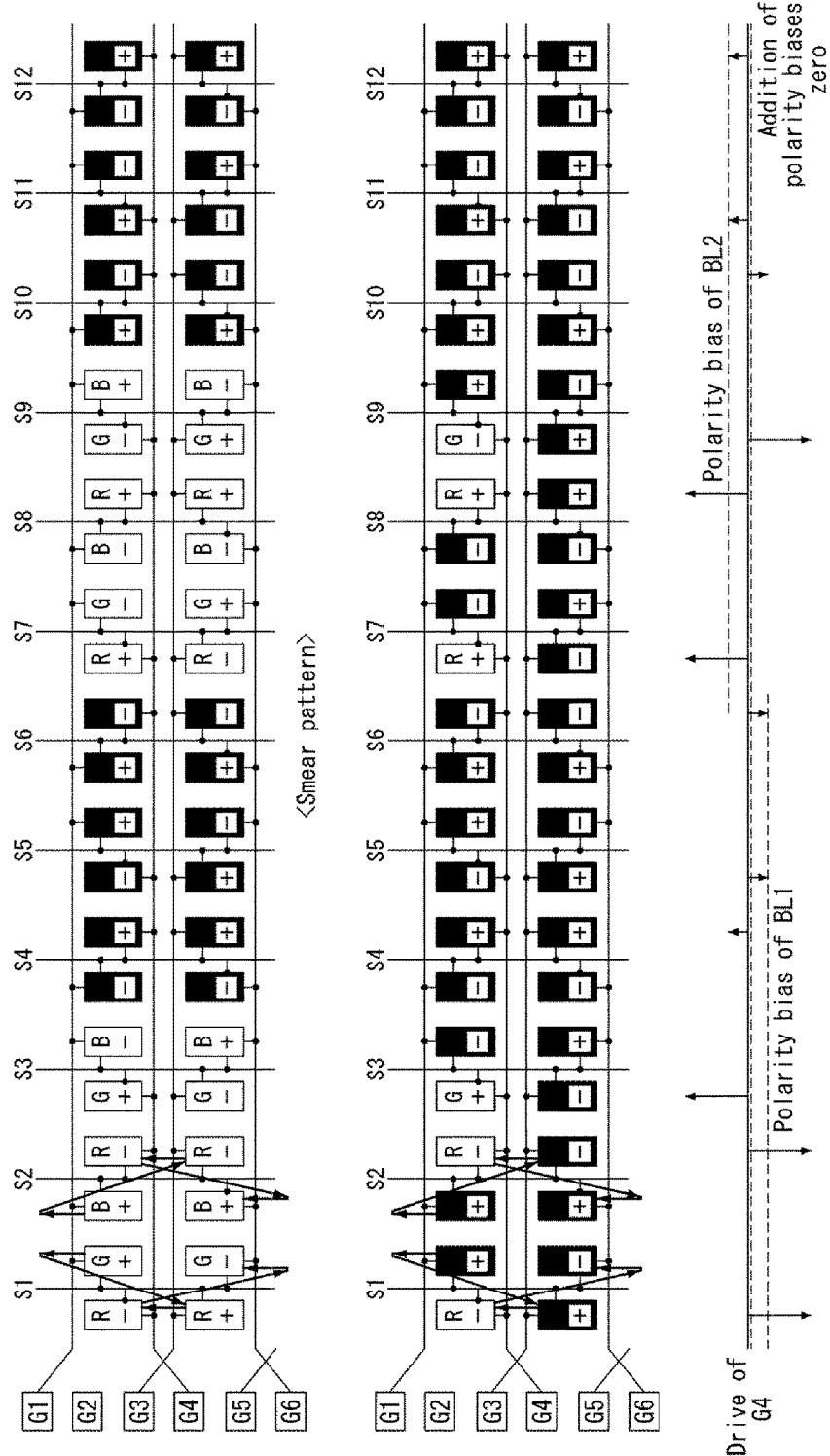
Figure 20C:
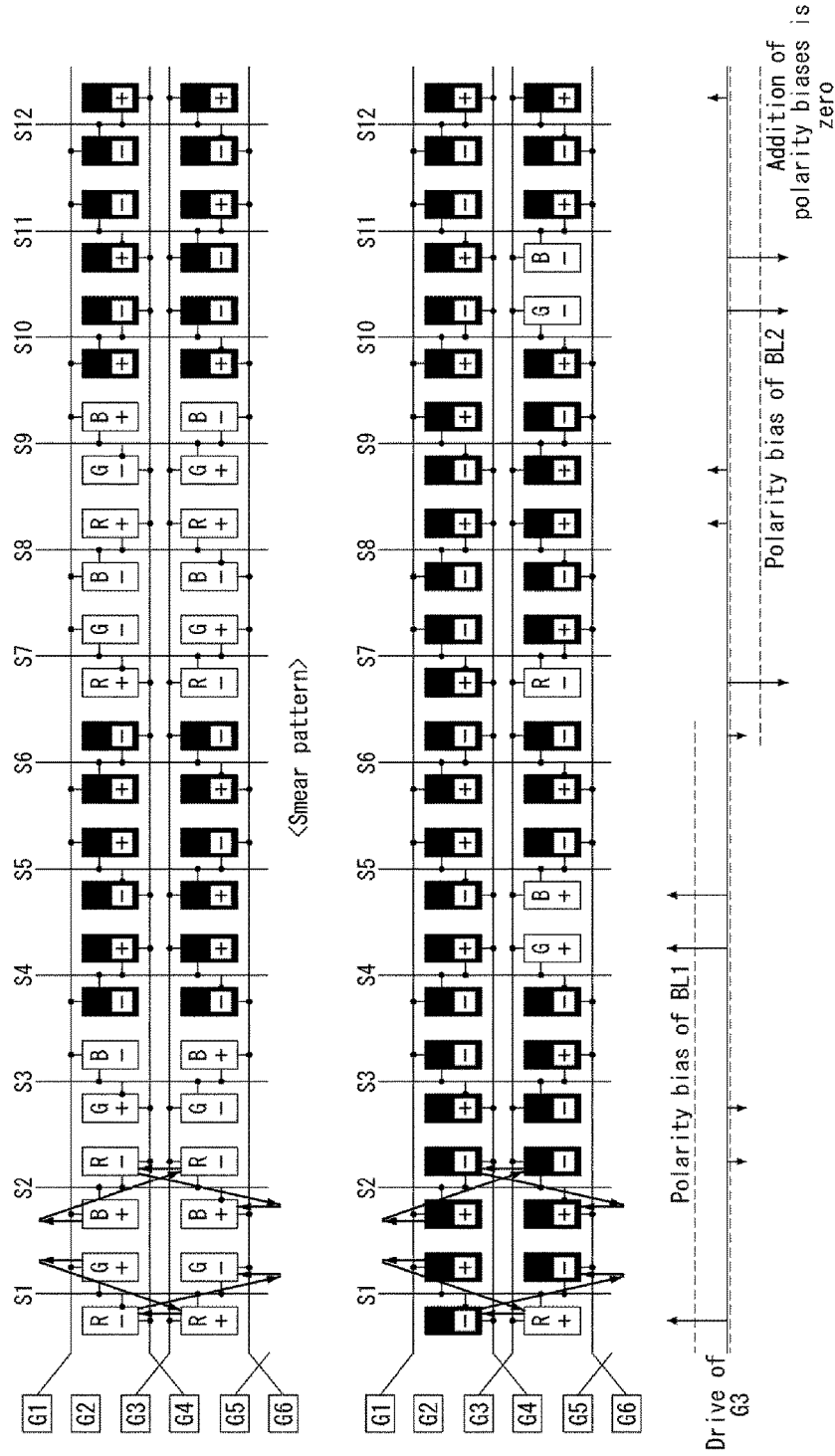
Figure 20D:
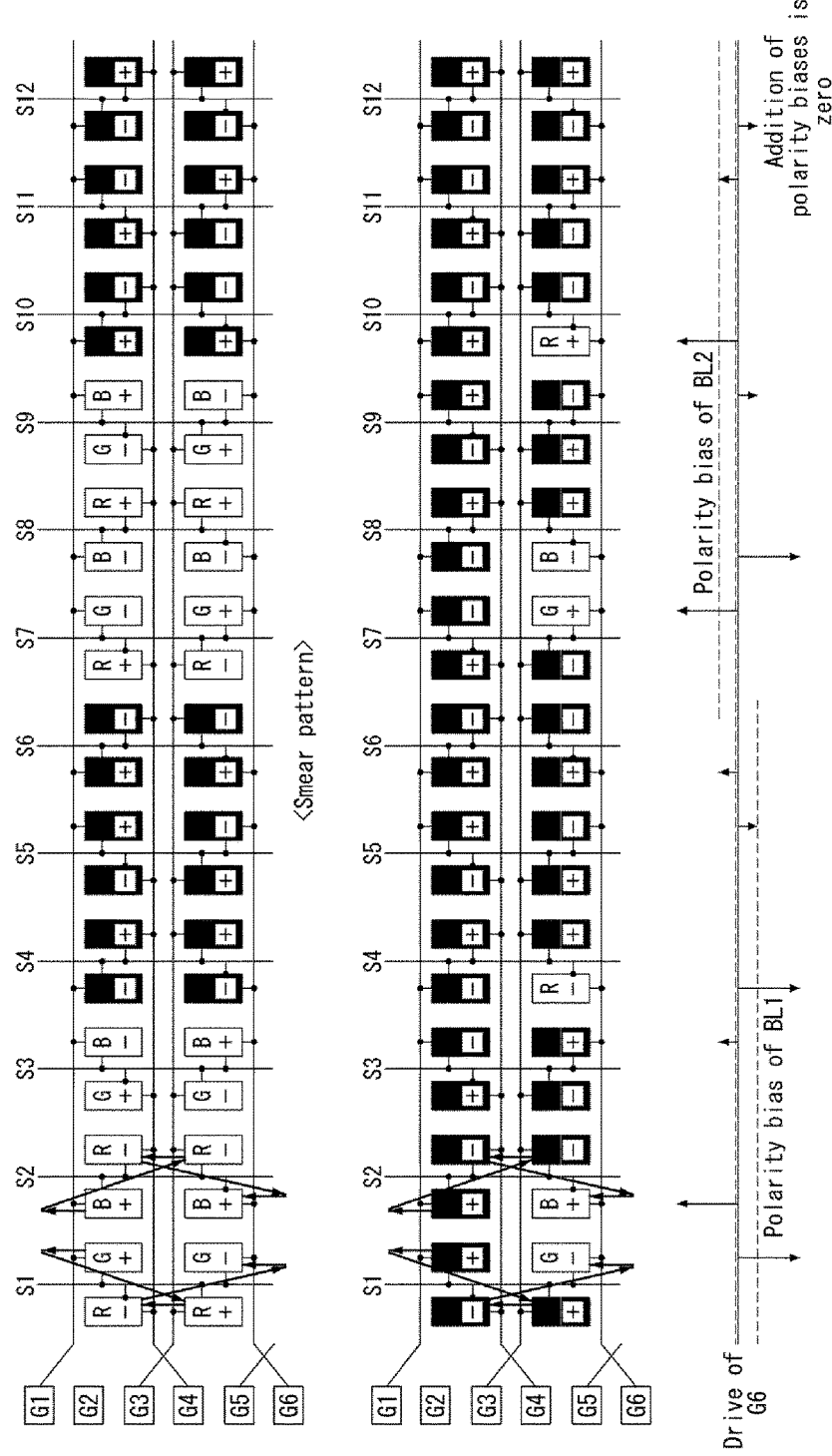

FIGS. 17A and 17B show an example where the pixel array of the RGBW type display device is divided into a plurality of blocks and polarity distributions of the adjacent blocks are reversed. FIGS. 18A and 18B show an example where the pixel array of the RGB type display device is divided into a plurality of blocks and polarity distributions of the adjacent blocks are reversed. The structure of the pixel array is substantially the same as FIGS. 14A to 16F.

Referring to FIGS. 17A to 18B, the pixel array is divided into blocks BL1 and BL2 as many as multiples of two. It should be noted that the blocks BL1 and BL2 are not physically divided and are used to divide reversed polarity patterns of the pixels.

FIGS. 17A to 18B show an example where the pixel array is divided into the two blocks BL1 and BL2, but the embodiment of the disclosure is not limited thereto. Each of the blocks BL1 and BL2 includes four or more row lines and 4 or more column lines.

A polarity pattern of the second block BL2 is the reverse of a polarity pattern of the first block BL1. For this, the timing controller 20 reversely controls the polarity pattern of the first block BL1 and the polarity pattern of the second block BL2 using the polarity control signal POL.

As shown in FIGS. 17A to 18B, 12 subpixels may be disposed on each of row lines L1 to L6 in the first block BL1. In this instance, a horizontal polarity pattern of (4K+1)-th and (4K+4)-th row lines L1, L4, and L5 of the first block BL1 may be "−++−+−−+−++−" from a first subpixel positioned on the leftmost side of the row lines L1, L4, and L5 to a twelfth subpixel positioned on the rightmost side of the row lines L1, L4, and L5. A horizontal polarity pattern of (4K+2)-th and (4K+3)-th row lines L2 and L3 of the first block BL1 may be "+−+−−+−++−+−" from a first subpixel positioned on the leftmost side of the row lines L2 and L3 to a twelfth subpixel positioned on the rightmost side of the row lines L2 and L3.

The polarity pattern of the second block BL2 is the reverse of the polarity pattern of the first block BL1 in the horizontal and vertical directions (or a row line direction and a column line direction). For example, as shown in FIGS. 17A to 18B, 12 subpixels may be disposed on each of row lines L1 to L6 in the second block BL2. In this instance, a horizontal polarity pattern of (4K+1)-th and (4K+4)-th row lines L1, L4, and L5 of the second block BL2 may be "+−−+−++−+−−+" from a first subpixel positioned on the leftmost side of the row lines L1, L4, and L5 to a twelfth subpixel positioned on the rightmost side of the row lines L1, L4, and L5. A horizontal polarity pattern of (4K+2)-th and (4K+3)-th row lines L2 and L3 of the second block BL2 may be "−+−++−+−−+−+" from a first subpixel positioned on the leftmost side of the row lines L2 and L3 to a twelfth subpixel positioned on the rightmost side of the row lines L2 and L3.

The embodiment of the disclosure reversely controls the polarity distributions of the adjacent first and second blocks BL1 and BL2 of the pixel array. Thus, if the polarities of the first block BL1 are biased to one polarity (for example, the positive or negative polarity), the polarities of the second block BL2 may be biased to the other polarity (for example, the negative or positive polarity). As a result, polarity biases of the first and second blocks BL1 and BL2 cancel each other out. The polarity bias causes the shift of the common voltage Vcom when the positive data voltages and the negative data voltages are not balanced in the row line direction of the display panel and one of the positive and negative data voltages becomes a predominant polarity. The polarity bias may be measured by counting the number of white gray levels in the problem pattern. The embodiment of the disclosure causes the polarity biases of the first and second blocks BL1 and BL2 to cancel each other out and thus achieves the polarity balance of the pixel array. Hence, even when any type of problem pattern is displayed on the pixel array or several types of problem patterns are simultaneously displayed on the pixel array, there is no shift of the common voltage Vcom. As a result, the embodiment of the invention may prevent the horizontal crosstalk and the luminance difference between lines.

FIGS. 19A to 20D show two types of problem patterns as an example and show a polarity cancellation effect between first and second blocks.

A shut down pattern is an example of the problem pattern, in which odd-numbered pixel data of the white gray level and even-numbered pixel data of the black gray level alternate with each other in each line data.

FIGS. 19A to 19D show an example where the shut down pattern is displayed on the RGB type pixel array. In the pixel of the white gray level, a gray level of each of the RGB subpixels is 255. In the pixel of the black gray level, a gray level of each of the RGB subpixels is zero. In a normally black mode, the data voltage of the black gray level is equal to or similar to the common voltage Vcom, and a difference between the data voltage of the white gray level and the common voltage Vcom is the largest. Thus, the polarity bias of each of the blocks BL1 and BL2 is measured by counting the data voltages having the white gray level in the shut down pattern. As shown in FIGS. 19A to 19D, when the polarity bias having any one polarity as a predominant polarity is generated in the first block BL1, the polarity bias having the reversed polarity as a predominant polarity is generated in the second block BL2. As a result, because the predominant polarity of the first block BL1 and the predominant polarity of the second block BL2 are reverse polarities, an addition of the predominant polarities is zero.

A smear pattern is an example of the problem pattern, in which (4J+1)-th and (4J+2)-th pixel data of the white gray level and (4J+3)-th and (4J+4)-th pixel data of the black gray level alternate with each other in each line data.

FIGS. 20A to 20D show an example where the smear pattern is displayed on the RGB type pixel array. In the pixel of the white gray level, a gray level of each of the RGB subpixels is 255. In the pixel of the black gray level, a gray level of each of the RGB subpixels is zero. In a normally black mode, the data voltage of the black gray level is equal to or similar to the common voltage Vcom, and a difference between the data voltage of the white gray level and the common voltage Vcom is the largest. Thus, the polarity bias of each of the blocks BL1 and BL2 is measured by counting the data voltages having the white gray level in the smear pattern. As shown in FIGS. 20A to 20D, when the polarity bias having any one polarity as a predominant polarity is generated in the first block BL1, the polarity bias having the reversed polarity as a predominant polarity is generated in the second block BL2. As a result, because the predominant polarity of the first block BL1 and the predominant polarity of the second block BL2 are reverse polarities, an addition of the predominant polarities is zero.

FIGS. 19A to 20D show the RGB type pixel array as an example, but the embodiment of the disclosure is not limited thereto. The polarity cancellation effect between the blocks can be obtained from the RGBW type pixel array.

Figure 21:
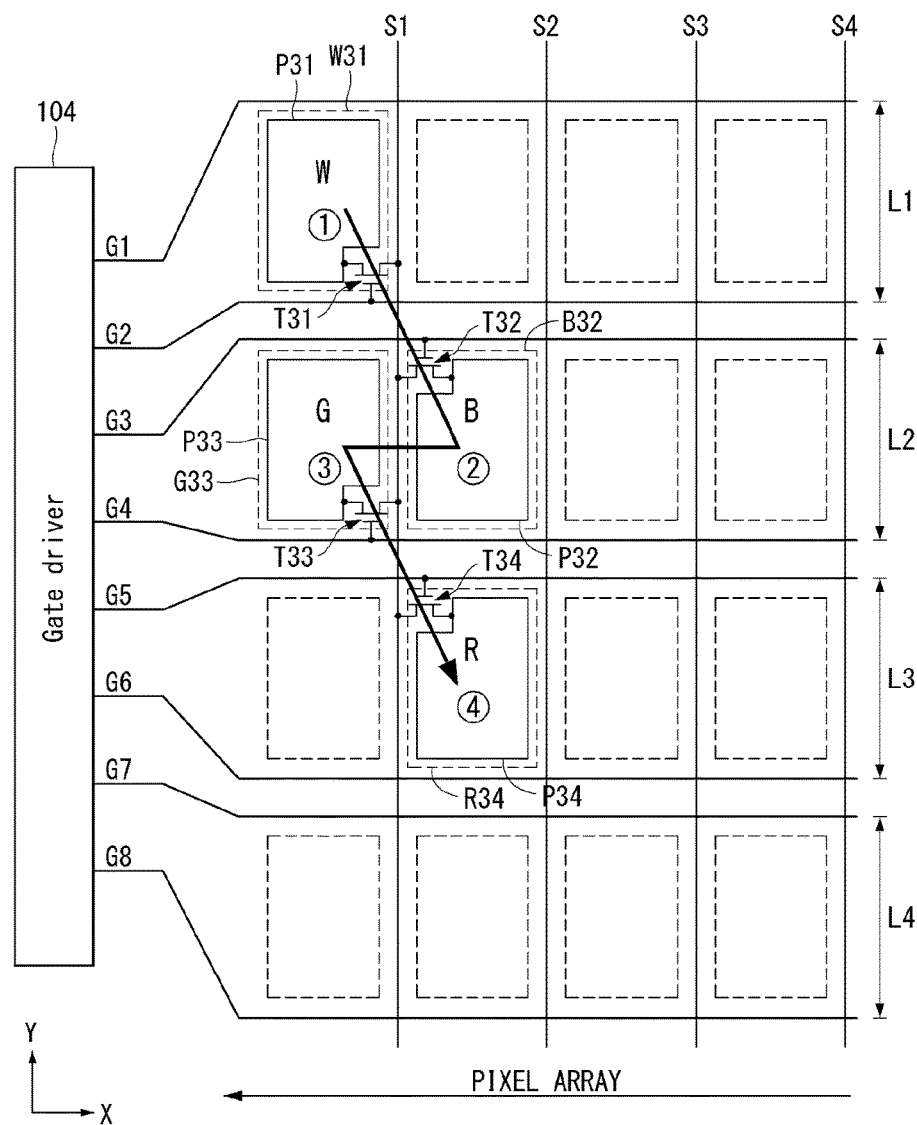
FIG. 21 shows a charge order of a pixel array according to a third embodiment of the disclosure.

FIG. 21 shows a charge order of a pixel array according to a third embodiment of the disclosure. In the third embodiment of the disclosure, because a gate pulse is sequentially applied to first to n-th gate lines G1 to Gn, there is no crossing between output channels of the gate driver 104 and the gate lines G1 to Gn of the pixel array. Thus, crossed link lines are not necessary, and the data rearrangement process of FIG. 8 or the dummy data S of FIG. 6 is not required.

Referring to FIG. 21, the source driver IC outputs data voltages of four colors having the same polarity in order of a W data voltage, a B data voltage, a G data voltage, and an R data voltage. Thus, in R, G, B, and W subpixels charged to the data voltages of the four colors having the same polarity, which share one data line with one another, after the W subpixel is firstly charged to the W data voltage, the B subpixel is charged to the B data voltage. Subsequently, the G subpixel is charged to the G data voltage, and then the R subpixel is lastly charged to the R data voltage. In the third embodiment of the disclosure, because the R data voltage affects luminance more than the B data voltage is set to the fourth charge order, a charge amount of the R subpixel may further increase and the luminance of the pixels may further increase.

A connection relationship between the RGBW subpixels, which share one data line S1 with one another and are sequentially charged to the data voltages of the same polarity, is as follows. A W subpixel W31 is disposed on the left side of a J-th data line S1 on a (K+1)-th row line L1 of the display panel 100, where K is zero and a positive integer and J is a positive integer. A B subpixel B32 is disposed on the right side of the J-th data line S1 on a (K+2)-th row line L2 of the display panel 100. A G subpixel B33 is disposed adjacent to the B subpixel B32 in the horizontal direction X with the J-th data line S1 interposed therebetween. Namely, the G subpixel B33 is disposed on the left side of the J-th data line S1 on the (K+2)-th row line L2 of the display panel 100. A R subpixel R34 is disposed on the right side of the J-th data line S1 on a (K+3)-th row line L3 of the display panel 100. The data voltages of the four colors are charged to the RGBW subpixels along a zigzag arrow.

The W subpixel W31 includes a first TFT T31, which supplies the W data voltage supplied through the J-th data line S1 to a first pixel electrode P31 in response to a first gate pulse supplied through an I-th gate line G2, where I and J are a positive integer. The first TFT T31 includes a gate connected to the I-th gate line G2 to which the first gate pulse is supplied, a drain connected to the J-th data line S1, and a source connected to the first pixel electrode P31. Because the W subpixel is firstly charged among the RGBW subpixels charged to the data voltages of the four colors having the same polarity, a charge amount of the W subpixel is less than the subpixels of other colors.

Subsequent to the W subpixel W31, the B subpixel B32 is charged to the B data voltage. The B subpixel B32 includes a second TFT T32, which supplies the B data voltage supplied through the J-th data line S1 to a second pixel electrode P32 in response to a second gate pulse supplied through an (I+1)-th gate line G3. The second TFT T32 includes a gate connected to the (I+1)-th gate line G3 to which the second gate pulse is supplied, a drain connected to the J-th data line S1, and a source connected to the second pixel electrode P32.

Subsequent to the B subpixel B32, the G subpixel G33 is charged to the G data voltage. The G subpixel G33 includes a third TFT T33, which supplies the G data voltage supplied through the J-th data line S1 to a third pixel electrode P33 in response to a third gate pulse supplied through an (I+2)-th gate line G4. The third TFT T33 includes a gate connected to the (I+2)-th gate line G4 to which the third gate pulse is supplied, a drain connected to the J-th data line S1, and a source connected to the third pixel electrode P33.

Subsequent to the G subpixel G33, the R subpixel R34 is charged to the R data voltage. The R subpixel R34 includes a fourth TFT T34, which supplies the R data voltage supplied through the J-th data line S1 to a fourth pixel electrode P34 in response to a fourth gate pulse supplied through an (I+3)-th gate line G5. The fourth TFT T34 includes a gate connected to the (I+3)-th gate line G5 to which the fourth gate pulse is supplied, a drain connected to the J-th data line S1, and a source connected to the fourth pixel electrode P34.

The source driver IC inverts a polarity of the four-color data voltage in a cycle of two horizontal periods. The pixel array includes pixels, in which the polarity of the data voltage is inverted every one dot along the horizontal and vertical directions X and Y, and pixels, in which the polarity of the data voltage is inverted every two dots along the horizontal and vertical directions X and Y.

The gate driver 104 sequentially supplies the gate pulses to the gate lines G1 to Gn under the control of the timing controller 20. The gate pulses output from the gate driver 104 are synchronized with positive and negative video data voltages, to which the pixels will be charged. The gate driver 104 may be implemented as a GIP circuit, so as to reduce the cost of the ICs.

The output channels of the gate driver 104 are connected to the gate lines G1 to Gn without crossings between the output channels of the gate driver 104 and the gate lines G1 to Gn. The gate driver 104 sequentially supplies the gate pulse synchronized with the data voltage to the gate lines G1 to Gn. The gate pulse is firstly applied to the first gate line G1 and then is sequentially applied to the remaining gate lines G2 to Gn.

The timing controller 20 controls the operation timings of the data driver 102 and the gate driver 104 based on the timing signals synchronized with the data of the input image received from the host system 24. The timing controller 20 may transmit the polarity control signal POL for controlling the polarities of the pixel array to each of the source driver ICs of the data driver 102. The timing controller 20 may convert the RGB data of the input image into the RGBW data using a known white gain calculation algorithm.

Figure 22:
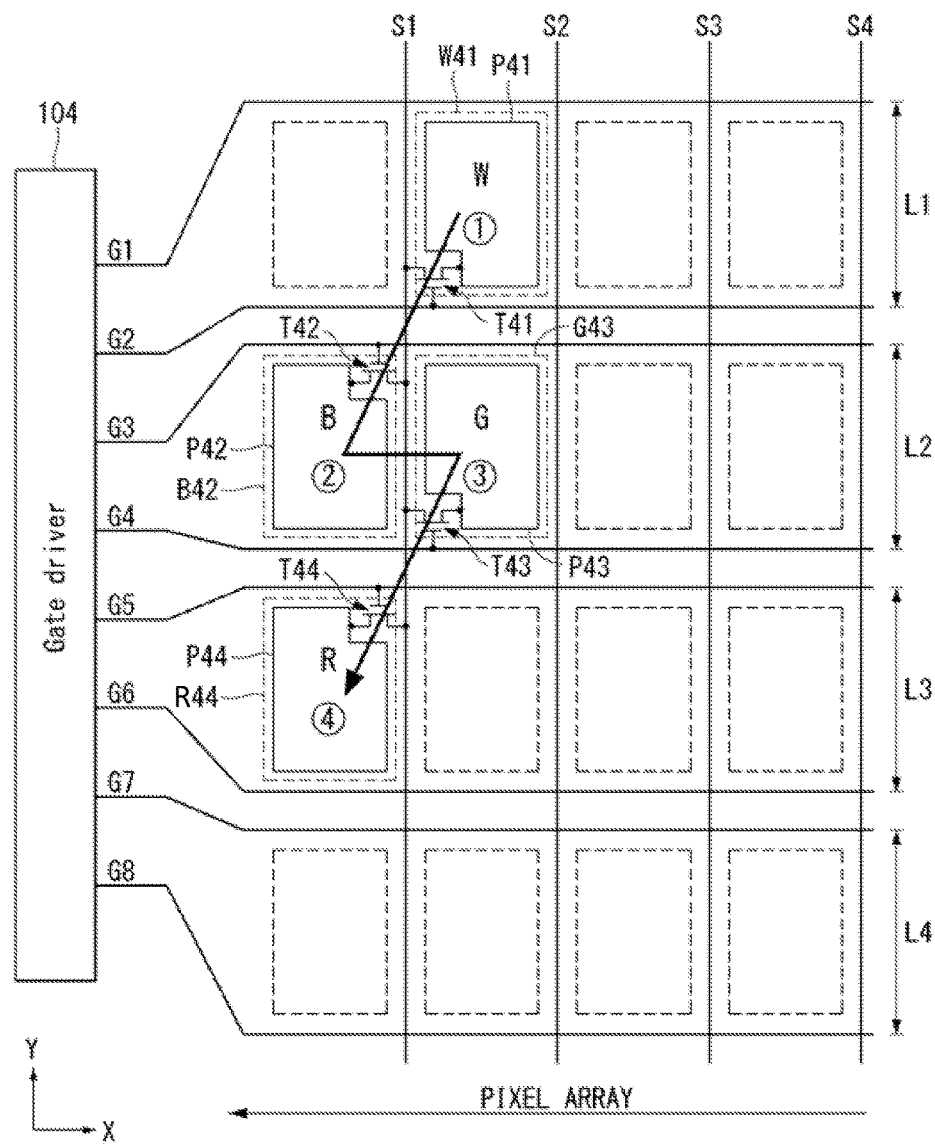
FIG. 22 shows a charge order of a pixel array according to a fourth embodiment of the disclosure.
Figure 23A:
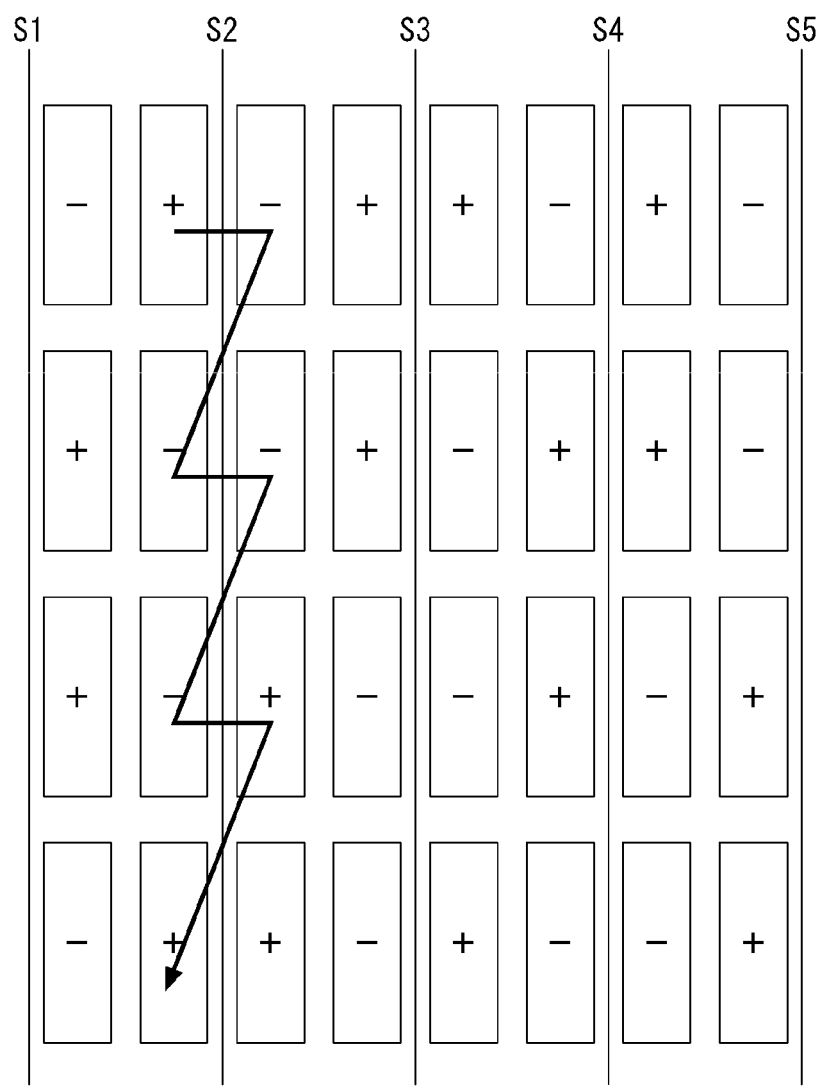
FIGS. 23A to 23H show various examples of applying the charge orders of the pixel arrays according to the third and fourth embodiments.
Figure 23B:
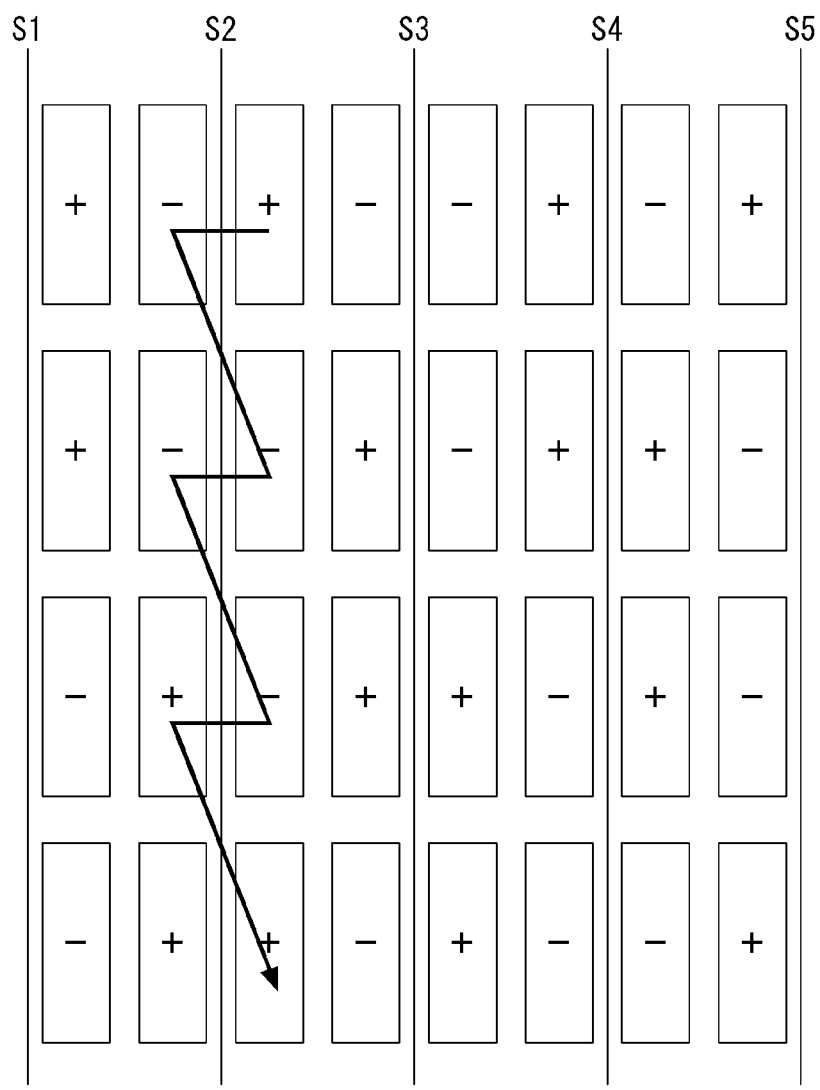
Figure 23C:
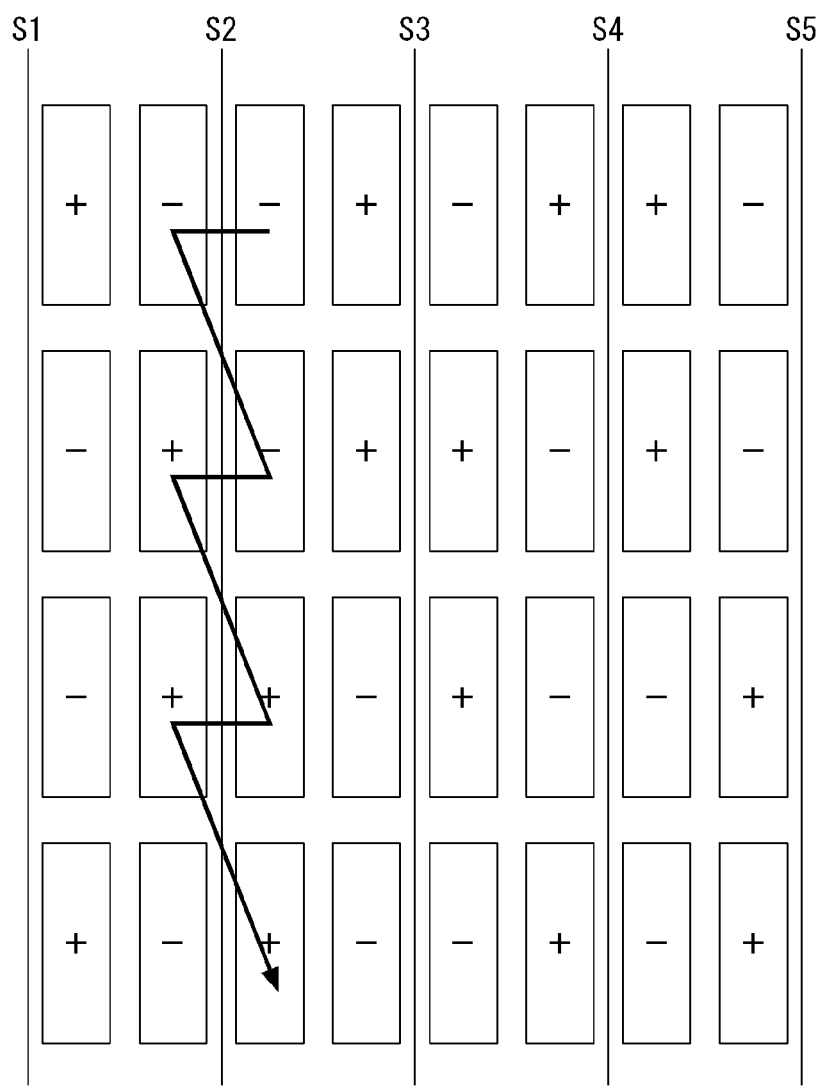
Figure 23D:
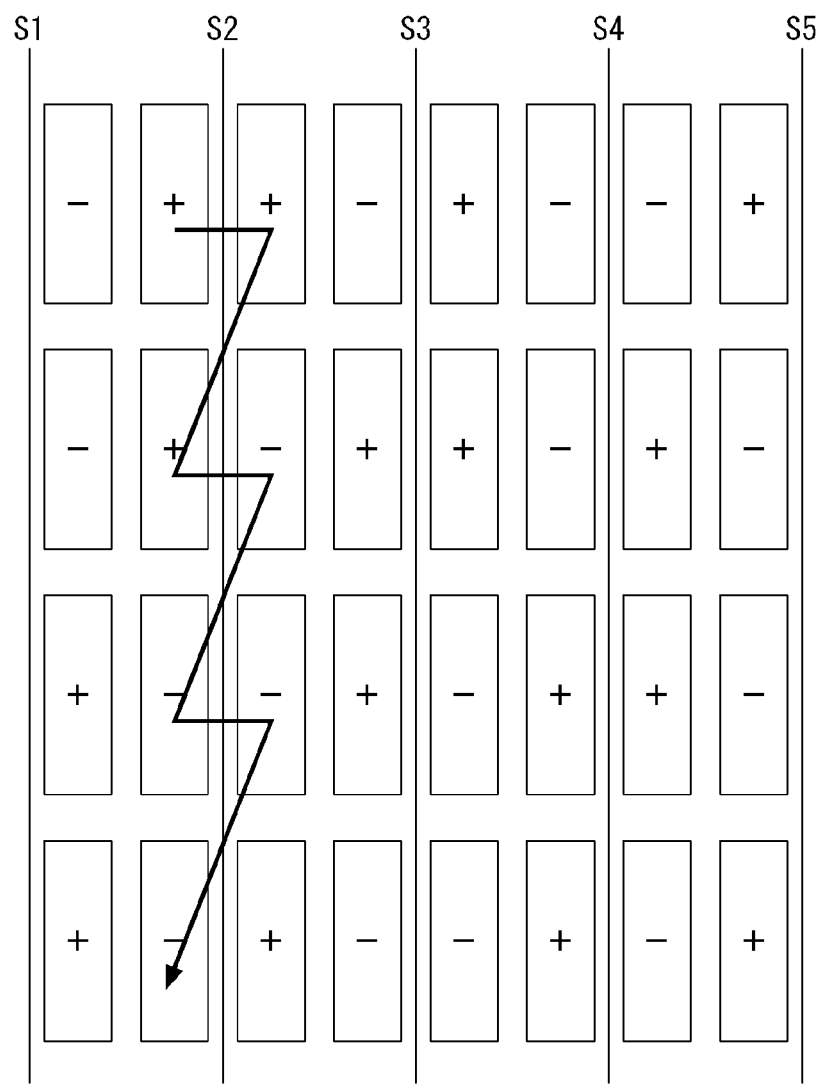
Figure 23E:
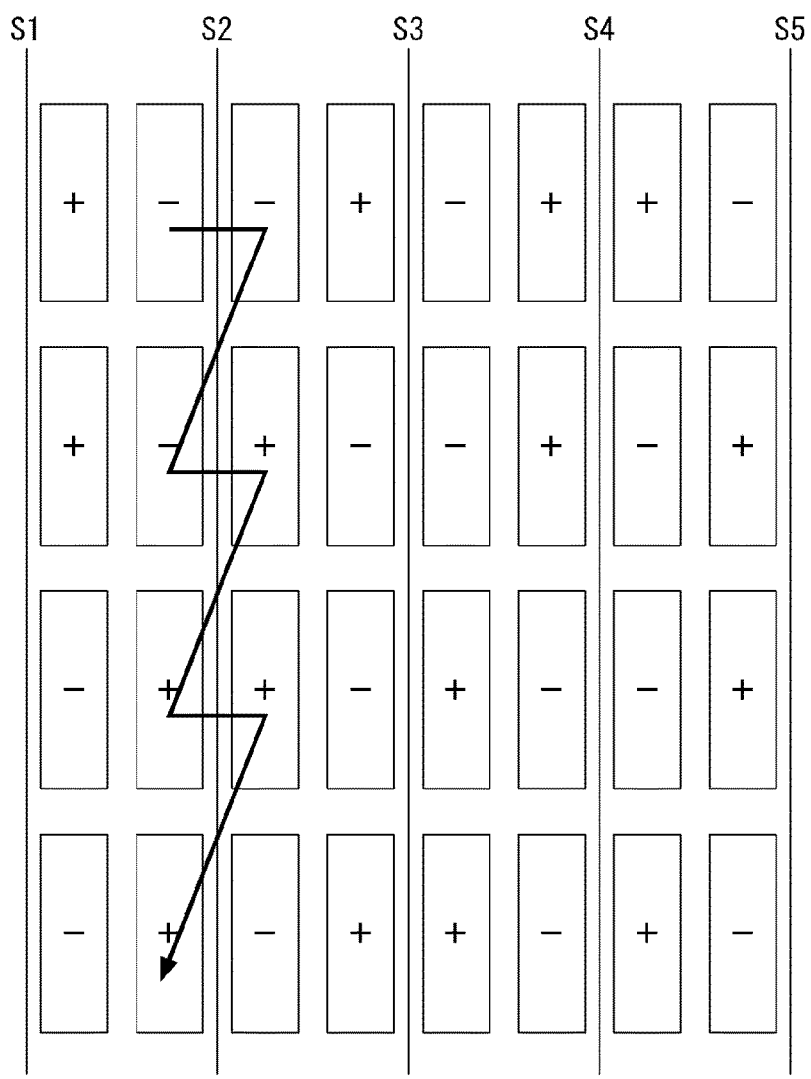
Figure 23F:
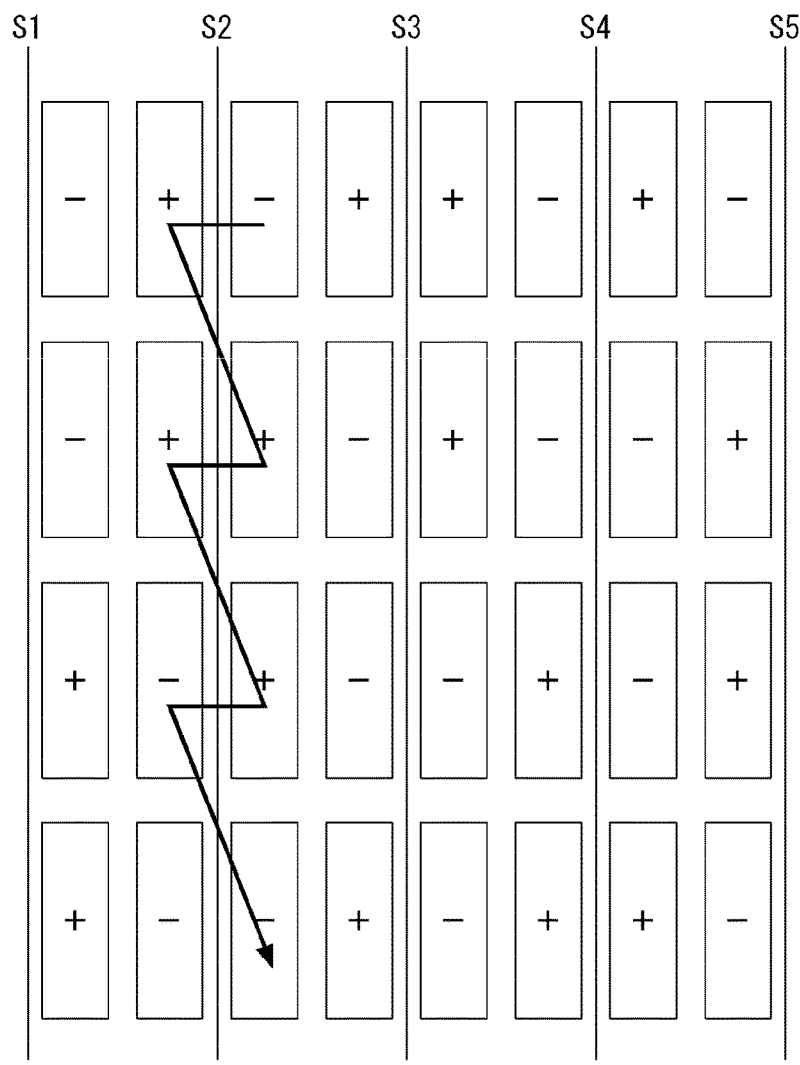
Figure 23G:
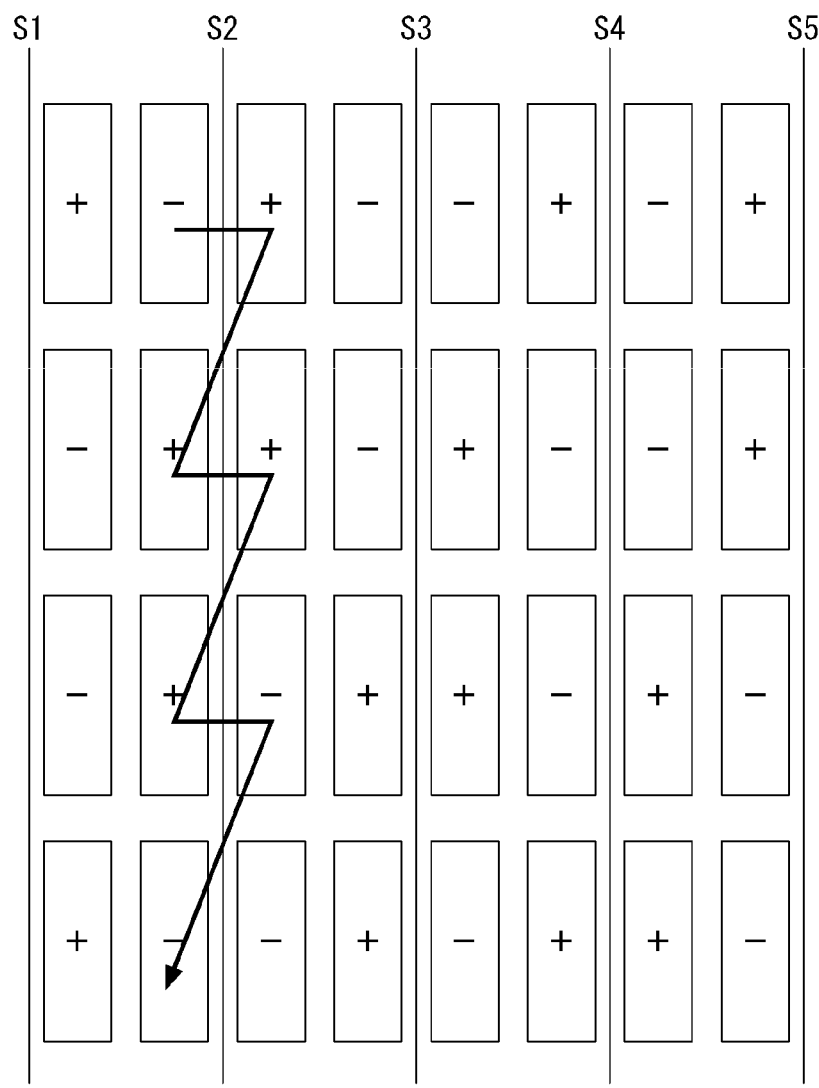
Figure 23H:
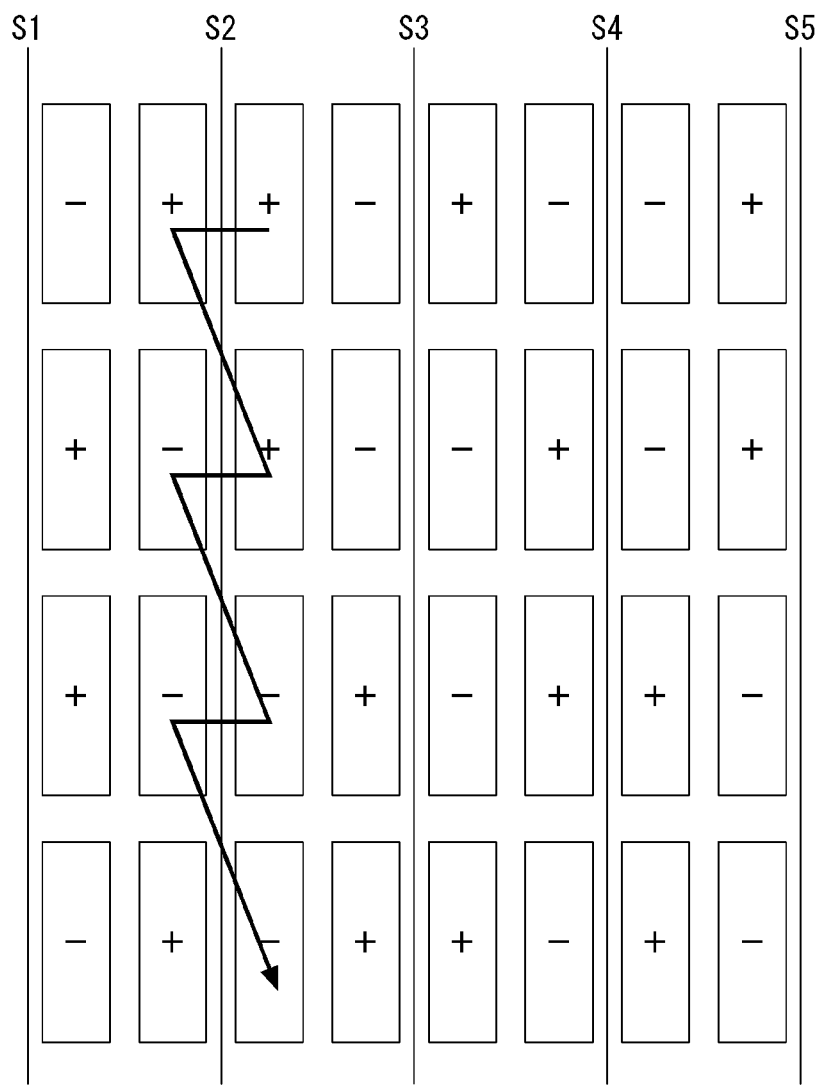

FIG. 22 shows a charge order of a pixel array according to a fourth embodiment of the disclosure. In the fourth embodiment of the disclosure, because a gate pulse is sequentially applied to first to nth gate lines G1 to Gn, there is no crossing between output channels of the gate driver 104 and the gate lines G1 to Gn of the pixel array. Thus, crossed link lines are not necessary, and the data rearrangement process of FIG. 7 or the dummy data S of FIG. 6 is not required.

Referring to FIG. 22, the source driver IC outputs data voltages of four colors having the same polarity in order of a W data voltage, a B data voltage, a G data voltage, and an R data voltage. Thus, in R, G, B, and W subpixels charged to the data voltages of the four colors having the same polarity, which share one data line with one another, after the W subpixel is firstly charged to the W data voltage, the B subpixel is charged to the B data voltage. Subsequently, the G subpixel is charged to the G data voltage, and then the R subpixel is lastly charged to the R data voltage. In the fourth embodiment of the disclosure, because the R data voltage affects luminance more than the B data voltage is set to the fourth charge order, a charge amount of the R subpixel may further increase and the luminance of the pixels may further increase.

A connection relationship between the RGBW subpixels, which share one data line S1 with one another and are sequentially charged to the data voltages of the same polarity, is as follows. A W subpixel W41 is disposed on the right side of a J-th data line S1 on a (K+1)-th row line L1 of the display panel 100, where K is zero and a positive integer and J is a positive integer. A B subpixel B42 is disposed on the left side of the J-th data line S1 on a (K+2)-th row line L2 of the display panel 100. A G subpixel B43 is disposed adjacent to the B subpixel B42 in the horizontal direction X with the J-th data line S1 interposed therebetween. Namely, the G subpixel B43 is disposed on the right side of the J-th data line S1 on the (K+2)-th row line L2 of the display panel 100. An R subpixel R44 is disposed on the left side of the J-th data line S1 on a (K+3)-th row line L3 of the display panel 100. The data voltages of the four colors are charged to the RGBW subpixels along a zigzag arrow.

The W subpixel W41 includes a first TFT T41, which supplies the W data voltage supplied through the J-th data line S1 to a first pixel electrode P41 in response to a first gate pulse supplied through an I-th gate line G2, where I and J are a positive integer. The first TFT T41 includes a gate connected to the I-th gate line G2 to which the first gate pulse is supplied, a drain connected to the J-th data line S1, and a source connected to the first pixel electrode P41. Because the W subpixel is firstly charged among the RGBW subpixels charged to the data voltages of the four colors having the same polarity, a charge amount of the W subpixel is less than the subpixels of other colors.

Subsequent to the W subpixel W41, the B subpixel B42 is charged to the B data voltage. The B subpixel B42 includes a second TFT T42, which supplies the B data voltage supplied through the J-th data line S1 to a second pixel electrode P42 in response to a second gate pulse supplied through an (I+1)-th gate line G3. The second TFT T42 includes a gate connected to the (I+1)-th gate line G3 to which the second gate pulse is supplied, a drain connected to the J-th data line S1, and a source connected to the second pixel electrode P42.

Subsequent to the B subpixel B42, the G subpixel G43 is charged to the G data voltage. The G subpixel G43 includes a third TFT T43, which supplies the G data voltage supplied through the J-th data line S1 to a third pixel electrode P43 in response to a third gate pulse supplied through an (I+2)-th gate line G4. The third TFT T43 includes a gate connected to the (I+2)-th gate line G4 to which the third gate pulse is supplied, a drain connected to the J-th data line S1, and a source connected to the third pixel electrode P43.

Subsequent to the G subpixel G43, the R subpixel R44 is charged to the R data voltage. The R subpixel R44 includes a fourth TFT T44, which supplies the R data voltage supplied through the J-th data line S1 to a fourth pixel electrode P44 in response to a fourth gate pulse supplied through an (I+3)-th gate line G5. The fourth TFT T44 includes a gate connected to the (I+3)-th gate line G5 to which the fourth gate pulse is supplied, a drain connected to the J-th data line S1, and a source connected to the fourth pixel electrode P44.

The source driver IC inverts a polarity of the four-color data voltage in a cycle of two horizontal periods. The pixel array includes pixels, in which the polarity of the data voltage is inverted every one dot along the horizontal and vertical directions X and Y, or pixels, in which the polarity of the data voltage is inverted every two dots along the horizontal and vertical directions X and Y.

The gate driver 104 sequentially supplies the gate pulses to the gate lines G1 to Gn under the control of the timing controller 20. The gate pulses output from the gate driver 104 are synchronized with positive and negative video data voltages, to which the pixels will be charged. The gate driver 104 may be implemented as a GIP circuit, so as to reduce the cost of the ICs.

The output channels of the gate driver 104 are connected to the gate lines G1 to Gn without crossings between the output channels of the gate driver 104 and the gate lines G1 to Gn. The gate driver 104 sequentially supplies the gate pulse synchronized with the data voltage to the gate lines G1 to Gn. The gate pulse is firstly applied to the first gate line G1 and then is sequentially applied to the remaining gate lines G2 to Gn.

The timing controller 20 controls the operation timings of the data driver 102 and the gate driver 104 based on the timing signals synchronized with the data of the input image received from the host system 24. The timing controller 20 may transmit the polarity control signal POL for controlling the polarities of the pixel array to each of the source driver ICs of the data driver 102. The timing controller 20 may convert the RGB data of the input image into the RGBW data using a known white gain calculation algorithm.

FIGS. 23A to 23H show examples of applying the charge orders of the pixel arrays according to the third and fourth embodiments of the disclosure. The examples of FIGS. 23A to 23H were selected as driving methods, in which the luminance difference between the pixels, the flicker, and the crosstalk are not generated, through an experiment. A combination of the driving methods of FIGS. 23A to 23H may be used.

Figure 24:
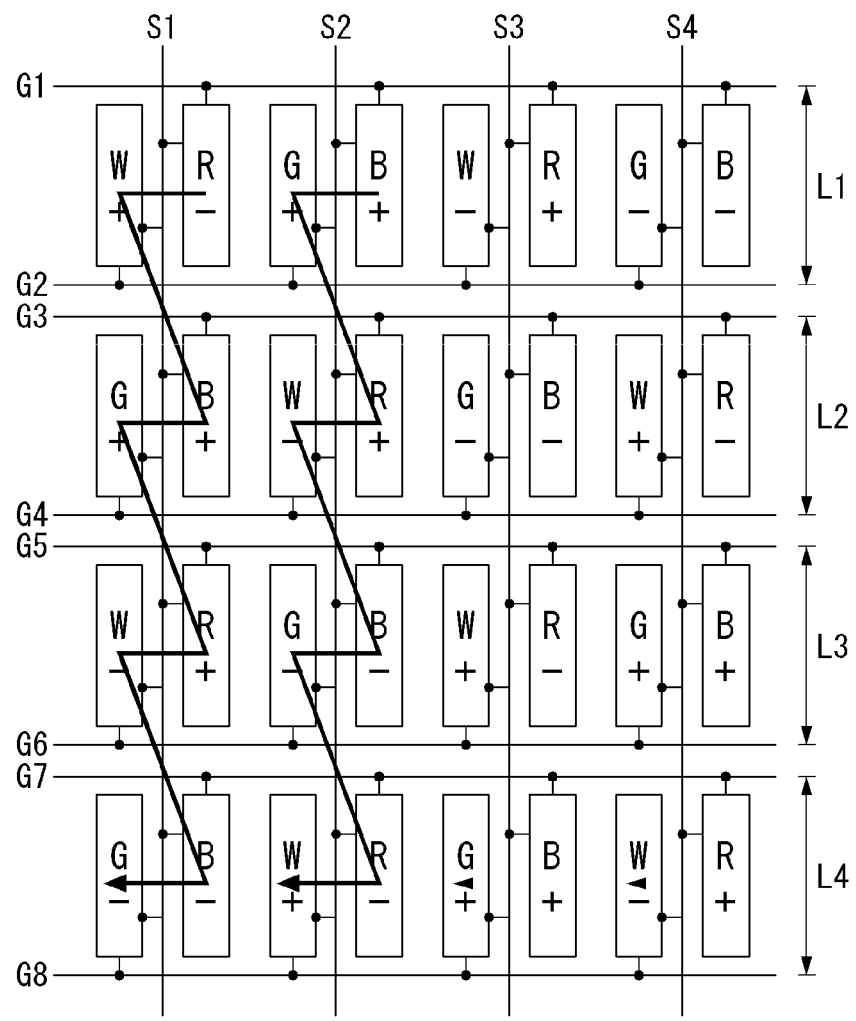
FIGS. 24 to 29 show a polarity of the pixel array applying the charge order of the pixel array according to the third embodiment and a charge amount of a pixel.
Figure 25:
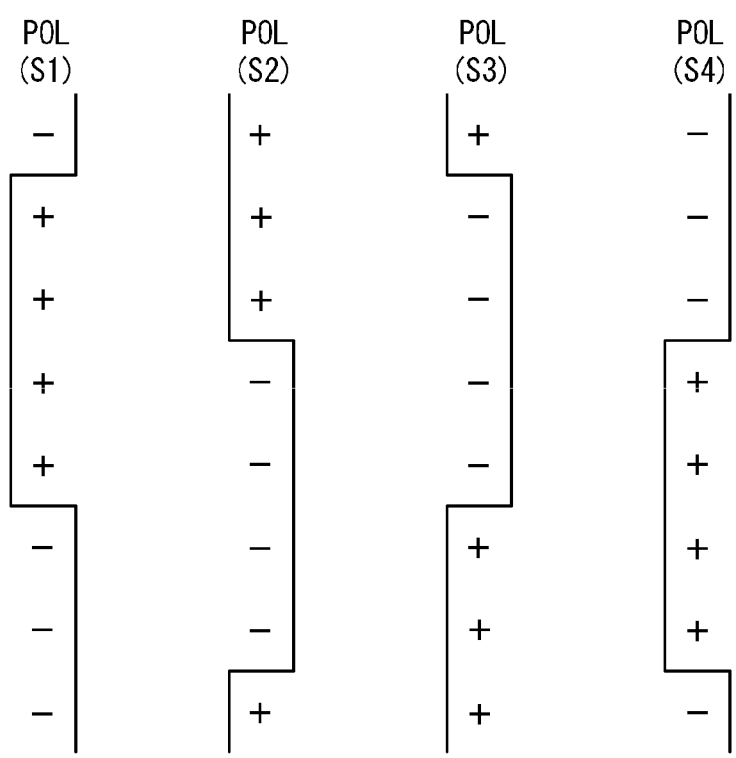
Figure 26:
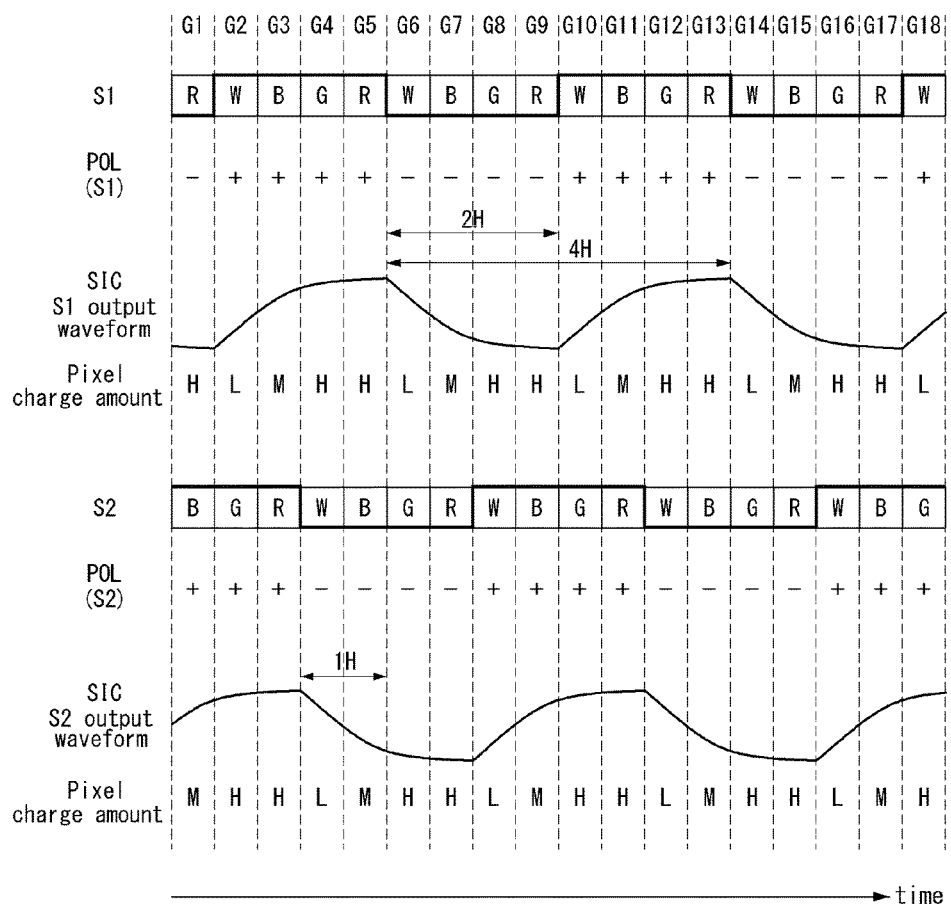
Figure 27:
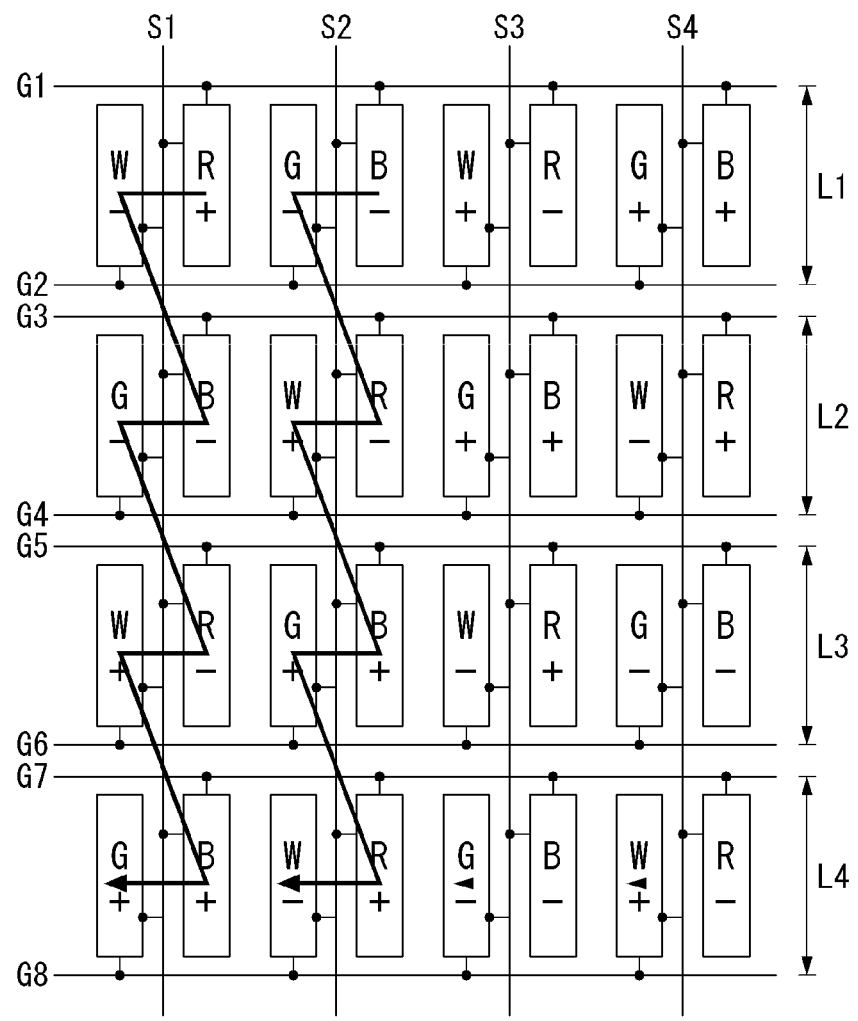
Figure 28:
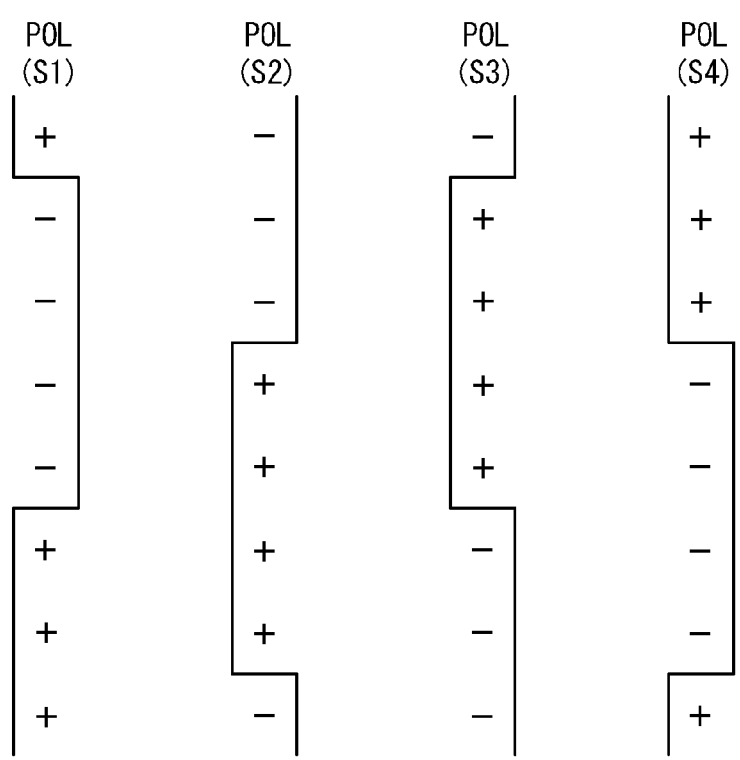
Figure 29:
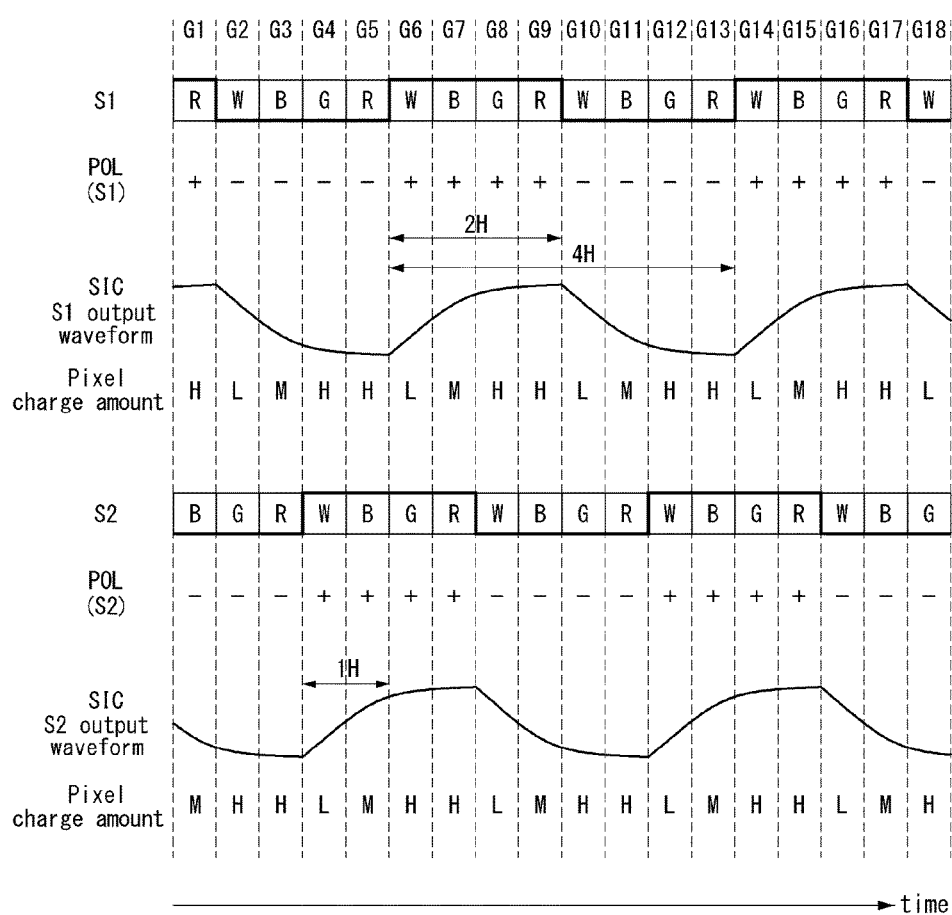

FIGS. 24 to 29 show a polarity of the pixel array applying the charge order of the pixel array according to the third embodiment of the disclosure and a charge amount of the pixel. More specifically, FIGS. 24 to 26 show an example of applying a method for driving the RGBW type DRD display device in odd-numbered frame periods. The driving method of FIGS. 24 to 26 applies the driving method of FIGS. 23C and 23F. FIGS. 27 to 29 show an example of applying a method for driving the RGBW type DRD display device in even-numbered frame periods. The driving method of FIGS. 27 to 29 applies the driving method of FIGS. 23B and 23H.

Referring to FIGS. 24 to 29, a second polarity control signal POL(S2) has a phase difference of one horizontal period from a first polarity control signal POL(S1). A third polarity control signal POL(S3) has a phase difference of one horizontal period from the second polarity control signal POL(S2). The third polarity control signal POL(S3) is generated at antiphase of the first polarity control signal POL(S1). A fourth polarity control signal POL(S4) has a phase difference of one horizontal period from the third polarity control signal POL(S3). The fourth polarity control signal POL(S4) is generated at antiphase of the second polarity control signal POL(S2). The polarity control signals are inverted in each frame period. Thus, there is a difference of one horizontal period between a polarity inversion time point of the four-color data voltage supplied to the pixels through the first data line S1 and a polarity inversion time point of the four-color data voltage supplied to the pixels through the second data line S2. A polarity of the four-color data voltage supplied to the pixels through the third data line S3 is the reverse of a polarity of the four-color data voltage supplied to the pixels through the first data line S1. A polarity of the four-color data voltage supplied to the pixels through the fourth data line S4 is the reverse of a polarity of the four-color data voltage supplied to the pixels through the second data line S2.

A polarity pattern of the pixel array during the odd-numbered frame periods is shown in FIG. 24. During the odd-numbered frame periods, a horizontal polarity pattern from a first subpixel W+ to an eighth subpixel B− on the first row line L1 is "+−++−+−−". A horizontal polarity pattern from a first subpixel G+ to an eighth subpixel R− on the second row line L2 is "++−+−−+−". A horizontal polarity pattern from a first subpixel W− to an eighth subpixel B+ on the third row line L3 is "−+−−+−++". A horizontal polarity pattern from a first subpixel G− to an eighth subpixel R+ on the fourth row line L4 is "−−+−++−+".

A polarity pattern of the pixel array during the even-numbered frame periods is shown in FIG. 27. During the even-numbered frame periods, a horizontal polarity pattern from a first subpixel W− to an eighth subpixel B+ on the first row line L1 is "−+−−+−++". A horizontal polarity pattern from a first subpixel G− to an eighth subpixel R+ on the second row line L2 is "−−+−++−+". A horizontal polarity pattern from a first subpixel W+ to an eighth subpixel B− on the third row line L3 is "+−++−+−−". A horizontal polarity pattern from a first subpixel G+ to an eighth subpixel R− on the fourth row line L4 is "++−+−−+−".

If the GIP circuit is applied, a time interval between the gate pulse applied to the odd-numbered gate lines G1, G3, . . . , Gn−1 and the gate pulse applied to the even-numbered gate lines G2, G4, . . . , Gn may be reduced.

Figure 30:
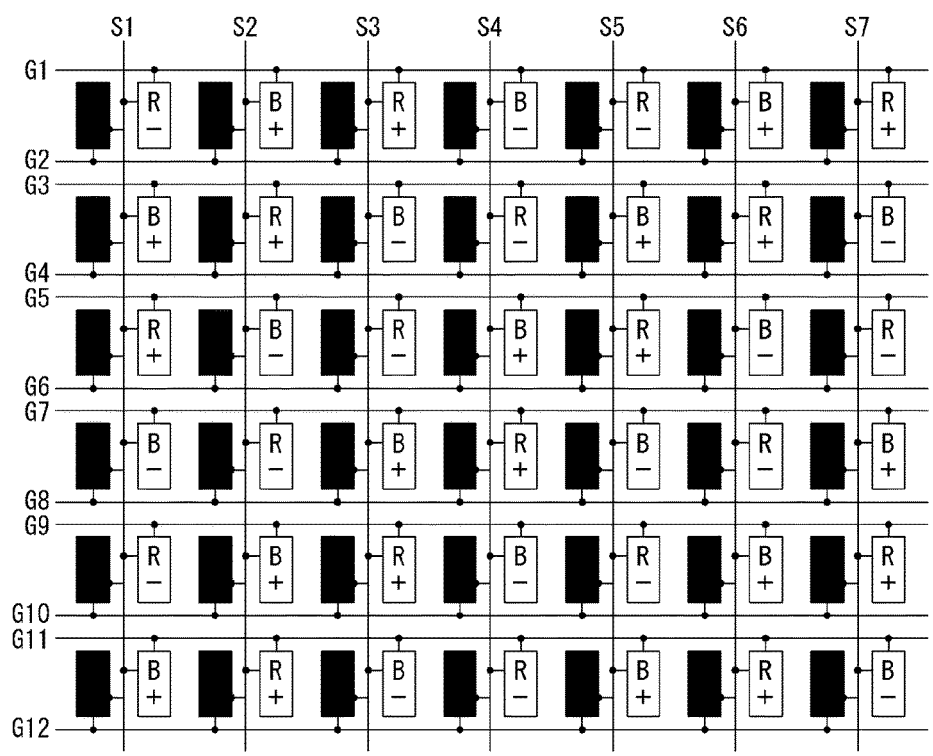
FIG. 30 shows an example of driving odd-numbered gate lines in the pixel array according to the third embodiment.

FIG. 30 shows an example of driving the odd-numbered gate lines G1, G3, . . . , Gn−1 in the pixel array according to the third embodiment of the disclosure. When the gate pulse is supplied to the odd-numbered gate lines G1, G3, . . . , Gn−1 and the data voltage of the white gray level is supplied to the data lines S1 to Sm, the subpixels of the even-numbered column lines look bright because of the white gray level of the data voltage. Because the data voltage is not applied to the subpixels of the odd-numbered column lines, they may look dark if a previous gray level is zero. Because polarities of the R and B subpixels connected to the odd-numbered gate lines are balanced, the shift of the common voltage Vcom is not generated. Hence, an image not having the crosstalk can be displayed.

Figure 31:
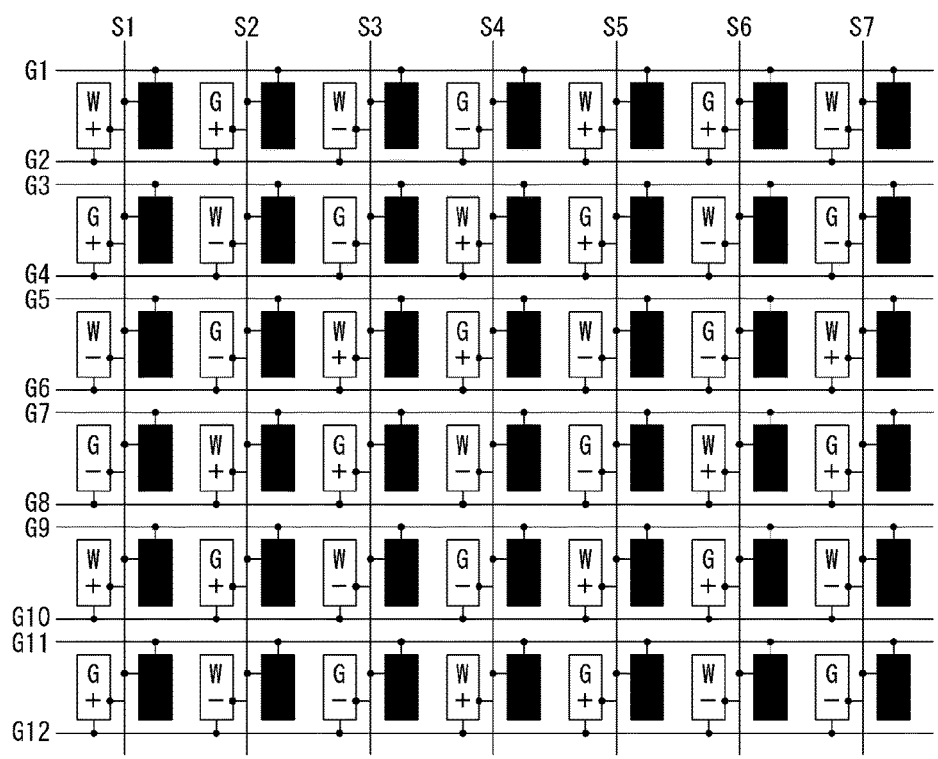
FIG. 31 shows an example of driving even-numbered gate lines in the pixel array according to the third embodiment.

FIG. 31 shows an example of driving the even-numbered gate lines G2, G4, . . . , Gn in the pixel array according to the third embodiment of the disclosure. When the gate pulse is supplied to the even-numbered gate lines G2, G4, . . . , Gn and the data voltage of the white gray level is supplied to the data lines S1 to Sm, the subpixels of the odd-numbered column lines look bright because of the white gray level of the data voltage. Because the data voltage is not applied to the subpixels of the even-numbered column lines, they may look dark if a previous gray level is zero. Because polarities of the W and G subpixels connected to the even-numbered gate lines are balanced, the shift of the common voltage Vcom is not generated. Hence, an image not having the crosstalk can be displayed.

The W subpixel is a low charge subpixel, and the B subpixel is a middle charge subpixel. The G and R subpixels are high charge subpixels, and a change amount of the R subpixel is relatively more than a change amount of the B subpixel. Thus, because a change amount of the W and G subpixels is similar to a change amount of the R and B subpixels, a luminance difference between the turned-on subpixels is little generated as shown in FIGS. 30 and 31.

Figure 32:
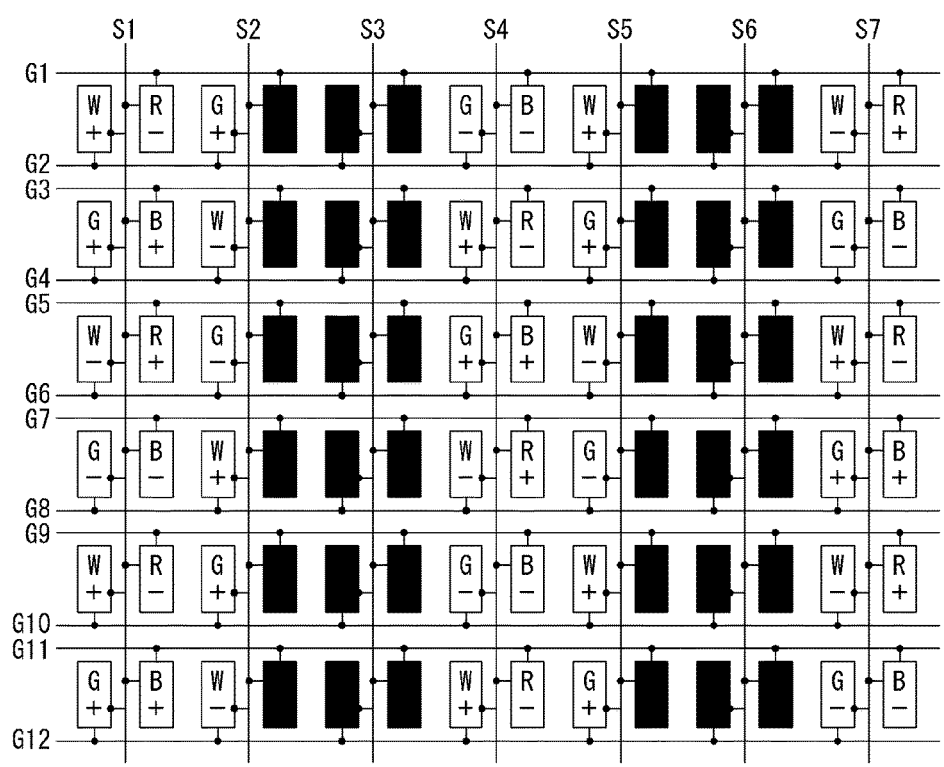
FIGS. 32 and 33 show two types of problem patterns as an example and show an image quality improvement effect of a RGBW type DRD display device.
Figure 33:
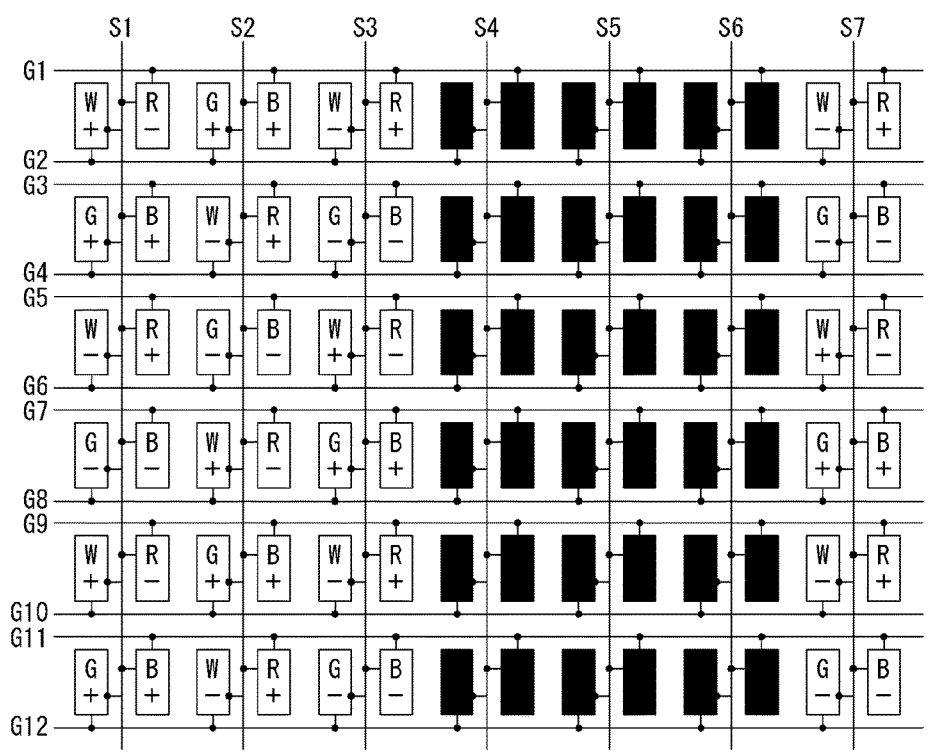

FIGS. 32 and 33 show two types of problem patterns as an example and show an image quality improvement effect of the RGBW type DRD display device. More specifically, FIG. 32 shows an example where the problem pattern of the shut down pattern is displayed on the RGBW type DRD display device. FIG. 33 shows an example where the problem pattern of the smear pattern is displayed on the RGBW type DRD display device.

Referring to FIG. 32, in the shut down pattern, odd-numbered pixel data of the white gray level and even-numbered pixel data of the black gray level alternate with each other. In the shut down pattern, polarities of each of the RGBW subpixels are balanced, and the shift of the common voltage Vcom is not generated. Hence, an image not having the crosstalk may be implemented.

Referring the FIG. 33, in the smear pattern, (4J+1)-th and (4J+2)-th pixel data of the white gray level and (4J+3)-th and (4J+4)-th pixel data of the black gray level alternate with each other. In the smear pattern, polarities of each of the RGBW subpixels are balanced, and the shift of the common voltage Vcom is not generated. Hence, an image not having the crosstalk may be implemented.

The pixel arrays according to the third and fourth embodiments may be divided into the plurality of blocks having the reversed polarity patterns as shown in FIGS. 17A to 18B, so that the polarity biases of the plurality of blocks cancel each other out. In the pixel arrays according to the third and fourth embodiments, the gamma correction unit 22 may modulate the RGBW data based on the gamma curve shown in FIG. 13 and may gamma-correct the data of each color.

The display device according to the embodiment of the disclosure changes the disposition of the color filters in the pixel array described in the above-described embodiments of the disclosure and thus may variously change the charge order of the data voltage. As can be seen from the above-described embodiments of the disclosure, the display device according to the embodiment of the disclosure inverts the polarity of the data voltage only in the data of the first color. Thus, the embodiment of the disclosure inverts the polarity of the data voltage of the first color and then sequentially generates the data voltages of the second to fourth colors having the same polarity as the inverted polarity of the data voltage of the first color. In other words, the embodiment of the disclosure inverts a first polarity of the data voltage of the first color and generates the data voltage of the first color at a second polarity. The embodiment of the disclosure then sequentially generates the data voltages of the second to fourth colors having the same second polarity as the data voltage of the first color.

FIGS. 34 to 43 show various examples of the charge order of the data voltage in the display device according to the embodiment of the invention.

Figure 34:
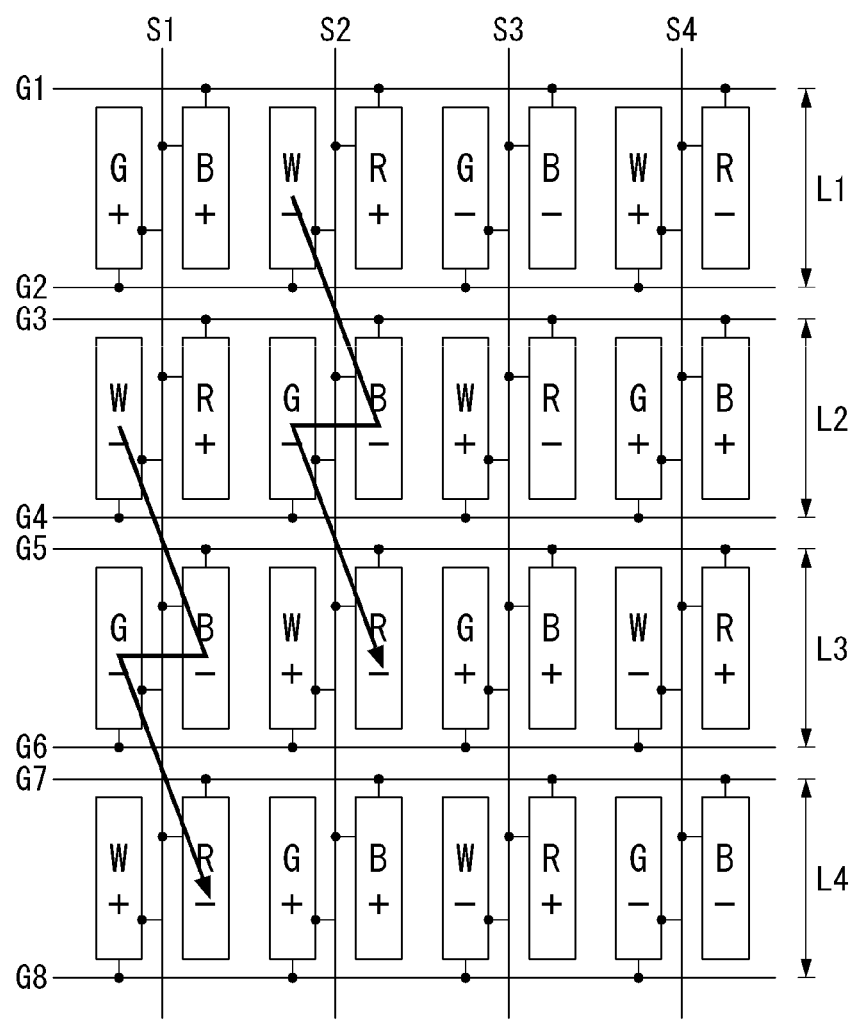
FIGS. 34 to 43 show various examples of charge order of a data voltage in a display device according to an exemplary embodiment.

Referring to FIG. 34, during a period, in which a polarity of the data voltage is equally maintained, after the W subpixel is charged to the W data voltage, the B, G, and R subpixels are sequentially charged to the B data voltage, the G data voltage, and the R data voltage in the order named. In the charge order of the data voltage, the polarity of the data voltage is inverted only in the W data voltage. In the embodiment disclosed herein, the W data voltage is a data voltage of a first color, and the B, G, and R data voltages are data voltages of second to four colors.

Figure 35:
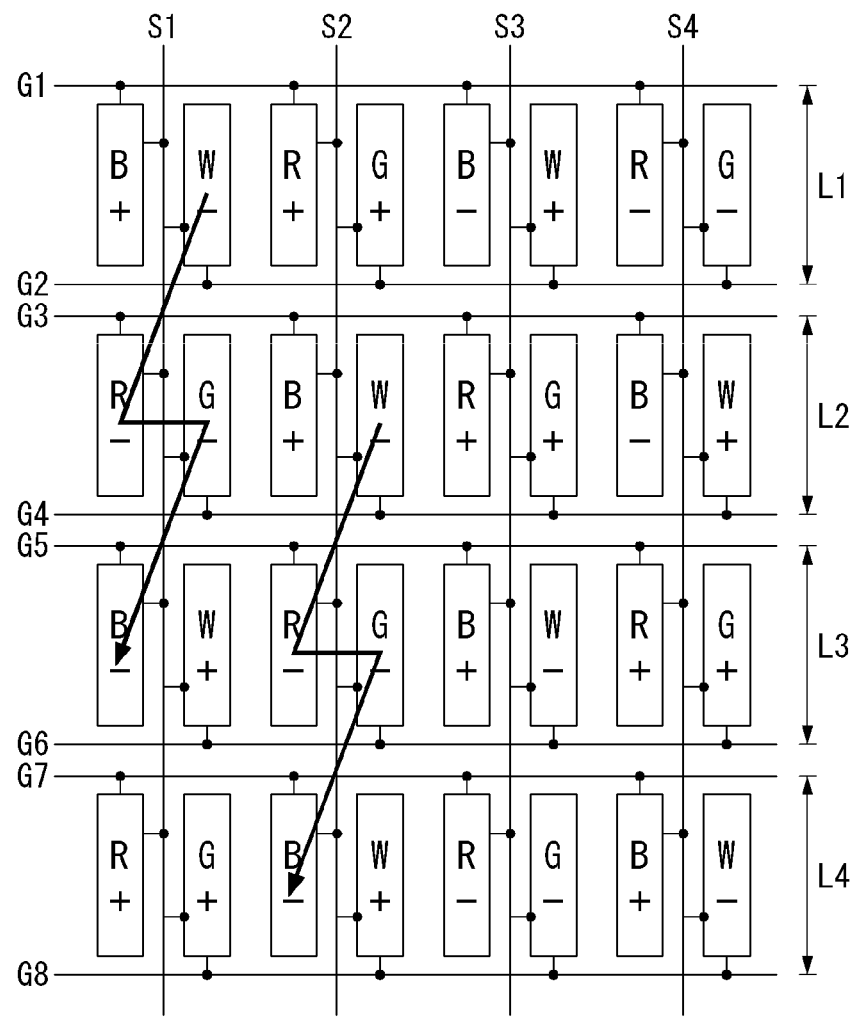

Referring to FIG. 35, during a period, in which a polarity of the data voltage is equally maintained, after the W subpixel is charged to the W data voltage, the R, G, and B subpixels are sequentially charged to the R data voltage, the G data voltage, and the B data voltage in the order named. In the charge order of the data voltage, the polarity of the data voltage is inverted only in the W data voltage. In FIG. 35, the W data voltage is a data voltage of a first color, and the R, G, and B data voltages are data voltages of second to four colors.

Figure 36:
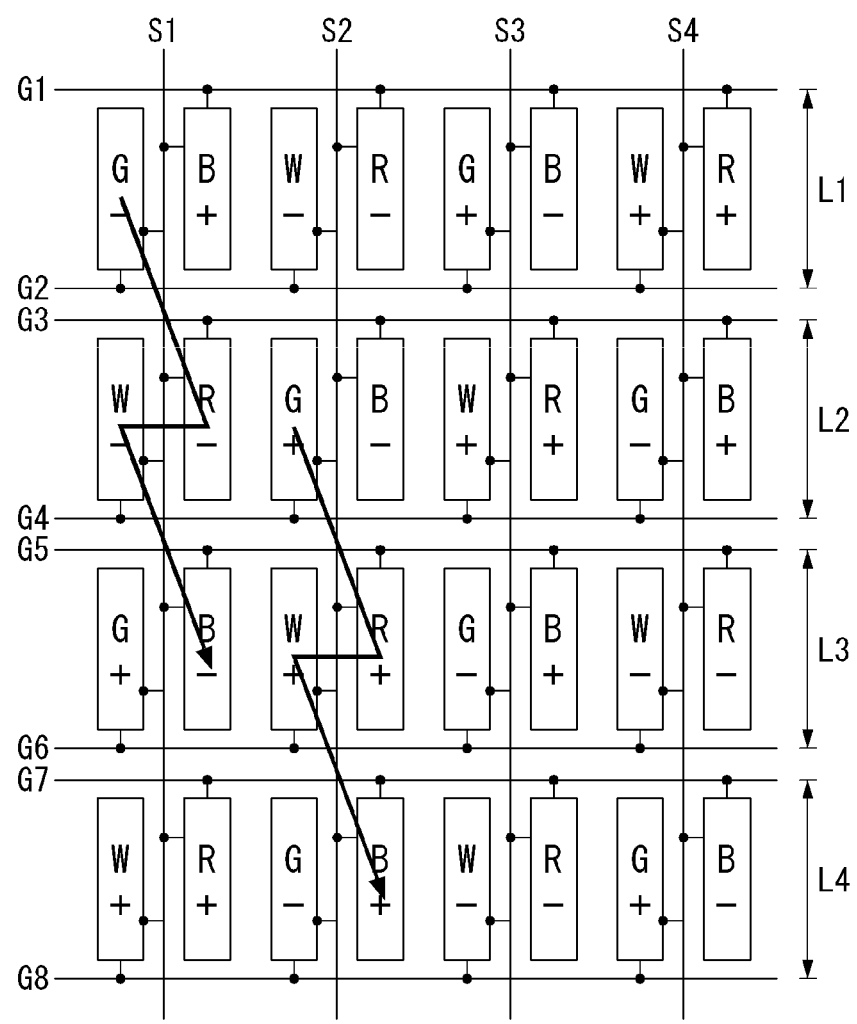

Referring to FIG. 36, during a period, in which a polarity of the data voltage is equally maintained, after the G subpixel is charged to the G data voltage, the R, W, and B subpixels are sequentially charged to the R data voltage, the W data voltage, and the B data voltage in the order named. In the charge order of the data voltage, the polarity of the data voltage is inverted only in the G data voltage. In FIG. 36, the G data voltage is a data voltage of a first color, and the R, W, and B data voltages are data voltages of second to four colors.

Figure 37:
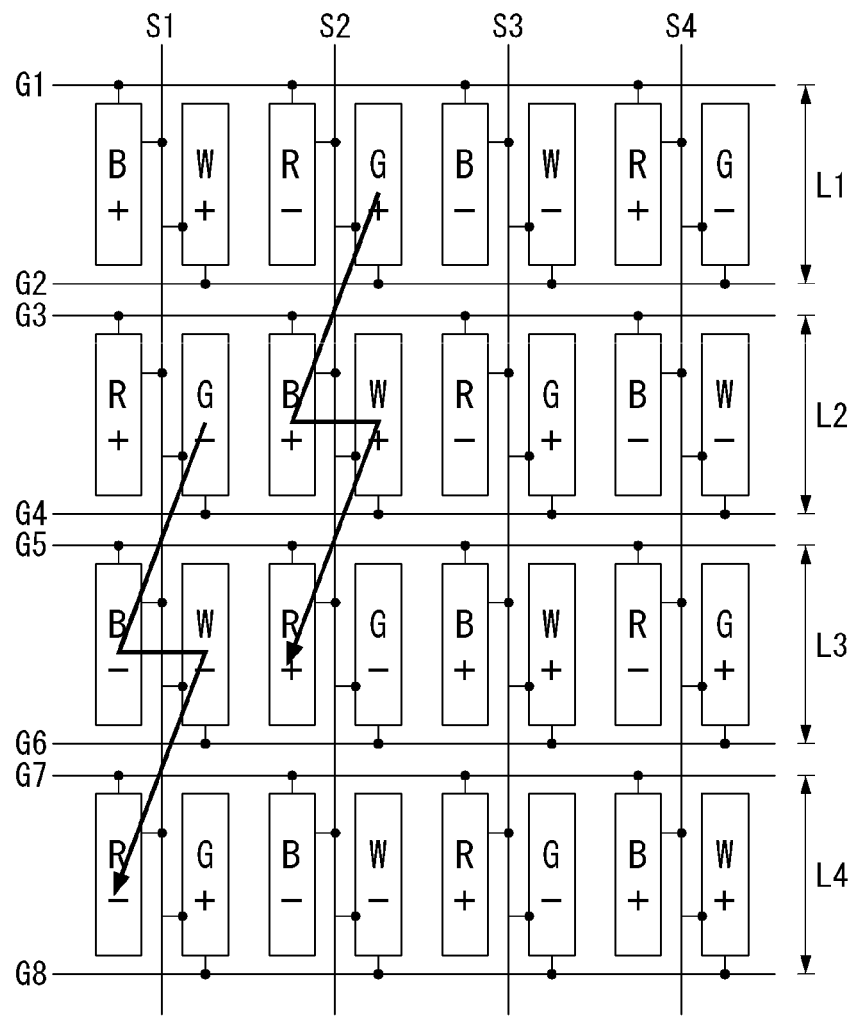

Referring to FIG. 37, during a period, in which a polarity of the data voltage is equally maintained, after the G subpixel is charged to the G data voltage, the B, W, and R subpixels are sequentially charged to the B data voltage, the W data voltage, and the R data voltage in the order named. In the charge order of the data voltage, the polarity of the data voltage is inverted only in the G data voltage. In FIG. 37, the G data voltage is a data voltage of a first color, and the B, W, and R data voltages are data voltages of second to four colors.

Figure 38:
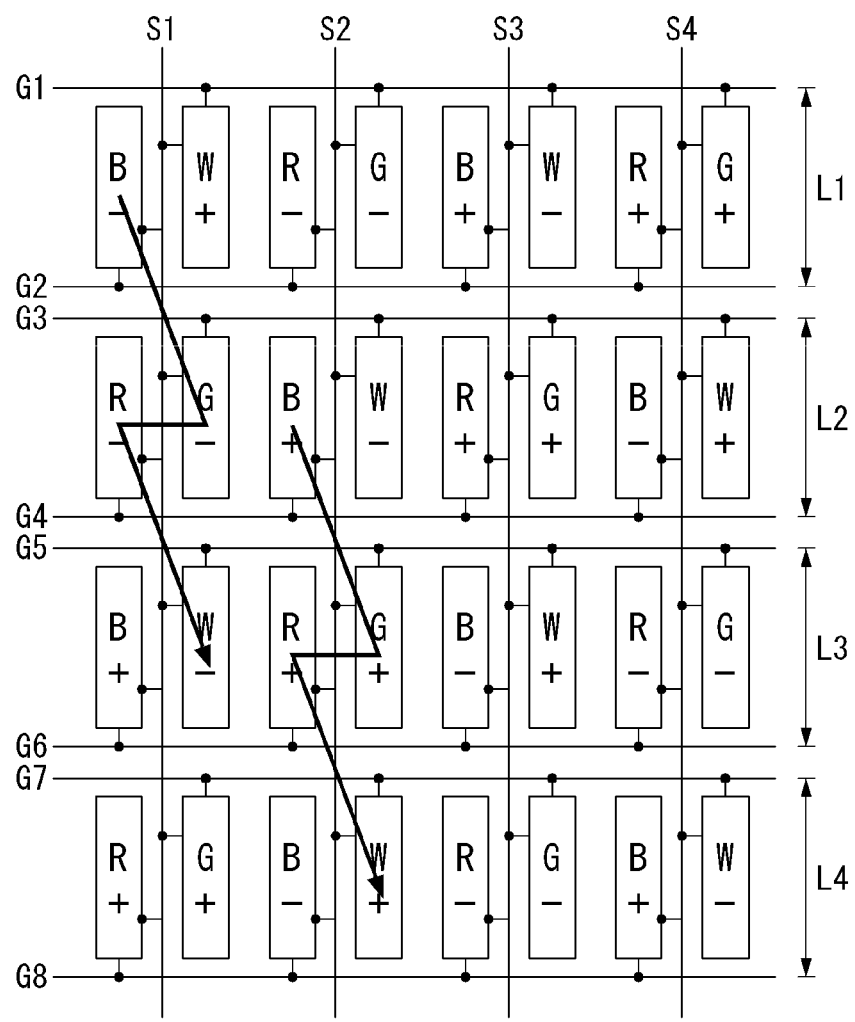

Referring to FIG. 38, during a period, in which a polarity of the data voltage is equally maintained, after the B subpixel is charged to the B data voltage, the G, R, and W subpixels are sequentially charged to the G data voltage, the R data voltage, and the W data voltage in the order named. In the charge order of the data voltage, the polarity of the data voltage is inverted only in the B data voltage. In FIG. 38, the B data voltage is a data voltage of a first color, and the G, R, and W data voltages are data voltages of second to four colors.

Figure 39:
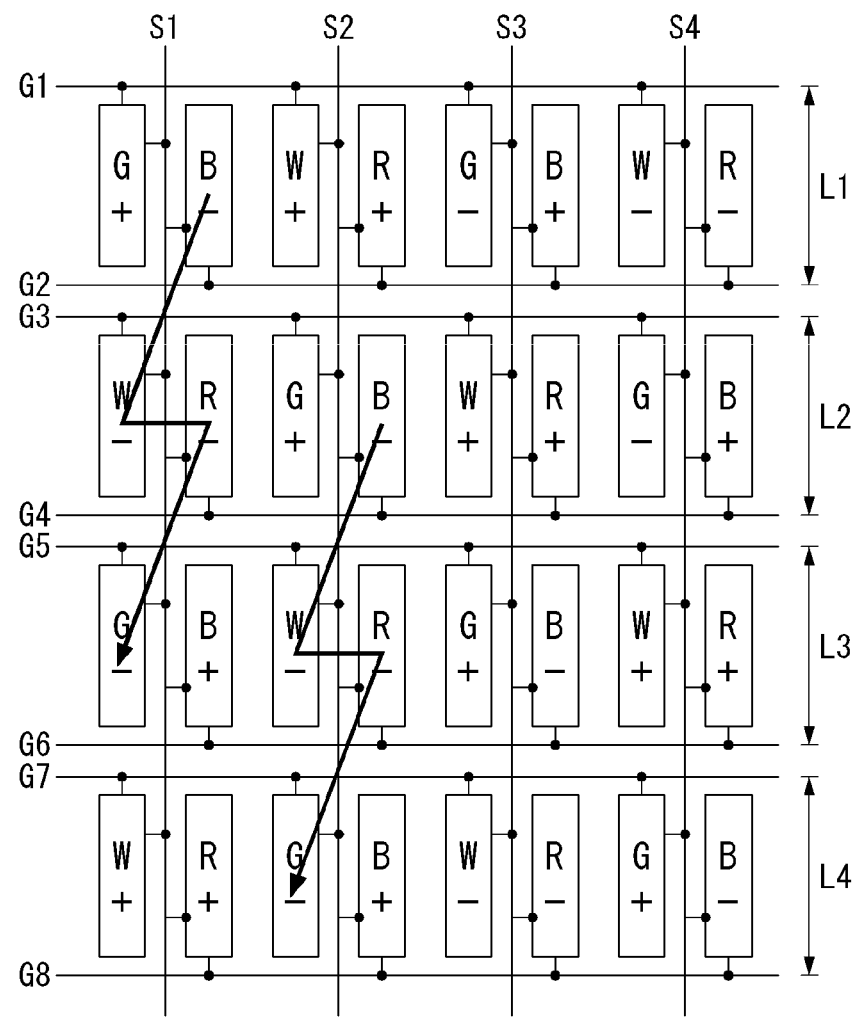

Referring to FIG. 39, during a period, in which a polarity of the data voltage is equally maintained, after the B subpixel is charged to the B data voltage, the W, R, and G subpixels are sequentially charged to the W data voltage, the R data voltage, and the G data voltage in the order named. In the charge order of the data voltage, the polarity of the data voltage is inverted only in the B data voltage. In FIG. 39, the B data voltage is a data voltage of a first color, and the W, R, and G data voltages are data voltages of second to four colors.

Figure 40:
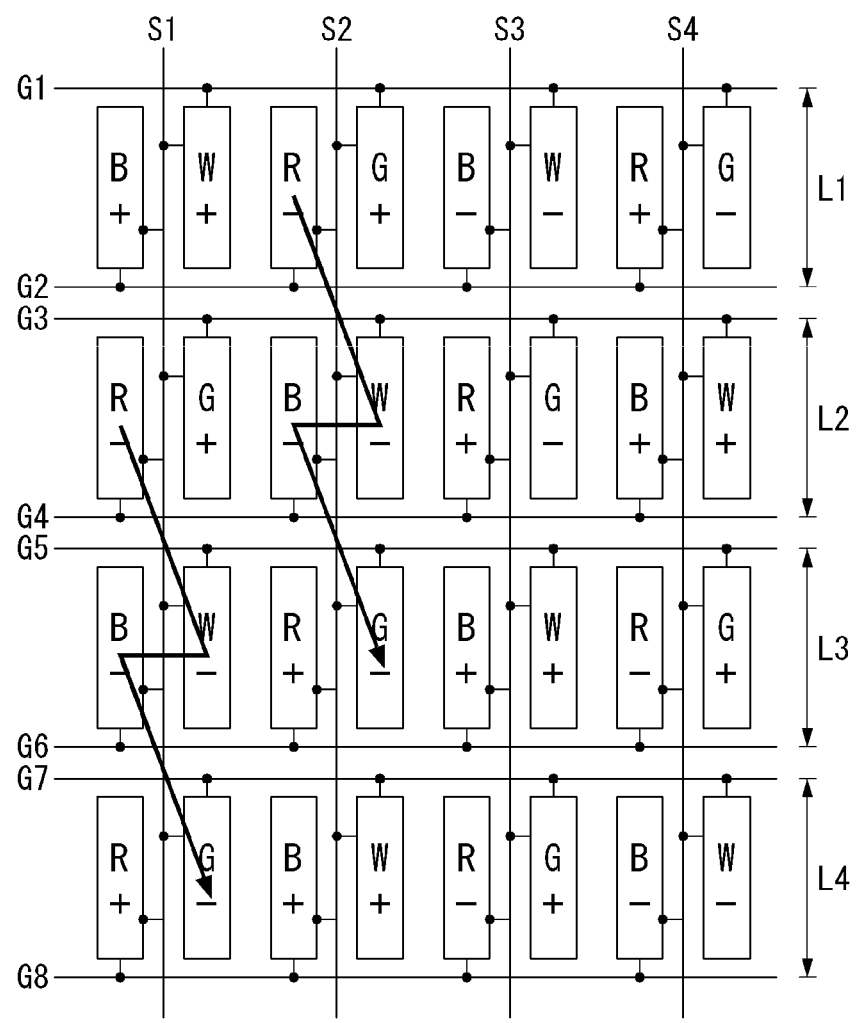

Referring to FIG. 40, during a period, in which a polarity of the data voltage is equally maintained, after the R subpixel is charged to the R data voltage, the W, B, and G subpixels are sequentially charged to the W data voltage, the B data voltage, and the G data voltage in the order named. In the charge order of the data voltage, the polarity of the data voltage is inverted only in the R data voltage. In FIG. 40, the R data voltage is a data voltage of a first color, and the W, B, and G data voltages are data voltages of second to four colors.

Figure 41:
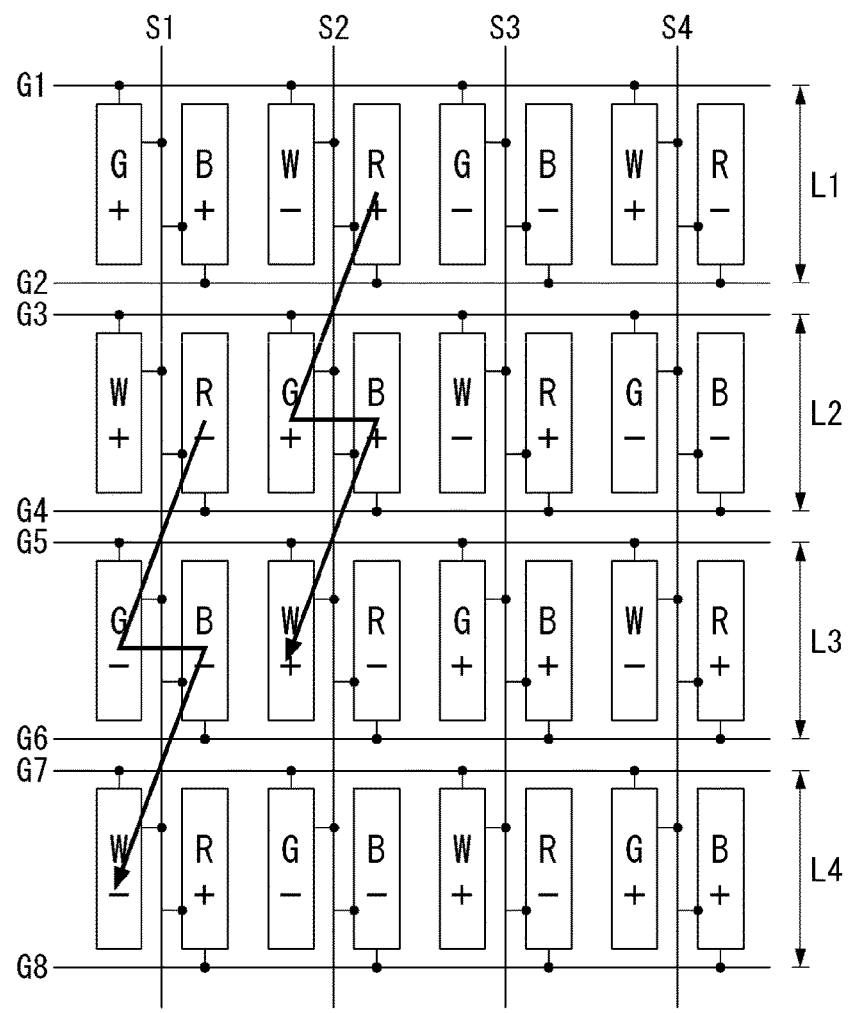

Referring to FIG. 41, during a period, in which a polarity of the data voltage is equally maintained, after the R subpixel is charged to the R data voltage, the G, B, and W subpixels are sequentially charged to the G data voltage, the B data voltage, and the W data voltage in the order named. In the charge order of the data voltage, the polarity of the data voltage is inverted only in the R data voltage. In FIG. 41, the R data voltage is a data voltage of a first color, and the G, B, and W data voltages are data voltages of second to four colors.

The first data line and the last data line may be respectively disposed at a left end and a right end of the pixel array. In this instance, as shown in FIGS. 42 and 43, the first data line S1 and the last data line Sm are connected to each other and may be connected to one output channel of the source driver IC SIC.

Figure 42:
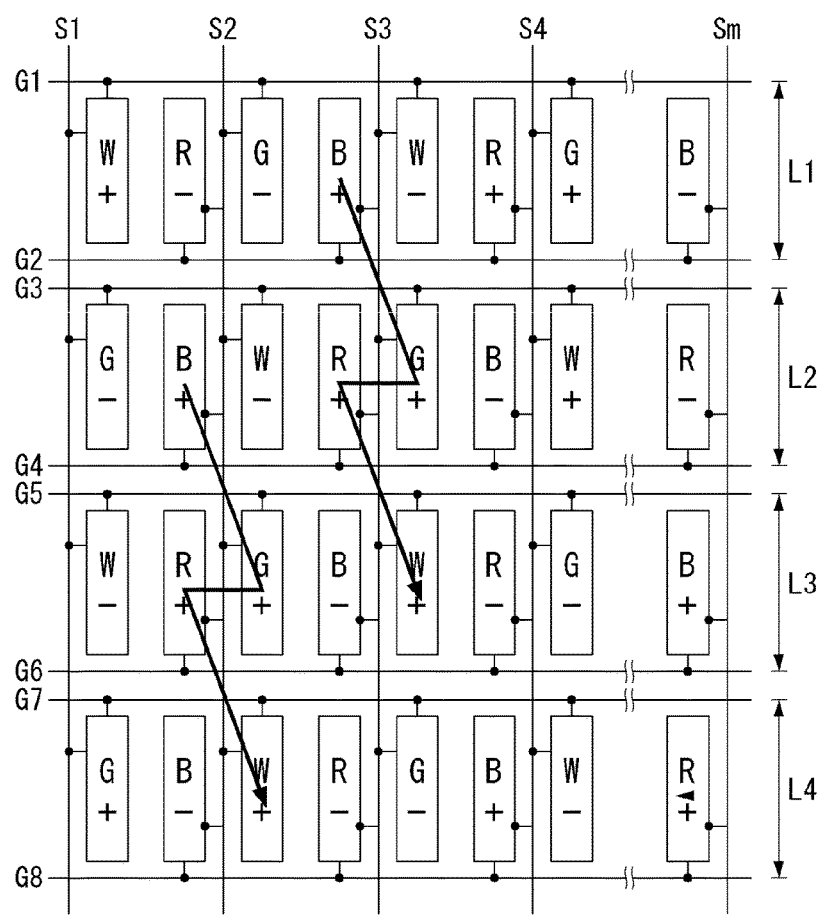

Referring to FIG. 42, during a period, in which a polarity of the data voltage is equally maintained, after the B subpixel is charged to the B data voltage, the G, R, and W subpixels are sequentially charged to the G data voltage, the R data voltage, and the W data voltage in the order named. In the charge order of the data voltage, the polarity of the data voltage is inverted only in the B data voltage. In FIG. 42, the B data voltage is a data voltage of a first color, and the G, R, and W data voltages are data voltages of second to four colors.

Figure 43:
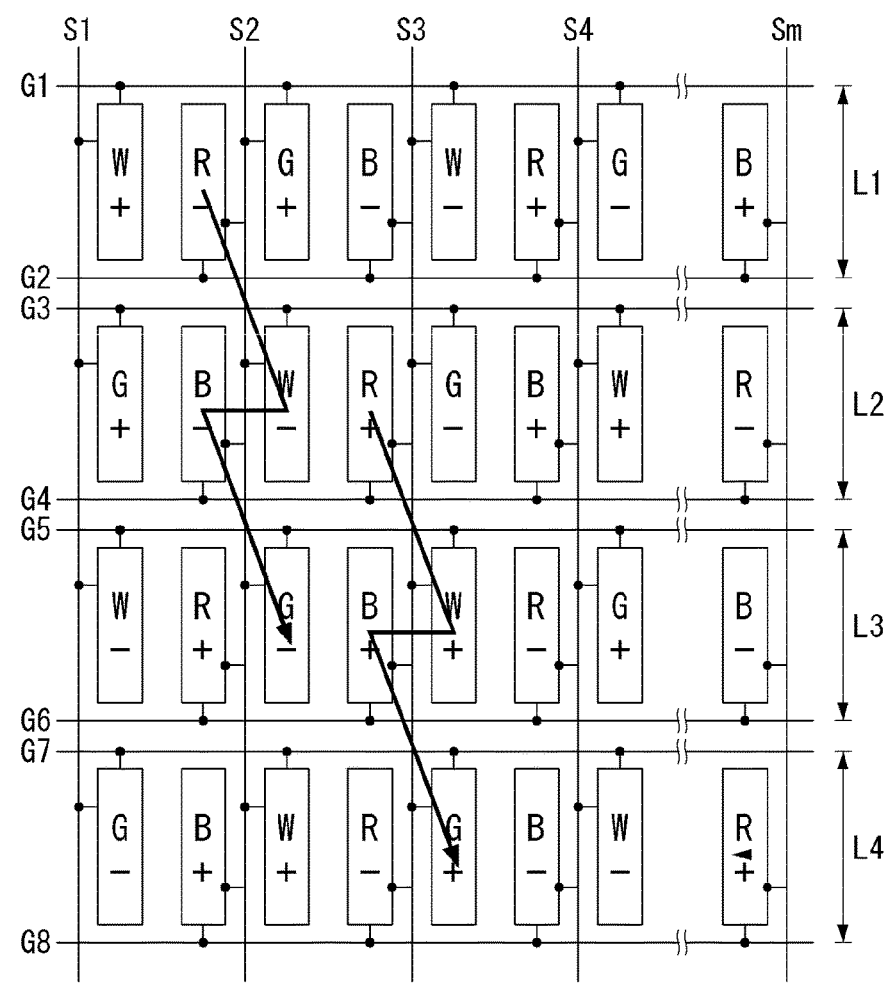

Referring to FIG. 43, during a period, in which a polarity of the data voltage is equally maintained, after the R subpixel is charged to the R data voltage, the W, B, and G subpixels are sequentially charged to the W data voltage, the B data voltage, and the G data voltage in the order named. In the charge order of the data voltage, the polarity of the data voltage is inverted only in the R data voltage. In FIG. 43, the R data voltage is a data voltage of a first color, and the W, B, and G data voltages are data voltages of second to four colors.

In FIGS. 34 to 43, when the subpixel of the first color is disposed on (K+1)-th row lines of the display panel, the subpixels of the second and third colors are disposed on (K+2)-th row lines of the display panel. The subpixel of the fourth color is disposed on (K+3)-th row lines of the display panel.

As described above, the RGBW type DRD display device as the display device according to the embodiment of the disclosure causes the adjacent subpixels to share one data line with each other, and first charges the subpixel of the first color to the data voltage of the first color and charges the subpixels of other colors to the data voltages of other colors during a period, in which the data voltages of the same polarity are successively output. The polarity of the data voltage is inverted in the data voltage of the first color. As a result, the display device according to the embodiment of the disclosure can reduce the number of source driver ICs for driving the pixel array, can improve the power consumption by adding the W subpixel to each pixel, and can implement the image not having the color distortion.

The source driver IC SIC includes a digital-to-analog converter (DAC), which converts the digital video data into the positive and negative gamma compensation voltages and outputs the positive and negative data voltages, and buffers supplying an output of the DAC to the data lines S1 to Sm. The DAC includes a positive DAC (PDAC), which converts the digital video data into the positive gamma compensation voltages and outputs the positive data voltages, and a negative DAC (NDAC), which converts the digital video data into the negative gamma compensation voltages and outputs the negative data voltages.

The buffer of the source driver IC SIC is connected between an output channel of the DAC and the data line of the display panel. Each time the data voltage changes, current is generated in the buffer. Further, each time the polarity of the data voltage changes, a change amount of the data voltage increases. Hence, much more current is generated in the buffer. As a result, the power consumption of the source driver IC SIC increases as a frequency of the data voltage and a change amount of the data voltage increase.

Figure 44:
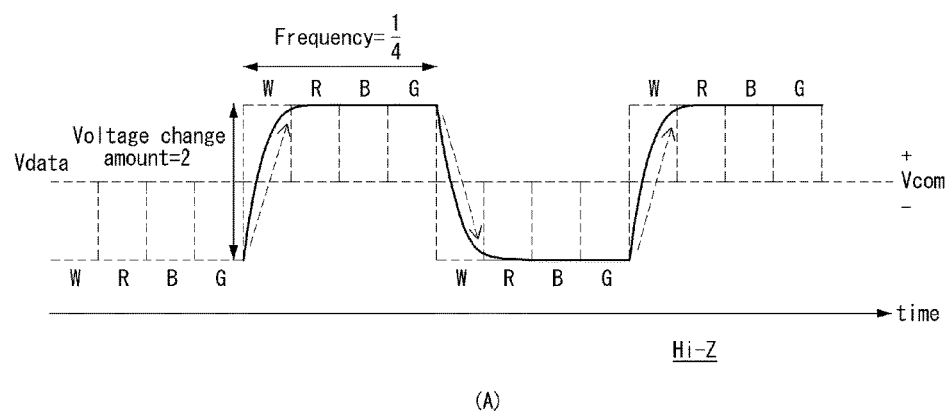
FIG. 44 is a waveform diagram showing a general high impedance (Hi-Z) switching method and a general charge sharing method.
Figure 44:
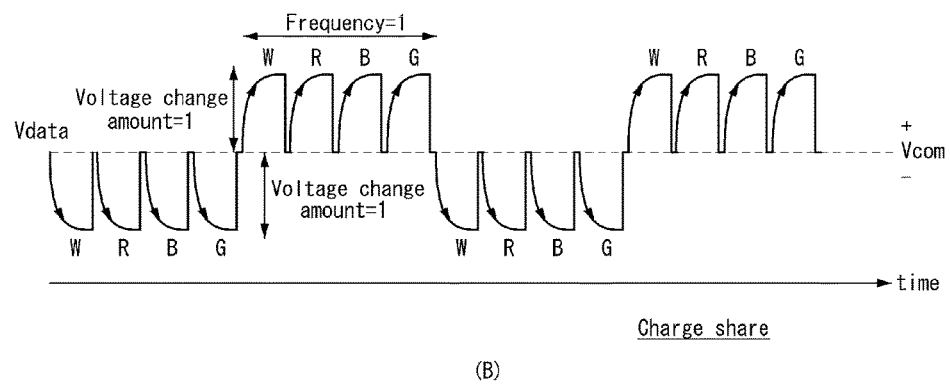

As shown in (A) of FIG. 44, a general high impedance (hi-Z) switching method may be used to reduce the power consumption of the source driver IC SIC. The hi-Z switching method controls the output channels of the source driver IC SIC in a high impedance (hi-Z) state when the polarity of the data voltage Vdata changes. The hi-Z switching method is a method for cutting off a current path between the output channels of the source driver IC SIC and the data lines S1 to Sm. The hi-Z switching method may reduce a frequency and a change amount of the data voltage Vdata when the data voltages of the same polarity are successively input. However, the hi-Z switching method increases the change amount of the data voltage Vdata when the polarity of the data voltage Vdata changes.

As shown in (B) of FIG. 44, a general charge sharing method may be used as another method for reducing the power consumption of the source driver IC SIC. The charge sharing method short-circuits the adjacent data lines S1 to Sm just before the data voltage changes, and levels the voltages of the data lines S1 to Sm. The data lines includes data lines, to which the positive data voltage +Vdata is supplied, and data lines, to which the negative data voltage −Vdata is supplied. Thus, when the charge sharing is performed to short-circuit the data lines, the voltage of the data lines becomes an average voltage between the positive data voltage +Vdata and the negative data voltage −Vdata. The charge sharing method may reduce the change amount of the data voltage Vdata each time the polarity of the data voltage Vdata changes, but may generate the current in the buffer each time the data voltage Vdata changes.

As shown in FIG. 44, supposing that the change amount of the data voltage is 2 and the frequency of the data voltage is ¼ in the hi-Z switching method, the change amount of the data voltage will be 1 and the frequency of the data voltage will be 1 in the charge sharing method.

Figure 45:
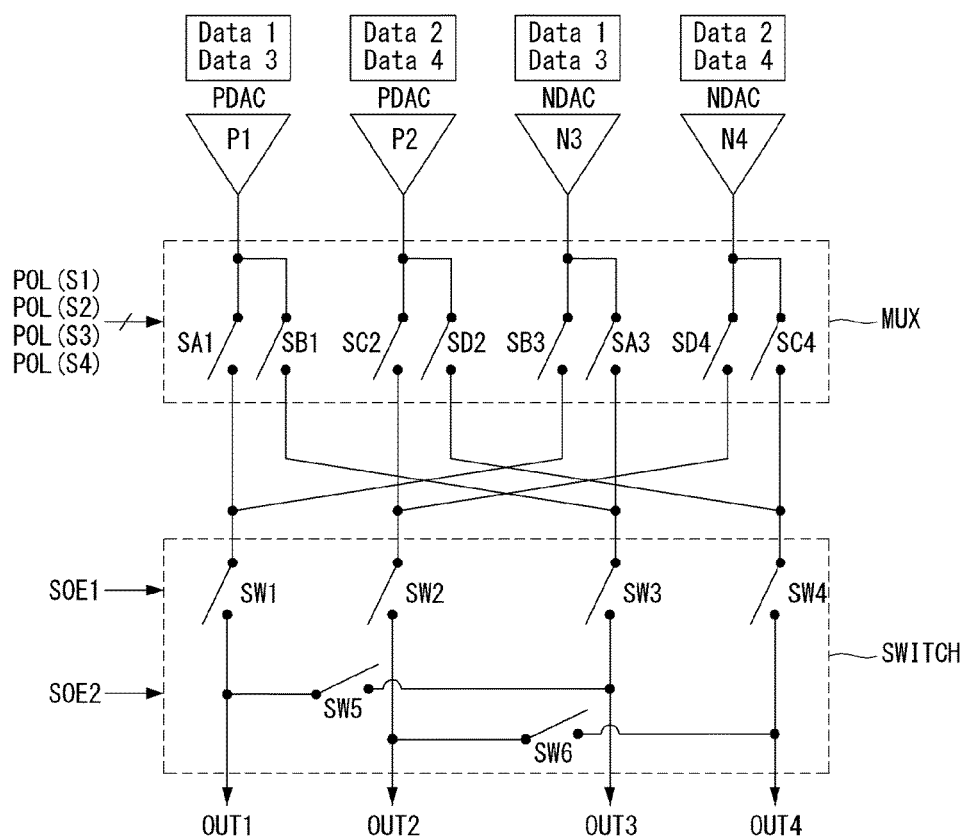
FIG. 45 is a circuit diagram showing a source driver IC according to the first embodiment.
Figure 46:
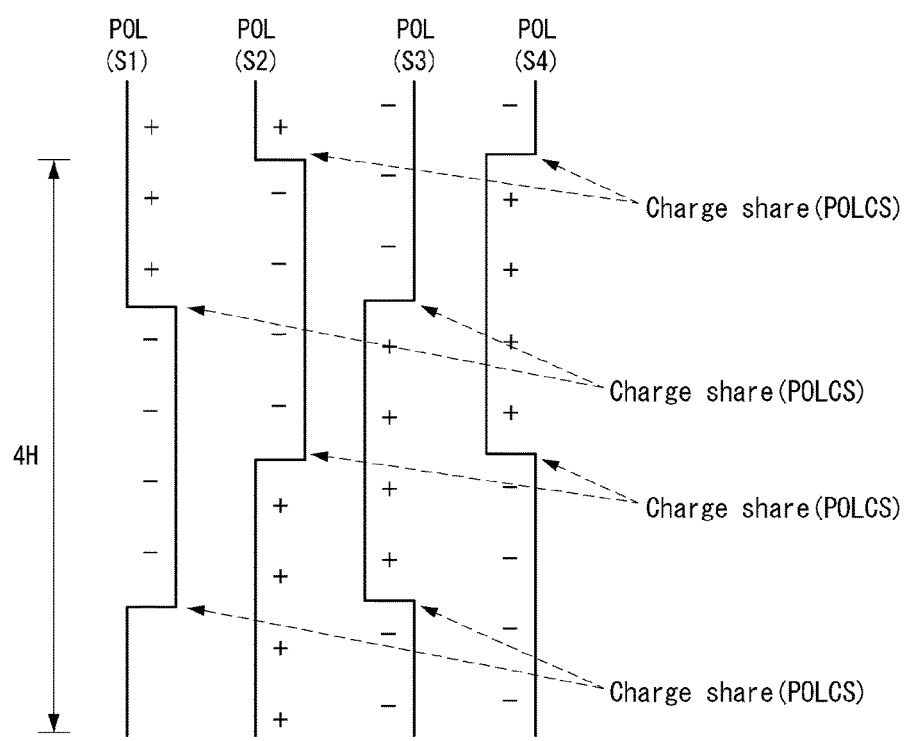
FIG. 46 is a waveform diagram showing a polarity control signal for controlling a charge sharing method according to an exemplary embodiment.
Figure 58:
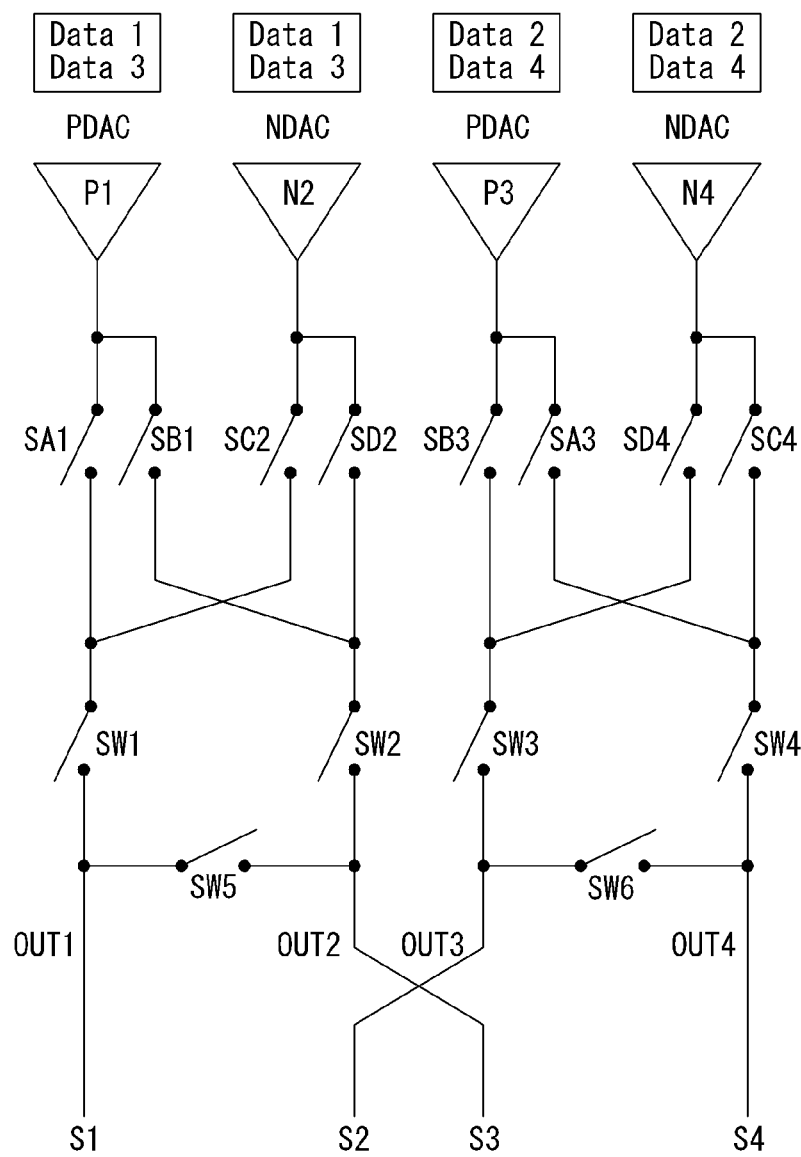
FIG. 58 is a circuit diagram showing a source driver IC according to the third embodiment.

As shown in FIG. 46, the embodiment of the disclosure performs a charge sharing method POLCS only when the polarity of the data voltage is inverted, so as to further reduce the power consumption of the source driver IC SIC. For this, as shown in FIGS. 45, 58, and 59, the embodiment of the disclosure connects output channels OUT1 & OUT3 and OUT2 & OUT4 of the source driver IC SIC, in which the polarities of the data voltages are simultaneously inverted, and requires a circuit capable of simultaneously short-circuiting the output channels.

FIG. 45 is a circuit diagram showing the source driver IC SIC according to the first embodiment. FIG. 46 is a waveform diagram showing the charge sharing method POLCS according to the embodiment of the invention. FIGS. 45 and 46 show buffers and switches between the DAC and the output channels OUT1 to OUT4 of the source driver IC SIC. A shift register, a latch, the DAC, etc. included in the source driver IC SIC are omitted in FIGS. 45 and 46.

Referring to FIGS. 45 and 46, the source driver IC SIC includes a plurality of buffers P1, P2, N3, and N4, a plurality of switches, and the plurality of output channels OUT1 to OUT4.

The buffers P1, P2, N3, and N4 include P-buffers P1 and P2 supplying the positive data voltage +Vdata input from the PDAC to the output channels and N-buffers N3 and N4 supplying the negative data voltage −Vdata input from the NDAC to the output channels. The first P-buffer P1 outputs the positive data voltage +Vdata of first data Data1 to be supplied to the first data line S1 through the first output channel OUT1 and the positive data voltage +Vdata of third data Data3 to be supplied to the third data line S3 through the third output channel OUT3. The second P-buffer P2 outputs the positive data voltage +Vdata of second data Data2 to be supplied to the second data line S2 through the second output channel OUT2 and the positive data voltage +Vdata of fourth data Data4 to be supplied to the fourth data line S4 through the fourth output channel OUT4. The first N-buffer N3 outputs the negative data voltage −Vdata of the first data Data1 to be supplied to the first data line S1 through the first output channel OUT1 and the negative data voltage −Vdata of the third data Data3 to be supplied to the third data line S3 through the third output channel OUT3. The second N-buffer N4 outputs the negative data voltage −Vdata of the second data Data2 to be supplied to the second data line S2 through the second output channel OUT2 and the negative data voltage −Vdata of the fourth data Data4 to be supplied to the fourth data line S4 through the fourth output channel OUT4.

The switches include a multiplexer (MUX) for the data division, data voltage supply switches SW1 to SW4, charge sharing switches SW5 and SW6, and the like.

The multiplexer includes switches (hereinafter referred to as "MUX switches") SA1, SB1, SA3, SB3, SC2, SD2, SC4, and SD4, which divide the data voltage output through one buffer into a plurality of output channels. The multiplexer selects the polarity (i.e., +Vdata or −Vdata) of the data voltage in response to polarity control signals POL(S1), POL(S2), POL(S3), and POL(S4) shown in FIG. 46.

The first MUX switch SA1 connected to the first P-buffer P1 connects an output terminal of the first P-buffer P1 to the first output channel OUT1 in response to a first logical value of the first polarity control signal POL(S1). The second MUX switch SB1 connected to the first P-buffer P1 connects the output terminal of the first P-buffer P1 to the third output channel OUT3 in response to the first logical value of the first polarity control signal POL(S1). The first and second MUX switches SA1 and SB1 are turned off when the first polarity control signal POL(S1) has a second logical value.

The third MUX switch SC2 connected to the second P-buffer P2 connects an output terminal of the second P-buffer P2 to the second output channel OUT2 in response to a first logical value of the second polarity control signal POL(S2). The fourth MUX switch SD2 connected to the second P-buffer P2 connects the output terminal of the second P-buffer P2 to the fourth output channel OUT4 in response to the first logical value of the second polarity control signal POL(S2). The third and fourth MUX switches SC2 and SD2 are turned off when the second polarity control signal POL(S2) has a second logical value.

The fifth MUX switch SB3 connected to the first N-buffer N3 connects an output terminal of the first N-buffer N3 to the first output channel OUT1 in response to a second logical value of the third polarity control signal POL(S3). The sixth MUX switch SA3 connected to the first N-buffer N3 connects the output terminal of the first N-buffer N3 to the third output channel OUT3 in response to the second logical value of the third polarity control signal POL(S3). The fifth and sixth MUX switches SB3 and SA3 are turned off when the third polarity control signal POL(S3) has a first logical value.

The seventh MUX switch SD4 connected to the second N-buffer N4 connects an output terminal of the second N-buffer N4 to the second output channel OUT2 in response to a second logical value of the fourth polarity control signal POL(S4). The eighth MUX switch SC4 connected to the second N-buffer N4 connects the output terminal of the second N-buffer N4 to the fourth output channel OUT4 in response to the second logical value of the fourth polarity control signal POL(S4). The seventh and eighth MUX switches SD4 and SC4 are turned off when the fourth polarity control signal POL(S4) has a first logical value.

Figure 47:
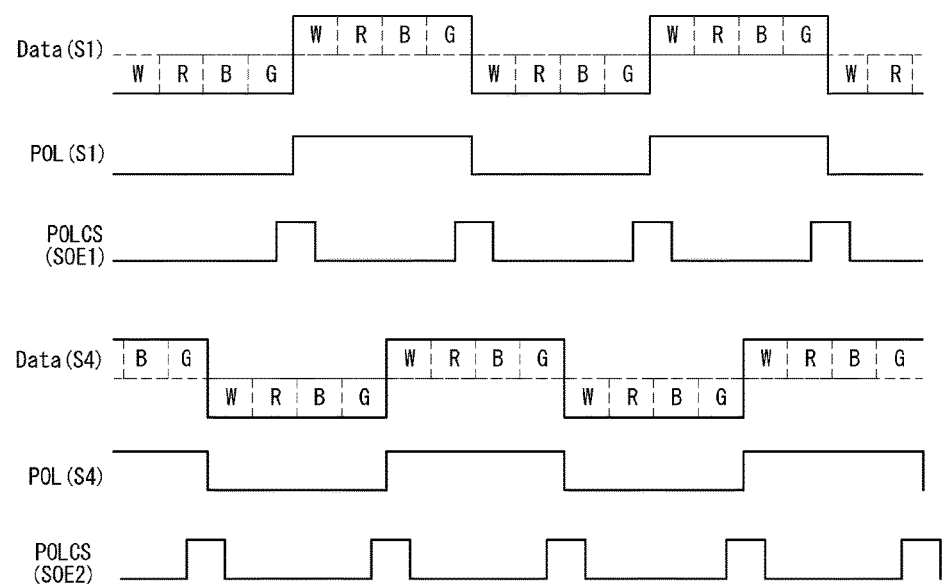
FIG. 47 is a waveform diagram showing a polarity waveform, an output timing waveform, and a charge sharing timing waveform of a data voltage applied to first to fourth data lines.

The data voltage supply switches SW1 to SW4 are disposed between the multiplexer and the output channels OUT1 to OUT4 and supply the positive and negative data voltages +Vdata and −Vdata from the multiplexer to the output channels OUT1 to OUT4. Each of the data voltage supply switches SW1 to SW4 includes an input terminal connected to the two MUX switches and an output terminal connected to one output channel. The first and third data voltage supply switches SW1 and SW3 supply the positive and negative data voltages +Vdata and −Vdata to the first and third output channels OUT1 and OUT3 in response to a second logical value of a first source output enable signal SOE1 shown in FIG. 47. The second and fourth data voltage supply switches SW2 and SW4 supply the positive and negative data voltages +Vdata and −Vdata to the second and fourth output channels OUT2 and OUT4 in response to a second logical value of a second source output enable signal SOE2 shown in FIG. 47.

The charge sharing switches (hereinafter referred to as "CS switches") SW5 and SW6 connect the output channels, in which the polarities of the data voltages simultaneously change when the polarity of the data voltage changes.

The first CS switch SW5 is connected to the first and third output channels OUT1 and OUT3 connected to the data lines S1 and S3 belonging to a first data line group. The first CS switch SW5 is turned on at first charge sharing timing and performs the charge sharing on the data lines S1 and S3 belonging to the first data line group. The first charge sharing timing is controlled by the first source output enable signal SOE1 shown in FIG. 47. The first CS switch SW5 connects the first and third output channels OUT1 and OUT3 in response to a first logical value of the first source output enable signal SOE1 and performs the charge sharing on the first data line group.

The second CS switch SW6 is connected to the second and fourth output channels OUT2 and OUT4 connected to the data lines S2 and S4 belonging to a second data line group. The second CS switch SW6 is turned on at second charge sharing timing and performs the charge sharing on the data lines S2 and S4 belonging to the second data line group. The second charge sharing timing is controlled by the second source output enable signal SOE2 shown in FIG. 47. The second CS switch SW6 connects the second and fourth output channels OUT2 and OUT4 in response to a first logical value of the second source output enable signal SOE2 and performs the charge sharing on the second data line group.

The following Table 1 indicates operation states of the buffers and the output channels shown in FIGS. 45 and 46 in accordance with four cases.

TABLE 1

| Output channel No. | | OUT1 | OUT2 | OUT3 | OUT4 |
|---|---|---|---|---|---|
| CASE 1 | Output polarity | + | + | − | − |
| | Buffer | P1 | P2 | N3 | N4 |
| | ON-switch | SA1, SW1 | SC2, SW2 | SA3, SW3 | SC4, SW4 |
| CASE 2 | Output polarity | − | − | + | + |
| | Buffer | N3 | N4 | P1 | P2 |
| | ON-switch | SB3, SW1 | SD4, SW2 | SB1, SW3 | SD2, SW4 |
| CASE 3 | Output polarity | + | − | − | + |
| | Buffer | P1 | N4 | N3 | P2 |
| | ON-switch | SA1, SW1 | SD4, SW2 | SA3, SW3 | SD2, SW4 |
| CASE 4 | Output polarity | − | + | + | − |
| | Buffer | N3 | P2 | P1 | N4 |
| | ON-switch | SB3, SW1 | SC2, SW2 | SB1, SW3 | SC4, SW4 |

Figure 48:
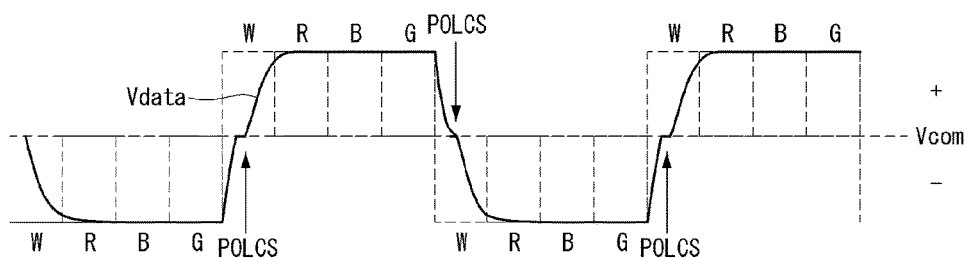
FIG. 48 is a waveform diagram showing a charge sharing timing according to an exemplary embodiment.

As shown in FIG. 48, the embodiment of the disclosure performs the charge sharing method POLCS only when the polarity of the data voltage is inverted, thereby reducing a change amount of the data voltage generated when the polarity of the data voltage changes. Further, the embodiment of the disclosure reduces the frequency of the data voltage and thus can greatly reduce the power consumption of the source driver IC, compared to the general hi-Z switching method or the general charge sharing method shown in FIG. 44. The source driver IC according to the embodiment of the disclosure sequentially generates the data voltages of the first to fourth colors at the first polarity, inverts the first polarity of the data voltage of the first color to a second polarity, and sequentially generates the data voltages of the first to fourth colors at the second polarity. The charge sharing method POLCS according to the embodiment of the disclosure reduces a change amount of the data voltage of the first color, of which the polarity is inverted, and thus can reduce a rising time of the data voltage of the first color. Hence, a charge amount of the subpixel of the first color can increase.

FIG. 49 shows a comparison of the charge sharing method POLCS according to the embodiment of the disclosure, the general Hi-Z switching method, and the general charge sharing method with respect to the change amount, the frequency, and dynamic power consumption of the data voltage. The dynamic power consumption is obtained by (the voltage change amount×the frequency). In FIG. 49, white, red, green, blue, yellow, and magenta indicate colors of an experimental image pattern. As can be seen from FIG. 49, the charge sharing method POLCS according to the embodiment of the disclosure can greatly reduce the power consumption in white color and cyan color compared to the general hi-Z switching method and the general charge sharing method, and also can obtain a reduction effect of the power consumption similar to or better than the general hi-Z switching and charge sharing methods in other colors.

Figure 50:
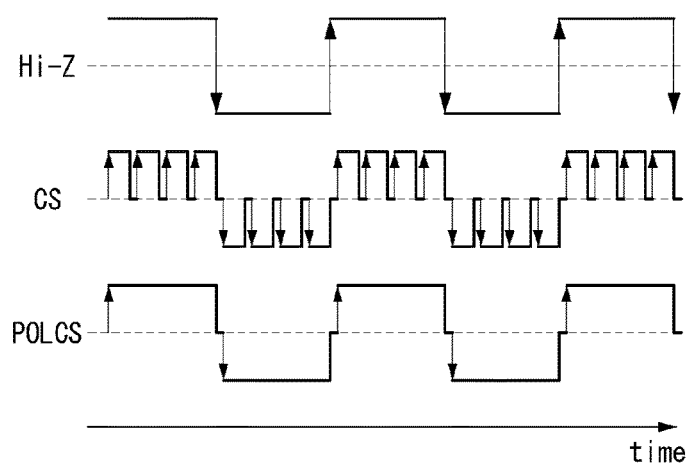
FIG. 50 shows a comparison of a general hi-Z switching method, a general charge sharing method, and a charge sharing method according to an exemplary embodiment in white color.
Figure 51:
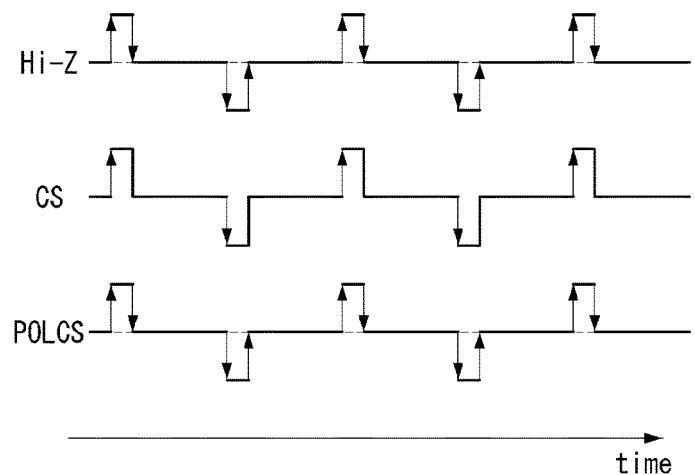
FIG. 51 shows a comparison of a general hi-Z switching method, a general charge sharing method, and a charge sharing method according to an exemplary embodiment in red color.
Figure 52:
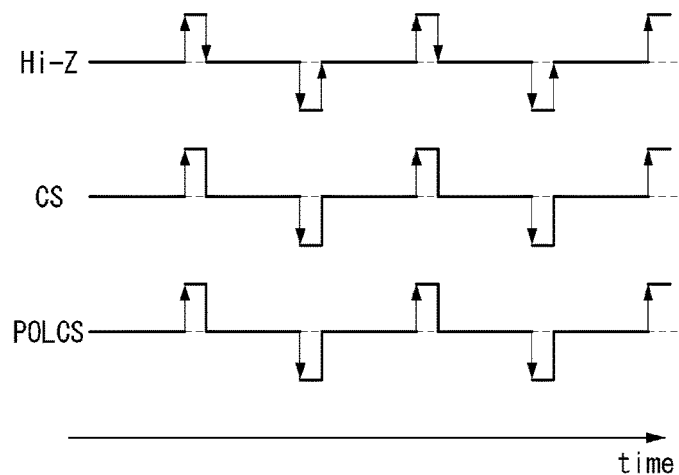
FIG. 52 shows a comparison of a general hi-Z switching method, a general charge sharing method, and a charge sharing method according to an exemplary embodiment in green color.
Figure 53:
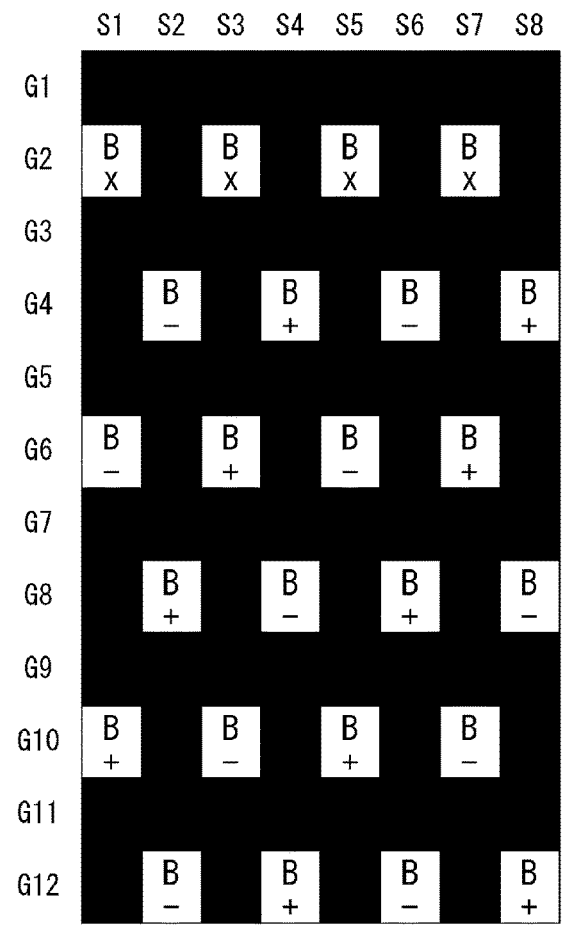
FIG. 53 shows a comparison of a general hi-Z switching method, a general charge sharing method, and a charge sharing method according to an exemplary embodiment in blue color.
Figure 53:
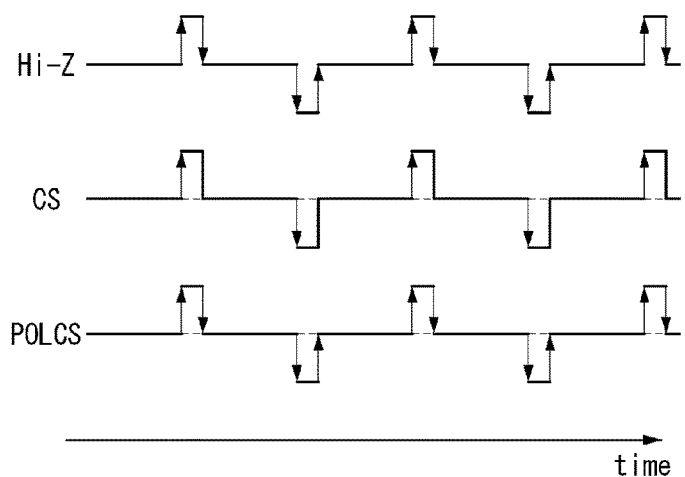
Figure 54:
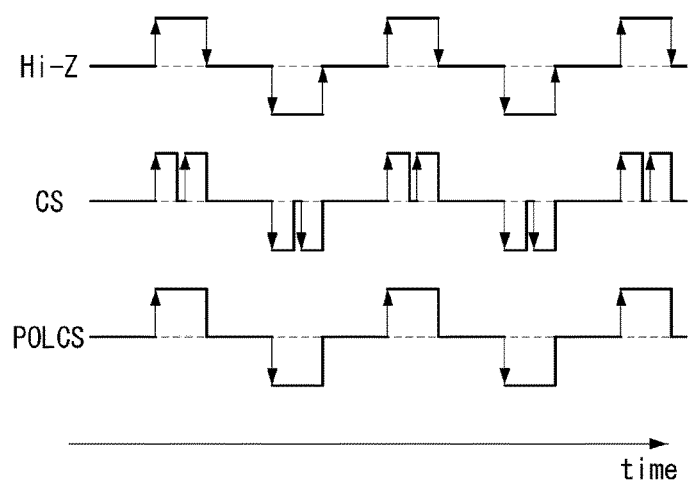
FIG. 54 shows a comparison of a general hi-Z switching method, a general charge sharing method, and a charge sharing method according to an exemplary embodiment in cyan color.
Figure 55:
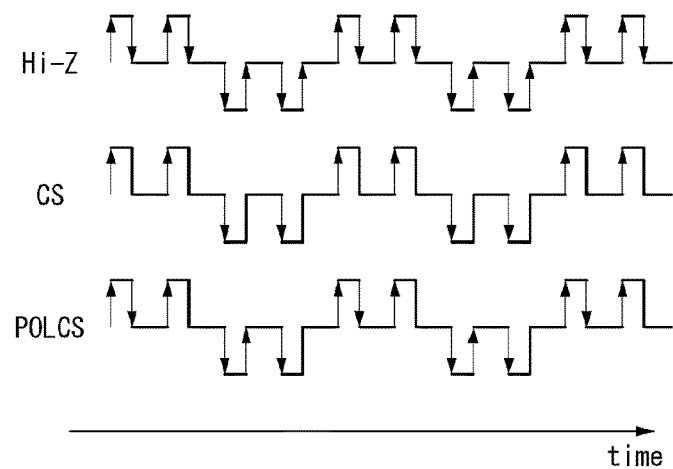
FIG. 55 shows a comparison of a general hi-Z switching method, a general charge sharing method, and a charge sharing method according to an exemplary embodiment in yellow color.
Figure 56:
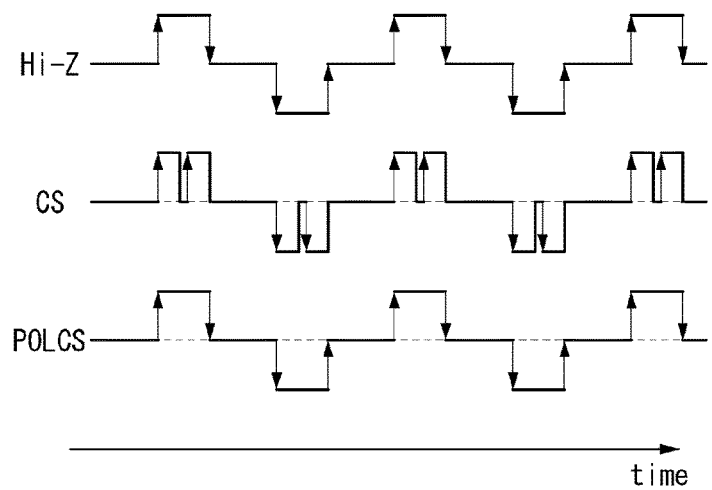
FIG. 56 shows a comparison of a general hi-Z switching method, a general charge sharing method, and a charge sharing method according to an exemplary embodiment in magenta color.

FIG. 50 shows a comparison of the general switching method Hi-Z, the general charge sharing method CS, and the charge sharing method POLCS according to the embodiment of the disclosure in white color. FIG. 51 shows a comparison of the general switching method Hi-Z, the general charge sharing method CS, and the charge sharing method POLCS according to the embodiment of the disclosure in red color. FIG. 52 shows a comparison of the general switching method Hi-Z, the general charge sharing method CS, and the charge sharing method POLCS according to the embodiment of the disclosure in green color. FIG. 53 shows a comparison of the general switching method Hi-Z, the general charge sharing method CS, and the charge sharing method POLCS according to the embodiment of the disclosure in blue color. FIG. 54 shows a comparison of the general switching method Hi-Z, the general charge sharing method CS, and the charge sharing method POLCS according to the embodiment of the disclosure in cyan color. FIG. 55 shows a comparison of the general Hi-Z switching method Hi-Z, the general charge sharing method CS, and the charge sharing method POLCS according to the embodiment of the disclosure in yellow color. FIG. 56 shows a comparison of the general switching method Hi-Z, the general charge sharing method CS, and the charge sharing method POLCS according to the embodiment of the disclosure in magenta color. In FIGS. 50 to 56, "+" is the positive data voltage, "−" is the negative data voltage, and "X" is dummy data.

Figure 57:
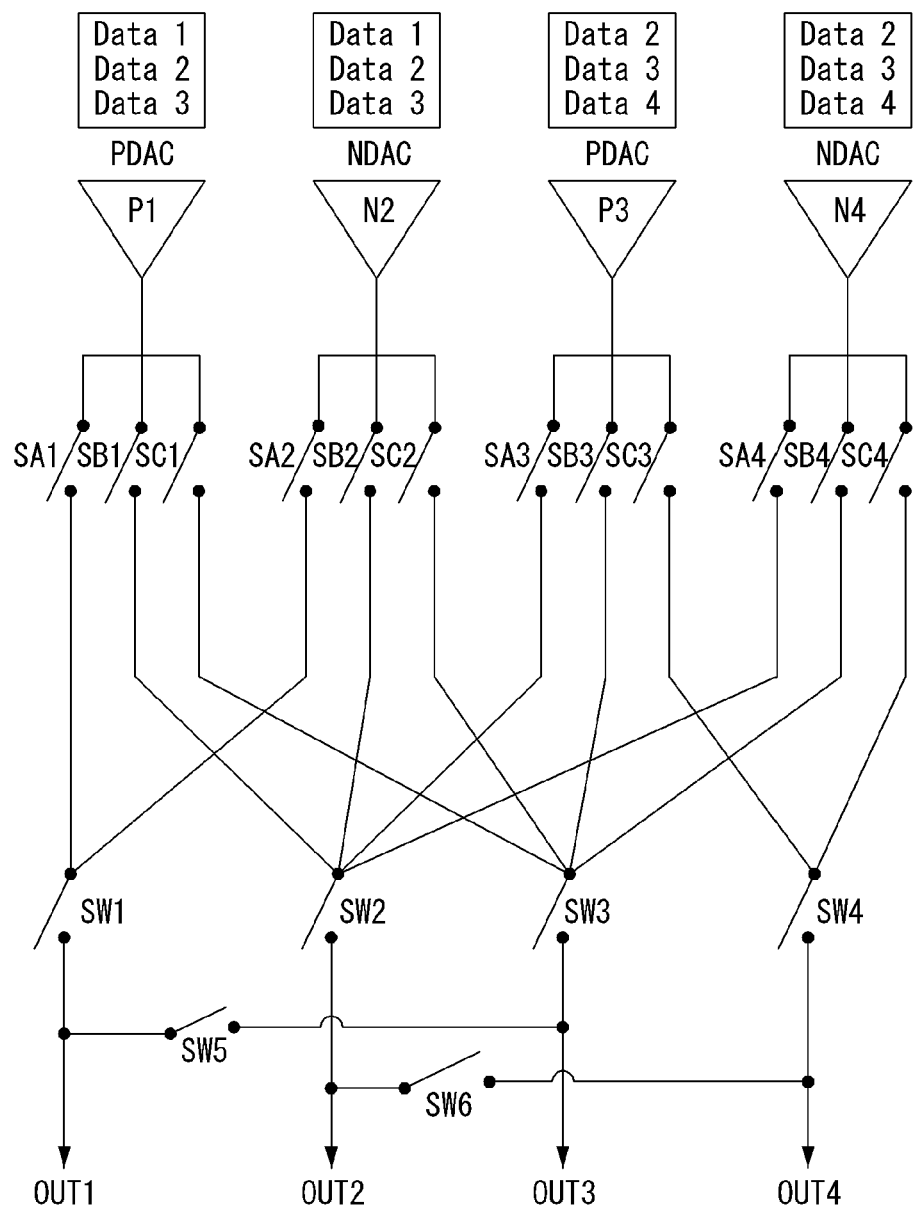
FIG. 57 is a circuit diagram showing a source driver IC according to the second embodiment.

FIG. 57 is a circuit diagram showing the source driver IC SIC according to the second embodiment of the disclosure. A shift register, a latch, a DAC, etc. included in the source driver IC SIC are omitted in FIG. 57.

Referring to FIG. 57, the source driver IC SIC includes a plurality of buffers P1, N2, P3, and N4, a plurality of switches, and a plurality of output channels OUT1 to OUT4.

The buffers P1, N2, P3, and N4 include P-buffers P1 and P3 supplying the positive data voltage +Vdata input from the PDAC to the output channels and N-buffers N2 and N4 supplying the negative data voltage −Vdata input from the NDAC to the output channels.

The P-buffers P1 and P3 and the N-buffers N2 and N4 may be alternately disposed as shown in FIG. 57. The first P-buffer P1 outputs the positive data voltage +Vdata of first data Data1 to be supplied to the first data line S1 through the first output channel OUT1, the positive data voltage +Vdata of second data Data2 to be supplied to the second data line S2 through the second output channel OUT2, and the positive data voltage +Vdata of third data Data3 to be supplied to the third data line S3 through the third output channel OUT3. The first N-buffer N2 outputs the negative data voltage −Vdata of the first data Data1 to be supplied to the first data line S1 through the first output channel OUT1, the negative data voltage −Vdata of the second data Data2 to be supplied to the second data line S2 through the second output channel OUT2, and the negative data voltage −Vdata of the third data Data3 to be supplied to the third data line S3 through the third output channel OUT3. The second P-buffer P3 outputs the positive data voltage +Vdata of second data Data2 to be supplied to the second data line S2 through the second output channel OUT2, the positive data voltage +Vdata of the third data Data3 to be supplied to the third data line S3 through the third output channel OUT3, and the positive data voltage +Vdata of fourth data Data4 to be supplied to the fourth data line S4 through the fourth output channel OUT4. The second N-buffer N4 outputs the negative data voltage −Vdata of the second data Data2 to be supplied to the second data line S2 through the second output channel OUT2, the negative data voltage −Vdata of the third data Data3 to be supplied to the third data line S3 through the third output channel OUT3, and the negative data voltage −Vdata of the fourth data Data4 to be supplied to the fourth data line S4 through the fourth output channel OUT4.

The switches include a multiplexer (MUX) for the data division, data voltage supply switches SW1 to SW4, charge sharing switches SW5 and SW6, and the like.

The multiplexer includes MUX switches SA1-SA4, SB1-SB4, and SC1-SC4, which divide the data voltage output through one buffer into a plurality of output channels. The multiplexer selects the polarity (i.e., +Vdata or −Vdata) of the data voltage in response to polarity control signals POL(S1), POL(S2), POL(S3), and POL(S4) shown in FIG. 46. One buffer is connected to three output channels through the multiplexer. Thus, the source driver IC SIC according to the second embodiment of the invention may further reduce the number of buffers, compared to the source driver IC shown in FIG. 45.

The data voltage supply switches SW1 to SW4 are disposed between the multiplexer and the output channels OUT1 to OUT4 and supply the positive and negative data voltages +Vdata and −Vdata from the multiplexer to the output channels OUT1 to OUT4. Each of the data voltage supply switches SW1 to SW4 includes an input terminal connected to the two MUX switches and an output terminal connected to one output channel. The first and third data voltage supply switches SW1 and SW3 supply the positive and negative data voltages +Vdata and −Vdata to the first and third output channels OUT1 and OUT3 in response to a second logical value of a first source output enable signal SOE1 shown in FIG. 47. The second and fourth data voltage supply switches SW2 and SW4 supply the positive and negative data voltages +Vdata and −Vdata to the second and fourth output channels OUT2 and OUT4 in response to a second logical value of a second source output enable signal SOE2 shown in FIG. 47.

The charge sharing switches (hereinafter referred to as "CS switches") SW5 and SW6 connect the output channels, in which the polarities of the data voltages simultaneously change when the polarity of the data voltage changes. The first CS switch SW5 is connected to the first and third output channels OUT1 and OUT3. The first CS switch SW5 connects the first and third output channels OUT1 and OUT3 in response to a first logical value of the first source output enable signal SOE1 and performs the charge sharing. The second CS switch SW6 is connected to the second and fourth output channels OUT2 and OUT4. The second CS switch SW6 connects the second and fourth output channels OUT2 and OUT4 in response to a first logical value of the second source output enable signal SOE2 and performs the charge sharing.

The following Table 2 indicates operation states of the buffers and the output channels shown in FIG. 57 in accordance with four cases.

TABLE 2

| | Output channel No. | OUT1 | OUT2 | OUT3 | OUT4 |
|---|---|---|---|---|---|
| CASE 1 | Output polarity | + | + | − | − |
| | Buffer | P1 | P3 | N2 | N4 |
| | ON-switch | SA1, SW1 | SA3, SW2 | SC2, SW3 | SC4, SW4 |
| CASE 2 | Output polarity | − | − | + | + |
| | Buffer | N2 | N4 | P1 | P3 |
| | ON-switch | SB2, SW1 | SA4, SW2 | SC1, SW3 | SC2, SW4 |
| CASE 3 | Output polarity | + | − | − | + |
| | Buffer | P1 | N2 | N4 | P3 |
| | ON-switch | SA1, SW1 | SB2, SW2 | SB4, SW3 | SC3, SW4 |
| CASE 4 | Output polarity | − | + | + | − |
| | Buffer | N2 | P1 | P3 | N4 |
| | ON-switch | SA2, SW1 | SB1, SW2 | SB3, SW3 | SC4, SW4 |

FIG. 58 is a circuit diagram showing the source driver IC SIC according to the third embodiment of the disclosure. A shift register, a latch, a DAC, etc. included in the source driver IC SIC are omitted in FIG. 58.

Referring to FIG. 58, the source driver IC SIC includes a plurality of buffers P1, N2, P3, and N4, a plurality of switches, and a plurality of output channels OUT1 to OUT4.

The buffers P1, N2, P3, and N4 include P-buffers P1 and P3 supplying the positive data voltage +Vdata input from the PDAC to the output channels and N-buffers N2 and N4 supplying the negative data voltage −Vdata input from the NDAC to the output channels. The P-buffers P1 and P3 and the N-buffers N2 and N4 may be alternately disposed as shown in FIG. 58. The first P-buffer P1 outputs the positive data voltage +Vdata of first data Data1 to be supplied to the first data line S1 through the first output channel OUT1 and the positive data voltage +Vdata of third data Data3 to be supplied to the third data line S3 through the second output channel OUT2. The first N-buffer N2 outputs the negative data voltage −Vdata of the first data Data1 to be supplied to the first data line S1 through the first output channel OUT1 and the negative data voltage −Vdata of the third data Data3 to be supplied to the third data line S3 through the second output channel OUT2. The second P-buffer P3 outputs the positive data voltage +Vdata of second data Data2 to be supplied to the second data line S2 through the third output channel OUT3 and the positive data voltage +Vdata of fourth data Data4 to be supplied to the fourth data line S4 through the fourth output channel OUT4. The second N-buffer N4 outputs the negative data voltage −Vdata of the second data Data2 to be supplied to the second data line S2 through the third output channel OUT3 and the negative data voltage −Vdata of the fourth data Data4 to be supplied to the fourth data line S4 through the fourth output channel OUT4.

The switches include a multiplexer (MUX) for the data division, data voltage supply switches SW1 to SW4, charge sharing switches SW5 and SW6, and the like.

The multiplexer includes MUX switches SA1, SB1, SA3, SB3, SC2, SD2, SC4, and SD4, which divide the data voltage output through one buffer into a plurality of output channels. The multiplexer selects the polarity (i.e., +Vdata or −Vdata) of the data voltage in response to polarity control signals POL(S1), POL(S2), POL(S3), and POL(S4) shown in FIG. 46.

The data voltage supply switches SW1 to SW4 are disposed between the multiplexer and the output channels OUT1 to OUT4 and supply the positive and negative data voltages +Vdata and −Vdata from the multiplexer to the output channels OUT1 to OUT4. Each of the data voltage supply switches SW1 to SW4 includes an input terminal connected to the two MUX switches and an output terminal connected to one output channel. The first and second data voltage supply switches SW1 and SW2 supply the positive and negative data voltages +Vdata and −Vdata to the first and second output channels OUT1 and OUT2 in response to a second logical value of a first source output enable signal SOE1 shown in FIG. 47. The third and fourth data voltage supply switches SW3 and SW4 supply the positive and negative data voltages +Vdata and −Vdata to the third and fourth output channels OUT3 and OUT4 in response to a second logical value of a second source output enable signal SOE2 shown in FIG. 47.

The charge sharing switches (hereinafter referred to as "CS switches") SW5 and SW6 connect the output channels, in which the polarities of the data voltages simultaneously change when the polarity of the data voltage changes. The first CS switch SW5 is connected to the first and second output channels OUT1 and OUT2. The first CS switch SW5 connects the first and second output channels OUT1 and OUT2 in response to a first logical value of the first source output enable signal SOE1 and performs the charge sharing. The second CS switch SW6 is connected to the third and fourth output channels OUT3 and OUT4. The second CS switch SW6 connects the third and fourth output channels OUT3 and OUT4 in response to a first logical value of the second source output enable signal SOE2 and performs the charge sharing.

As shown in FIG. 58, the buffers P1, N2, P3, and N4 of the source driver IC SIC may be disposed from the left side in the order named, and the output channels OUT1, OUT2, OUT3, and OUT4 of the source driver IC SIC may be disposed from the left side in the order named. The embodiment of the invention crosses the second and third data lines S2 and S3, connects the second output channel OUT2 to the third data line S3, and connects the third output channel OUT3 to the second data line S2, so as to invert the polarity of the data voltage in the same manner as the above-described embodiments. A parasitic capacitance may be present at a crossing of the second and third data lines S2 and S3, but may be minimized using an organic protective layer.

The following Table 3 indicates operation states of the buffers and the output channels shown in FIG. 58 in accordance with four cases.

TABLE 3

| | Output channel No. | OUT1 | OUT2 | OUT3 | OUT4 |
|---|---|---|---|---|---|
| CASE 1 | Output polarity | + | − | + | − |
| | Buffer | P1 | N2 | P3 | N4 |
| | ON-switch | SA1, SW1 | SD2, SW2 | SB3, SW3 | SC4, SW4 |
| CASE 2 | Output polarity | − | + | − | + |
| | Buffer | N2 | P1 | N4 | P3 |
| | ON-switch | SC2, SW1 | SB1, SW2 | SD4, SW3 | SA3, SW4 |
| CASE 3 | Output polarity | + | − | − | + |
| | Buffer | P1 | N2 | N4 | P3 |
| | ON-switch | SA1, SW1 | SD2, SW2 | SD4, SW3 | SA3, SW4 |
| CASE 4 | Output polarity | − | + | + | − |
| | Buffer | N2 | P1 | P3 | N4 |
| | ON-switch | SC2, SW1 | SB1, SW2 | SB3, SW3 | SC4, SW4 |

In FIGS. 45, 57, and 58, the crossings of the data lines may be implemented by one of a method for crossing the data lines in an upper bezel of the display panel 100, a method for crossing the data lines inside the source driver IC SIC, and a method for crossing the data lines on the COF.

As described above, the display device including the first and second data line groups each having the different charge sharing timing according to the embodiment of the disclosure performs the charge sharing on the first data line group only when the polarity of the data voltage supplied to the data lines belonging to the first data line group is inverted, and performs the charge sharing on the second data line group only when the polarity of the data voltage supplied to the data lines belonging to the second data line group is inverted. As a result, the embodiment of the disclosure can greatly reduce the power consumption without a reduction in the image quality.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device including a plurality of data lines and a plurality of gate lines, the display device comprising:
    a pixel array including a first set of subpixels of first to fourth colors and a second set of subpixels of the first to fourth colors, the first set of subpixels and the second set of subpixels connected to a same data line;
    a data driver configured to generate first data voltages and second data voltages, the first data voltages having a first polarity with respect to a common voltage that is applied to the pixel array and the second data voltages having a second polarity with respect to the common voltage that is different than the first polarity, and wherein the data driver applies the first data voltages of the first polarity to the first set of subpixels of the first to fourth colors via the data line and subsequently applies the second data voltages of the second polarity to the second set of subpixels of the first to fourth colors via the data line; and
    a gate driver configured to supply gate pulses to the gate lines, the gate pulses synchronized with the first data voltages and the second data voltages;
    wherein the data driver sequentially generates the first data voltages of the first to fourth colors at the first polarity, and sequentially generates the second data voltages of the first to fourth colors at the second polarity.

2. The display device of claim 1, wherein the data driver applies the second data voltages of the second polarity to the second set of subpixels immediately after the first data voltages of the first polarity are applied to the first set of subpixels.

3. The display device of claim 1, wherein the first color is one of red, green, blue, or white.

4. The display device of claim 3, wherein a subpixel of the first color from the first set of subpixels is disposed on a (K+1)-th row line of the display panel, where K is zero and a positive integer,
    wherein a subpixel of the second color from the first set of subpixels is disposed on a (K+3)-th row line of the display panel,
    wherein a subpixel of the third color from the first set of subpixels is disposed on a (K+2)-th row line of the display panel, and
    wherein a subpixel of the fourth color from the first set of subpixels is disposed on a (K+4)-th row line of the display panel.

5. The display device of claim 4, wherein the subpixel of the first color from the first set of subpixels includes a first thin film transistor (TFT), the first TFT supplying the first data voltage of the first color through the data line to a first pixel electrode included in the subpixel of the first color in response to a first gate pulse supplied through an I-th gate line, where I is a positive integer,
    wherein the subpixel of the second color from the first set of subpixels includes a second TFT, the second TFT supplying the first data voltage of the second color through the data line to a second pixel electrode included in the subpixel of the second color in response to a second gate pulse supplied through an (I+1)-th gate line,
    wherein the subpixel of the third color from the first set of subpixels includes a third TFT, the third TFT supplying the first data voltage of the third color through the data line to a third pixel electrode included in the subpixel of the third color in response to a third gate pulse supplied through an (I+2)-th gate line, and
    wherein the subpixel of the fourth color from the first set of subpixels includes a fourth TFT, the fourth TFT supplying the first data voltage of the fourth color supplied through the data line to a fourth pixel electrode included in the subpixel of the fourth color in response to a fourth gate pulse supplied through an (I+3)-th gate line.

6. The display device of claim 5, further comprising:
    a plurality of link lines configured to connect output channels of the gate driver to the plurality of gate lines, wherein at least one link line crosses another link line to connect an output channel of the gate driver to a corresponding one of the plurality of gate lines,
    wherein the gate driver sequentially outputs the gate pulses from the output channels.

7. The display device of claim 3, wherein a subpixel of the first color from the first set of subpixels is disposed on a (K+1)-th row line of the display panel, where K is zero and a positive integer,
    wherein a subpixel of the second color from the first set of subpixels and a subpixel of the third color from the first set of subpixels are disposed on a (K+2)-th row line of the display panel, and
    wherein a subpixel of the fourth color from the first set of subpixels is disposed on a (K+3)-th row line of the display panel.

8. The display device of claim 7, wherein the subpixel of the first color from the first set of subpixels includes a first thin film transistor (TFT), the first TFT supplying the first data voltage of the first color through the data line to a first pixel electrode included in the subpixel of the first color in response to a first gate pulse supplied through an I-th gate line, where I is a positive integer,
    wherein the subpixel of the second color from the first set of subpixels includes a second TFT, the second TFT supplying the first data voltage of the second color through the data line to a second pixel electrode included in the subpixel of the second color in response to a second gate pulse supplied through an (I+1)-th gate line,
    wherein the subpixel of the third color from the first set of subpixels includes a third TFT, the third TFT supplying the first data voltage of the third color through the data line to a third pixel electrode included in the subpixel of the third color in response to a third gate pulse supplied through an (I+2)-th gate line, and wherein the subpixel of the fourth color from the first set of subpixels includes a fourth TFT, the fourth TFT supplying the first data voltage of the fourth color through the data line to a fourth pixel electrode included in the subpixel of the fourth color in response to a fourth gate pulse supplied through an (I+3)-th gate line.

9. The display device of claim 8, wherein the data driver inverts the polarity of the first data voltage from the first polarity to the second polarity in a cycle, which is equal to or greater than two horizontal periods and is equal to or less than N/2 horizontal period, where N is a vertical resolution of the display panel, and wherein a time point where data voltages supplied to odd-numbered data lines switches from the first polarity to the second polarity is different from a time point where data voltages supplied to even-numbered data lines switches from the first polarity to the second polarity.

10. The display device of claim 1, wherein the pixel array includes pixels in which the polarity of data voltages applied to the pixels are inverted every sub-pixel along a horizontal direction and a vertical direction across the pixel array, or the pixel array includes pixels in which the polarity of data voltages applied to the pixels are inverted every two sub-pixels along the horizontal direction and the vertical direction.

11. The display device of claim 1, wherein the data driver inverts the polarity of the first data voltage from the first polarity to the second polarity in a cycle, which is equal to or greater than two horizontal periods and is equal to or less than N/2 horizontal period, where N is a vertical resolution of a display panel, and wherein a time point where data voltages supplied to odd-numbered data lines switches from the first polarity to the second polarity is different from a time point where data voltages supplied to even-numbered data lines switches from the first polarity to the second polarity.

12. The display device of claim 1, wherein the pixel array includes a first block of sub-pixels having a first polarity distribution of data voltages among the sub-pixels in the first block and a second block of sub-pixels having a second polarity distribution of data voltages among the sub-pixels of the second block, the second polarity distribution reversed from the first polarity distribution, wherein the first block and the second block are adjacent to each other, and wherein each of the first block and the second block includes four or more row lines of sub-pixels and four or more column lines of sub-pixels in the pixel array.

13. The display device of claim 1, wherein when a polarity of the data voltages supplied to data lines belonging to a first data line group is inverted, the data driver performs charge sharing on the first data line group where charge is shared between subpixels of the first data line group, wherein when a polarity of the data voltages supplied to data lines belonging to a second data line group is inverted, the data driver performs the charge sharing on the second data line group where charge is shared between subpixels of the second line group, and wherein a time when charge sharing occurs in the first data line group is different from a timing when charge sharing occurs in the second data line group.

14. The display device of claim 13, wherein the data driver includes:

a first switch configured to be turned on at a first time to share charge between the subpixels belonging to the first data line group; and a second switch configured to be turned on at a second time different from the first time to share charge between the subpixels belonging to the second data line group.

15. The display device of claim 13, wherein when a first data line, a second data line, a third data line, and a fourth data line are sequentially disposed from a left side of the display device to the right side of the display device, the first data line group includes the first data line and the third data line, and the second data line group includes the second data line and the fourth data line.

16. The display device of claim 15, further comprising a timing controller configured to control operation timings of the data driver and the gate driver and generate a polarity control signal and a source output enable signal, wherein the source output enable signal includes a first source output enable signal controlling an output timing and a charge sharing timing of the data voltages supplied to the data lines belonging to the first data line group and a second source output enable signal controlling an output timing and a charge sharing timing of the data voltages supplied to the data lines belonging to the second data line group, and wherein the data driver performs the charge sharing in response to first logical values of the first source output enable signal and the second source output enable signal and outputs the data voltages to the data lines in response to second logical values of the first source output enable signal and the second source output enable signal.

17. The display device of claim 16, wherein the data driver includes a plurality of buffers, a plurality of switches, and a plurality of output channels, wherein the plurality of buffers include a first buffer of a first buffer type and a second buffer of the first buffer type configured to supply a data voltage at the first polarity to output channels associated with the first buffer and the second buffer of the first buffer type and the plurality of buffers further include a first buffer of a second buffer type and a second buffer of the second buffer type configured to supply a data voltage at the second polarity to the output channels associated with the first buffer and the second buffer of the second buffer type, wherein the first buffer of the first buffer type outputs the data voltage of first data at the first polarity that will be supplied to the first data line through a first output channel and the data voltage of third data at the first polarity that will be supplied to the third data line through a third output channel, wherein the second buffer of the first buffer type outputs the data voltage of second data at the first polarity that will be supplied to the second data line through a second output channel and the data voltage of fourth data at the first polarity that will be supplied to the fourth data line through a fourth output channel, wherein the first buffer of the second buffer type outputs the data voltage of the first data at the second polarity and the data voltage of the third data at the second polarity, wherein the second buffer of the second buffer type outputs the data voltage of the second data at the second polarity and the data voltage of the fourth data at the second polarity, wherein the switches include a multiplexer configured to divide data using a plurality of multiplexer switches, a plurality of data voltage supply switches, and charge sharing switches, and wherein the charge sharing switches include a first charge sharing switch configured to connect together the first output channel and the third output channel and perform the charge sharing between subpixels connected to the first output channel and the third output channel and a second charge sharing switch configured to connect together the second output channel and the fourth output channel and perform the charge sharing between subpixels connected to the second output channel and the fourth output channel.

18. The display device of claim 16, wherein the data driver includes a plurality of buffers, a plurality of switches, and a plurality of output channels, wherein the plurality of buffers include a first buffer of a first buffer type and a second buffer of the first buffer type configured to supply a data voltage at the first polarity to output channels associated with the first buffer and the second buffer of the first buffer type and the plurality of buffers further include a first buffer of a second buffer type and a second buffer of the second buffer type configured to supply a data voltage at the second polarity to the output channels associated with the first buffer and the second buffer of the second buffer type, wherein the first buffer of the first buffer type outputs the data voltage of first data at the first polarity that will be supplied to the first data line through a first output channel, the data voltage of second data at the second polarity that will be supplied to the second data line through a second output channel, and the data voltage of third data at the third polarity that will be supplied to the third data line through a third output channel, wherein the first buffer of the second type outputs the data voltage of the first data at the second polarity, the data voltage of the second data at the second polarity, and the data voltage of the third data at the second polarity, wherein the second buffer of the first type outputs the data voltage of the second data at the first polarity, the data voltage of the third data at the first polarity, and the data voltage of fourth data at the first polarity that will be supplied to the fourth data line through a fourth output channel, wherein the second buffer of the second type outputs the data voltage of the second data at the second polarity, the data voltage of the third data at the second polarity, and the data voltage of the fourth data at the second polarity, wherein the switches include a multiplexer configured to divide data using a plurality of multiplexer switches, a plurality of data voltage supply switches, and charge sharing switches, and wherein the charge sharing switches include a first charge sharing switch configured to connect together the first output channel and the third output channel and perform the charge sharing between subpixels connected to the first output channel and the third output channel and a second charge sharing switch configured to connect the second output channel and fourth output channel and perform the charge sharing between subpixels connected to the second output channel and the fourth output channel.

19. The display device of claim 16, wherein the data driver includes a plurality of buffers, a plurality of switches, and a plurality of output channels, wherein the plurality of buffers include a first buffer of a first buffer type and a second buffer of the first buffer type configured to supply a data voltage at the first polarity to output channels associated with the first buffer and the second buffer of the first buffer type and the plurality of buffers further include a first buffer of a second buffer type and a second buffer of a second buffer type configured to supply a data voltage at the second polarity to the output channels associated with the first buffer and the second buffer of the second buffer type, wherein the first buffer of the first buffer type outputs the data voltage of first data at the first polarity that will be supplied to the first data line through a first output channel and the data voltage of third data at the first polarity that will be supplied to the third data line through a second output channel, wherein the first buffer of the second type outputs the data voltage of the first data at the second polarity and the data voltage of the third data at the second polarity, wherein the second buffer of the first buffer type outputs the data voltage of second data at the first polarity that will be supplied to the second data line through a third output channel and the data voltage of fourth data at the first polarity that will be supplied to the fourth data line through a fourth output channel, wherein the second buffer of the second type outputs the data voltage of the second data at the second polarity and the data voltage of the fourth data at the second polarity, wherein the switches include a multiplexer configured to divide data using a plurality of multiplexer switches, a plurality of data voltage supply switches, and charge sharing switches, and wherein the charge sharing switches include a first charge sharing switch configured to connect together the first output channel and the second output channel and perform the charge sharing between subpixels connected to the first output channel and the second output channel and a second charge sharing switch configured to connect the third output channel and fourth output channel and perform the charge sharing between subpixels connected to the third output channel and the fourth output channel.

20. The display device of claim 19, wherein a portion of lines connecting the buffers to the data lines cross each other such that the third data line is connected to the second output channel and the second data line is connected to the third output channel.

21. A display device including a plurality of data lines and a plurality of gate lines, the display device comprising:
a pixel array including a first set of subpixels of first to fourth colors and a second set of subpixels of the first to fourth colors, the first set of subpixels and the second set of subpixels connected to a same data line;
a data driver configured to generate first data voltages and second data voltages, the first data voltages having a first polarity with respect to a common voltage that is applied to the pixel array and the second data voltages having a second polarity with respect to the common voltage that is different than the first polarity, and wherein the data driver applies the first data voltages of the first polarity to the first set of subpixels of the first to fourth colors via the data line and subsequently applies the second data voltages of the second polarity to the second set of subpixels of the first to fourth colors via the data line; and a gate driver configured to supply gate pulses to the gate lines, the gate pulses synchronized with the first data voltages and the second data voltages;

wherein the data driver includes:

a first switch configured to be turned on at a first time and perform sharing of charge between subpixels on data lines belonging to a first data line group; and a second switch configured to be turned on at a second time different from the first time and perform sharing of charge between subpixels on data lines belonging to a second data line group, and wherein the data driver sequentially generates the first data voltages of the first to fourth colors at the first polarity and sequentially generates the second data voltages of the first to fourth colors at the second polarity.

22. A display device comprising:

a plurality of gate lines;

a plurality of data lines crossing the gate lines;

a plurality of pixels, each pixel of the plurality of pixels including a plurality of subpixels of different colors and the plurality of subpixels arranged in a row corresponding to the pixel that extends in a direction of the plurality of gate lines;

a data driver sequentially driving a first set of subpixels from the plurality of subpixels with first data voltages of a first polarity with respect to a common voltage applied to the plurality of pixels, the first set of subpixels connected to a same data line and at least some of the subpixels of the first set of subpixels belonging to different pixels located on different rows, and each of the first set of subpixels associated with a different color from at least three different colors; and a gate driver configured to supply gate pulses to the plurality of gate lines, the gate pulse synchronized with the first data voltages.

23. The display device of claim 22, wherein the data driver sequentially drives a second set of subpixels with second data voltages of a second polarity with respect to the common voltage that is different from the first polarity, at least some of the subpixels of the second set of subpixels belonging to different pixels located on different rows and each of the second set of subpixels associated with a different color.

24. The display device of claim 23, wherein the second set of subpixels are connected to the same data line as the first set of subpixels.

25. The display device of claim 23, wherein the data driver drives the second set of subpixels with the second data voltages of the second polarity subsequent to driving the first set of subpixels with the first data voltages of the first polarity without driving any intervening set of subpixels.

26. The display device of claim 23, wherein the data driver switches from driving the first set of subpixels with the first data voltages at the first polarity to driving the second set of subpixels with the second polarity in a cycle which is equal to or greater than two horizontal periods and is equal to or less than N/2 horizontal period, where N is a vertical resolution of a display panel, and wherein a time point where data voltages supplied to odd-numbered data lines switches from the first polarity to the second polarity is different from a time point where data voltages supplied to even-numbered data lines switches from the first polarity to the second polarity.

27. The display device of claim 22, wherein a first subpixel from the first set of subpixels driven by the data driver is associated with the different colors of white, blue, red, or green.

28. The display device of claim 27, wherein a subpixel of a first color from the first set of subpixels is disposed on a (K+1)-th row of the display panel, where K is zero or a positive integer;

wherein a subpixel of a second color from the first set of subpixels is disposed on a (K+3)-th row of the display panel;

wherein a subpixel of a third color from the first set of subpixels is disposed on a (K+2)-th row line of the display panel; and wherein a subpixel of a fourth color from the first set of subpixels is disposed on a (K+4)-th row line of the display panel.

29. The display device of claim 28, further comprising:

a plurality of link lines configured to connect output channels of the gate driver to the plurality of gate lines, wherein at least one link line crosses another link line to connect an output channel of the gate driver to a corresponding one of the plurality of gate lines, wherein the gate driver sequentially outputs gate pulses from the output channels.

30. The display device of claim 27, wherein a subpixel of a first color from the first set of subpixels is disposed on a (K+1)-th row line of the display panel, where K is zero or a positive integer, wherein a subpixel of a second color from the first set of subpixels and a subpixel of a third color from the first set of subpixels are disposed on a (K+2)-th row line of the display panel, and wherein a subpixel of a fourth color from the first set of subpixels is disposed on a (K+3)-th row line of the display panel.

31. The display device of claim 22, wherein a first subpixel from the first set of subpixels driven by the data driver is associated with the different colors of red, green, or blue.

32. The display device of claim 22, wherein the plurality of pixels includes a first block of sub-pixels having a first polarity distribution of data voltages among the sub-pixels in the first block and a second block of sub-pixels having a second polarity distribution of data voltages among the sub-pixels of the second block, the second polarity distribution reversed from the first polarity distribution, wherein the first block and the second block are adjacent to each other.

33. The display device of claim 22, wherein when a polarity of data voltages supplied to data lines belonging to a first data line group is inverted to a different polarity, the data driver performs charge sharing on the first data line group where charge is shared between subpixels of the first line group, wherein when a polarity of the data voltages supplied to data lines belonging to a second data line group is inverted to a different polarity, the data driver performs charge sharing on the second data line group where charge is shared between subpixels of the second line group, and wherein a time when charge sharing occurs in the first data line group is different from a timing when charge sharing occurs in the second data line group.

34. The display device of claim 33, wherein the first data line group comprises even numbered data lines and the second data line group comprises odd numbered data lines.

35. The display device of claim 22, wherein the first data voltages of the first polarity have a same voltage polarity.

* * * * *